United States Patent
Spoczynski et al.

(10) Patent No.: US 11,218,546 B2
(45) Date of Patent: Jan. 4, 2022

(54) COMPUTER-READABLE STORAGE MEDIUM, AN APPARATUS AND A METHOD TO SELECT ACCESS LAYER DEVICES TO DELIVER SERVICES TO CLIENTS IN AN EDGE COMPUTING SYSTEM

(71) Applicant: Intel Corporation, Santa Clara, CA (US)

(72) Inventors: Marcin Spoczynski, Lexilip (IE); Michael Nolan, Maynooth (IE); Keith A. Ellis, Carlow (IE); Radhika Loomba, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/830,226

(22) Filed: Mar. 25, 2020

(65) Prior Publication Data

US 2020/0228602 A1 Jul. 16, 2020

(51) Int. Cl.
*G06F 15/173* (2006.01)
*H04L 29/08* (2006.01)
*G06F 17/16* (2006.01)

(52) U.S. Cl.
CPC .............. *H04L 67/12* (2013.01); *G06F 17/16* (2013.01); *H04L 67/28* (2013.01)

(58) Field of Classification Search
CPC ..... H04L 67/12; H04L 67/28; H04L 67/1012; H04L 67/1021; H04L 67/1008; H04L 67/1014; H04L 41/00; G06F 17/16
See application file for complete search history.

(56) References Cited

U.S. PATENT DOCUMENTS

2015/0256439 A1 9/2015 Bragstad et al.
2017/0086049 A1* 3/2017 Vrzic .................... H04W 40/00
(Continued)

FOREIGN PATENT DOCUMENTS

WO 2017121478 A1 7/2017

OTHER PUBLICATIONS

Koeing, Sven et al., "D*Lite," American Association for Artificial Intelligence (2002) 8 pages.
(Continued)

*Primary Examiner* — Suraj M Joshi
*Assistant Examiner* — Jaren Means
(74) *Attorney, Agent, or Firm* — Alliance IP, LLC

(57) ABSTRACT

A non-transitory computer-readable storage medium, an apparatus, and a computer-implemented method to select respective physical infrastructure devices of an edge computing system to implement services requested by respective service-requesting clients. The computer-readable storage medium includes computer-readable instructions that, when executed, cause at least one processor to perform operations comprising, for each candidate physical infrastructure device, calculating a utility score corresponding to each of the services requested, wherein: the utility score corresponds to one of each of the respective service-requesting clients or each subgroup of a plurality of subgroups of the respective service-requesting clients. The utility score is based on location-related attributes and resource-related attributes of said each candidate physical infrastructure device, resource-related attributes of said each of the services requested, and location-related attributes and movement-related attributes of one of said each of the respective service-requesting clients or said each subgroup of the plurality of subgroups of the respective service-requesting clients.

18 Claims, 26 Drawing Sheets

(56) References Cited

U.S. PATENT DOCUMENTS

2018/0152390 A1* 5/2018 Loomba .................. H04L 47/70
2019/0158606 A1  5/2019 Bernat et al.
2020/0007414 A1  1/2020 Smith et al.
2020/0128101 A1* 4/2020 Meng ..................... H04L 67/36

OTHER PUBLICATIONS

EPO; Extended European Search Report issued in EP Patent Application No. 20207745.9, dated Apr. 12, 2021; 10 pages.

* cited by examiner

COMPUTER-READABLE STORAGE MEDIUM, AN APPARATUS AND A METHOD TO SELECT ACCESS LAYER DEVICES TO DELIVER SERVICES TO CLIENTS IN AN EDGE COMPUTING SYSTEM

FIELD

The instant disclosure relates in general to the field of selecting compute nodes for the delivery of services or workloads in an edge computing system or network.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
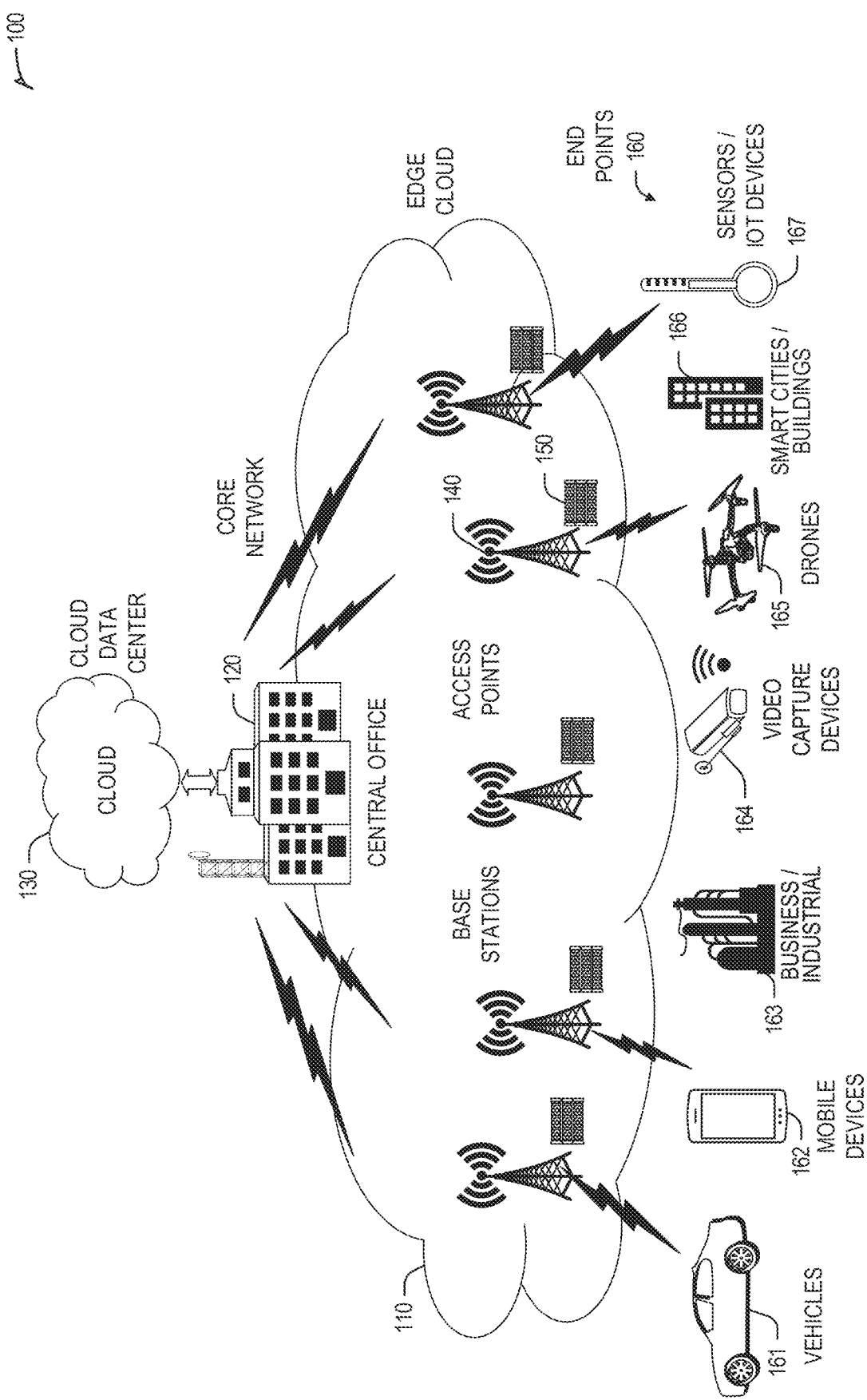
FIG. 1 illustrates an overview of an edge cloud configuration for edge computing.

The following embodiments generally relate to service management, resource allocation, compute management, network communication, and communication system implementations, and in particular, to techniques and configurations for on-boarding, scheduling and management of virtualized workloads for edge computing.

In the following description, methods, configurations, and related apparatuses are disclosed for various improvements to the configuration and functional capabilities of an edge computing architecture and an implementing edge computing system. These improvements may benefit a variety of use cases, especially those involving industrial applications, but embodiments are not so limited.

The following initially provides an overview of terminology applicable to edge computing (Section I). This is followed by an overview of edge computing technology and configurations (Section II), and example configurations and methods embodying the improvements described herein, it being understood that example configurations of embodiments in Section III may be implemented using/on for example the edge computing technology and/or configurations described in Section II, or using/on other edge computing technology and/or configurations.

Terminology

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

Specific arrangements of edge computing applications and services accessible via mobile wireless networks (e.g., cellular and Wi-Fi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, roadside unit, on premise unit, UE or end consuming device, or the like.

As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services, such as within an industrial enterprise setting.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site, or at a wired network site depending on the use case. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of network functions from embedded services inside proprietary hardware appliances to software-based virtualized network functions (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local site, such as a local wireless site, such as a local cellular site, within the infrastructure edge.

As used herein, the term "virtualized network function" (or VNF) indicates a software-based network function operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

Although many of the following examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Examples of Edge Computing Systems

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 163, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
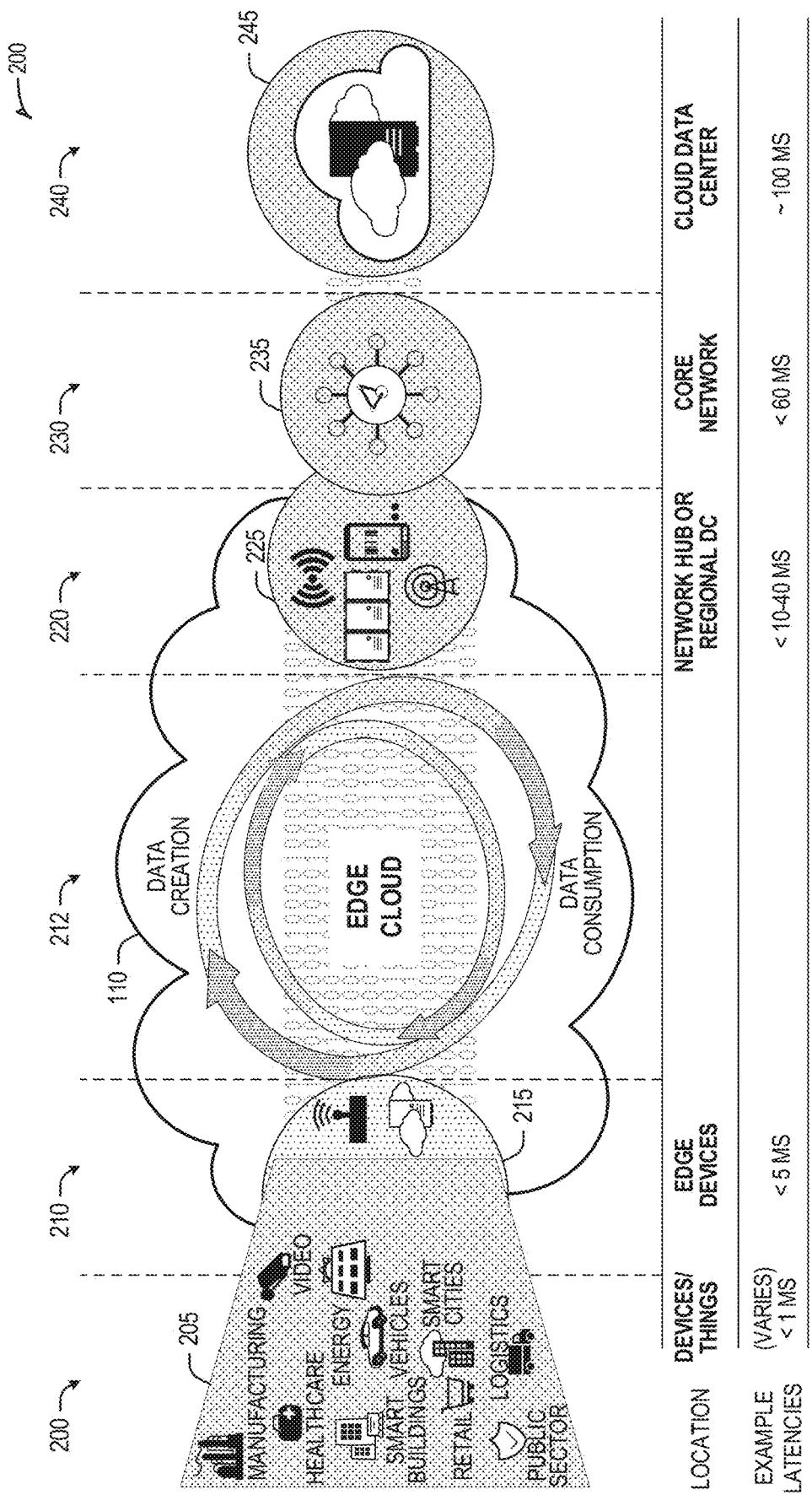
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers, or local network equipment (equipment 225); and any equipment, devices, or nodes located therebetween (in layer 212, not illustrated in detail). The network communications within the edge cloud 110 and among the various layers may occur via any number of wired or wireless mediums, including via the connectivity architectures and technologies discussed with reference to FIGS. 16 to 18.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (VNFs, Function as a Service (FaaS), standard processes, etc.) which cannot leverage conventional cloud computing due to latency or other limitations.

Figure 3:
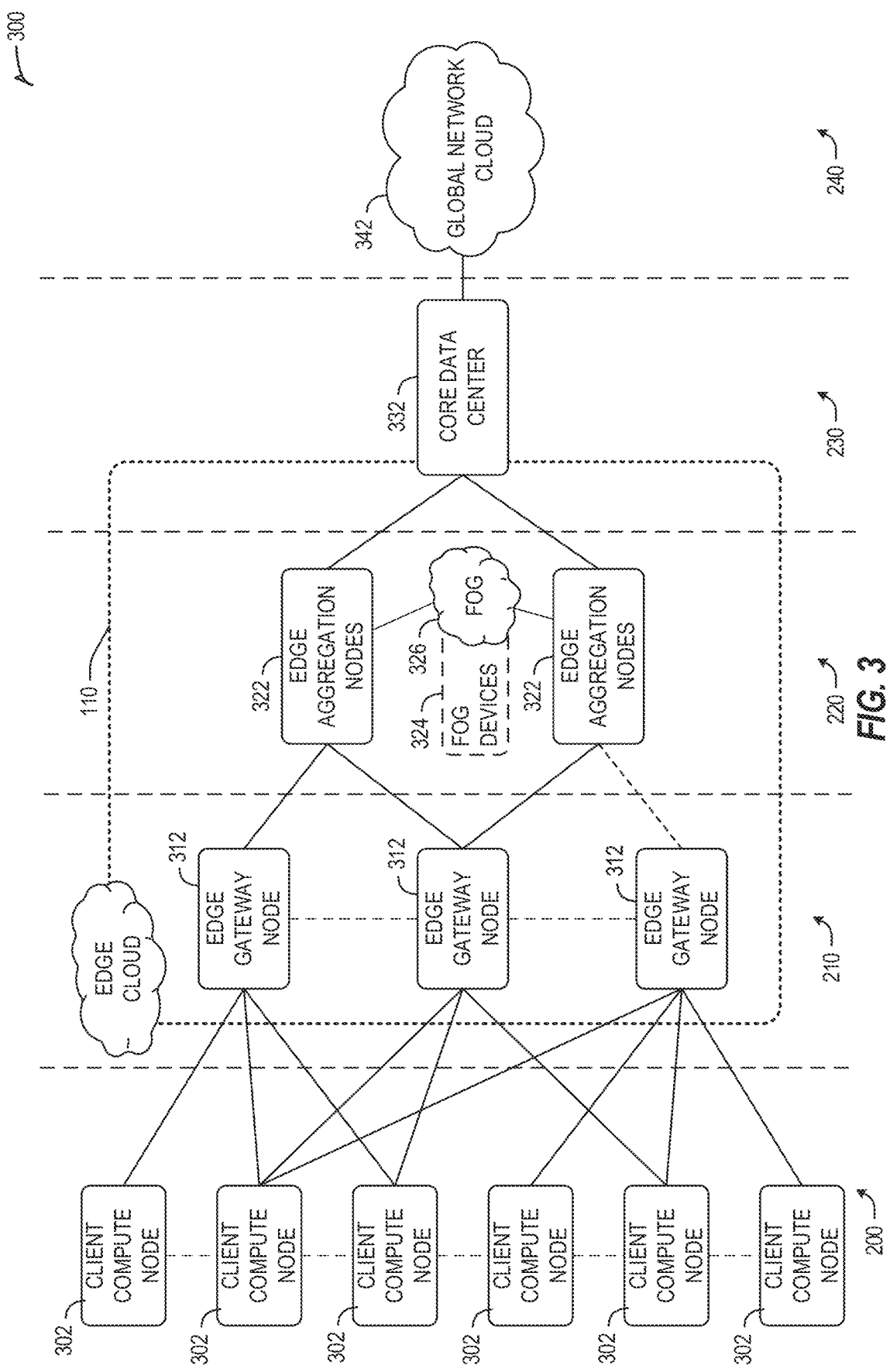
FIG. 3 provides an overview of layers of distributed compute deployed among an edge computing system.

At a more generic level, an edge computing system may be described to encompass any number of deployments at the previously discussed layers operating in the edge cloud 110 (network layers 200-240), which provide coordination from client and distributed computing devices. FIG. 3 provides an abstracted overview of layers of distributed compute deployed among an edge computing environment for purposes of illustration. Various types of network links at the same (e.g., peer-to-peer) or different layers are also depicted.

FIG. 3 generically depicts an edge computing system 300 for providing edge services and applications to multi-stakeholder entities, as distributed among one or more client compute nodes 302, one or more edge gateway nodes 312, one or more edge aggregation nodes 322, one or more core data centers 332, and a global network cloud 342, as distributed across layers of the network. The implementation of the edge computing system 300 may be provided at or on behalf of a telecommunication service provider ("telco", or "TSP"), internet-of-things service provider, cloud service provider (CSP), enterprise entity, or any other number of entities. Various implementations and configurations of the system 300 may be provided dynamically, such as when orchestrated to meet service objectives.

Individual nodes or devices of the edge computing system 300 are located at a particular layer corresponding to layers 200, 210, 220, 230, 240. For example, the client compute nodes 302 are located at an endpoint layer 200, while the edge gateway nodes 312 are located at an edge devices layer 210 (local level) of the edge computing system 300. Additionally, the edge aggregation nodes 322 (and/or fog devices 324, if arranged or operated with or among a fog networking configuration 326) are located at a network access layer 220 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 332 is located at a core network layer 230 (a regional or geographically-central level), while the global network cloud 342 is located at a cloud data center layer 240 (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 332 may be located within, at, or near the edge cloud 110. Although an illustrative number of client compute nodes 302, edge gateway nodes 312, edge aggregation nodes 322, edge core data centers 332, global network clouds 342 are shown in FIG. 3, it should be appreciated that the edge computing system 300 may include additional devices or systems at each layer. Devices at any layer can be configured as peer nodes to each other and, accordingly, act in a collaborative manner to meet service objectives. Additionally, as shown in FIG. 3, the number of components of respective layers 200, 210, 220, 230, 240 generally increases at each lower level (e.g., when moving closer to endpoints). As such, one edge gateway node 312 may service multiple client compute nodes 302, and one edge aggregation node 322 may service multiple edge gateway nodes 312.

Consistent with the examples provided herein, a client compute node 302 may be embodied as any type of endpoint component, device, appliance, or other thing capable of communicating as a producer or consumer of data. Further, the label "node" or "device" as used in the edge computing system 300 does not necessarily mean that such node or device operates in a client or slave role; rather, any of the nodes or devices in the edge computing system 300 refer to individual entities, nodes, or subsystems which include discrete or connected hardware or software configurations to facilitate or use the edge cloud 110.

As such, the edge cloud 110 is formed from network components and functional features operated by and within the edge gateway nodes 312 and the edge aggregation nodes 322 of layers 210, 220, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 3 as the client compute nodes 302. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 110 may form a portion of or otherwise provide an ingress point into or across a fog networking configuration 326 (e.g., a network of fog devices 324, not shown in detail), which may be embodied as a system-level horizontal and distributed architecture that distributes resources and services to perform a specific function. For instance, a coordinated and distributed network of fog devices 324 may perform computing, storage, control, or networking aspects in the context of an IoT system arrangement. Other networked, aggregated, and distributed functions may exist in the edge cloud 110 between the core data center 332 and the client endpoints (e.g., client compute nodes 302). Some of these are discussed in the following sections in the context of network functions or service virtualization, including the use of virtual edges and virtual services which are orchestrated for multiple stakeholders.

As discussed in more detail below, the edge gateway nodes 312 and the edge aggregation nodes 322 cooperate to provide various edge services and security to the client compute nodes 302. Furthermore, because a client compute node 302 may be stationary or mobile, a respective edge gateway node 312 may cooperate with other edge gateway devices to propagate presently provided edge services, relevant service data, and security as the corresponding client compute node 302 moves about a region. To do so, the edge gateway nodes 312 and/or edge aggregation nodes 322 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 110. In a multi-stakeholder environment, there can be multiple loadable security modules (LSMs) used to provision policies that enforce the stakeholders interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 110, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

Figure 4:
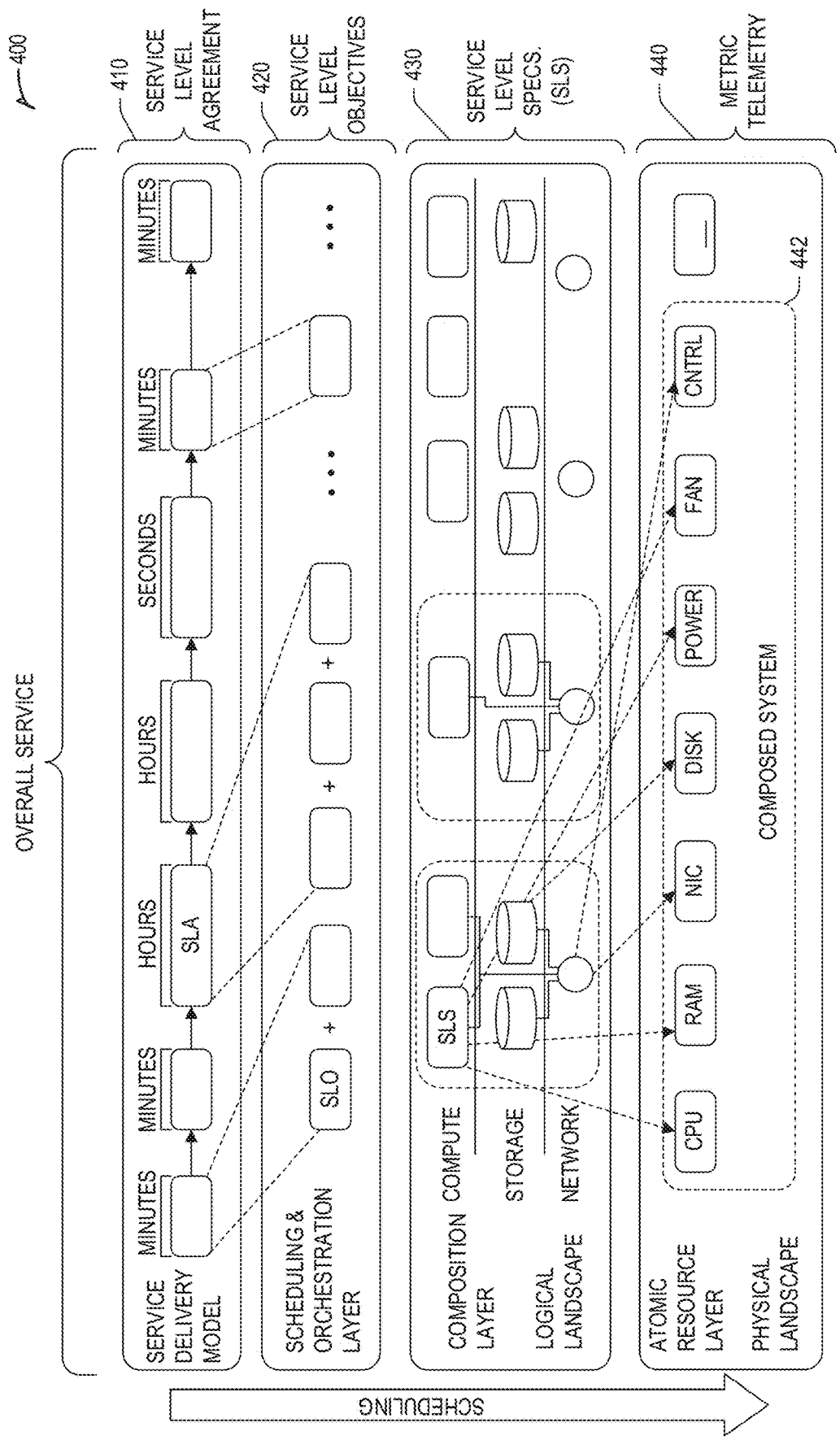
FIG. 4 provides an overview of layers of distributed compute deployed among an edge computing system.

An example relationship among services for use in an edge computing system is depicted in FIG. 4. In scenarios of edge computing, there are several services, and transaction layers in operation and dependent on each other—these services create a "service chain". At the lowest level, ingredients compose systems. These systems (or resources) communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in the hierarchy depicted in FIG. 4 is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement could define "transactional throughput" or "timeliness"—in case of SDSi, the system (or resource) can sign up to guarantee specific service level specifications (SLS 430) and objectives (SLO 420) of a service level agreement (SLA 410). SDSi hardware also provides the ability for the infrastructure and resource owner to empower the silicon component (e.g., components of a composed system 442 that produce metrics telemetry 440) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

The higher layer in the services hierarchy, Resource Level Services, includes systems which provide (in complete or through composition) the ability to meet workload demands by either acquiring and enabling system level features via SDSi, or through the composition of individually addressable resources (compute, storage and network).

The higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling. Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

The higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event" 13 this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

The highest layer of services in the service hierarchy, Business Level Services (BLS), is tied to the capability that is being delivered. At this level, the customer or entity might not care about how the service is composed or what ingredients are used, managed, tracked in order to provide the service(s). The primary objective of business level services is to attain the goals set by the customer according to the overall contract terms and conditions established between the customer and the provider at the agreed to financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead through an agent or middleware capability. Services such as: locate, find, address, trace, track, identify, register may be placed immediately in effect as resources appear on the framework, and the manager or owner of the resource domain can use management rules and policies to ensure orderly resource discovery, registration and certification.

Moreover, any number of the edge computing architectures described herein may be adapted with service management features. These features may enable a system to be constantly aware and record information about the motion, vector and direction of resources as well as fully describe these features as both telemetry and metadata associated with the devices. These service management features can be used for resource management, billing and metering, as well as an element of security. The same functionality also applies to related resources, where a less intelligent device, like a sensor, might attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

Edge Computing Configurations and Arrangements

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge nodes as a supplemental tool to cloud computing. In a contrasting system example applicable to a telecommunications service provider (TSP), the deployment of an edge computing system may be provided via a "network-aggregation" approach, to introduce edge nodes at locations in which network accesses (from different types of data access networks) are aggregated. However, these over-the-top and network aggregation approaches may be implemented together in a hybrid or merged approach or configuration as suggested in later examples.

Figure 5:
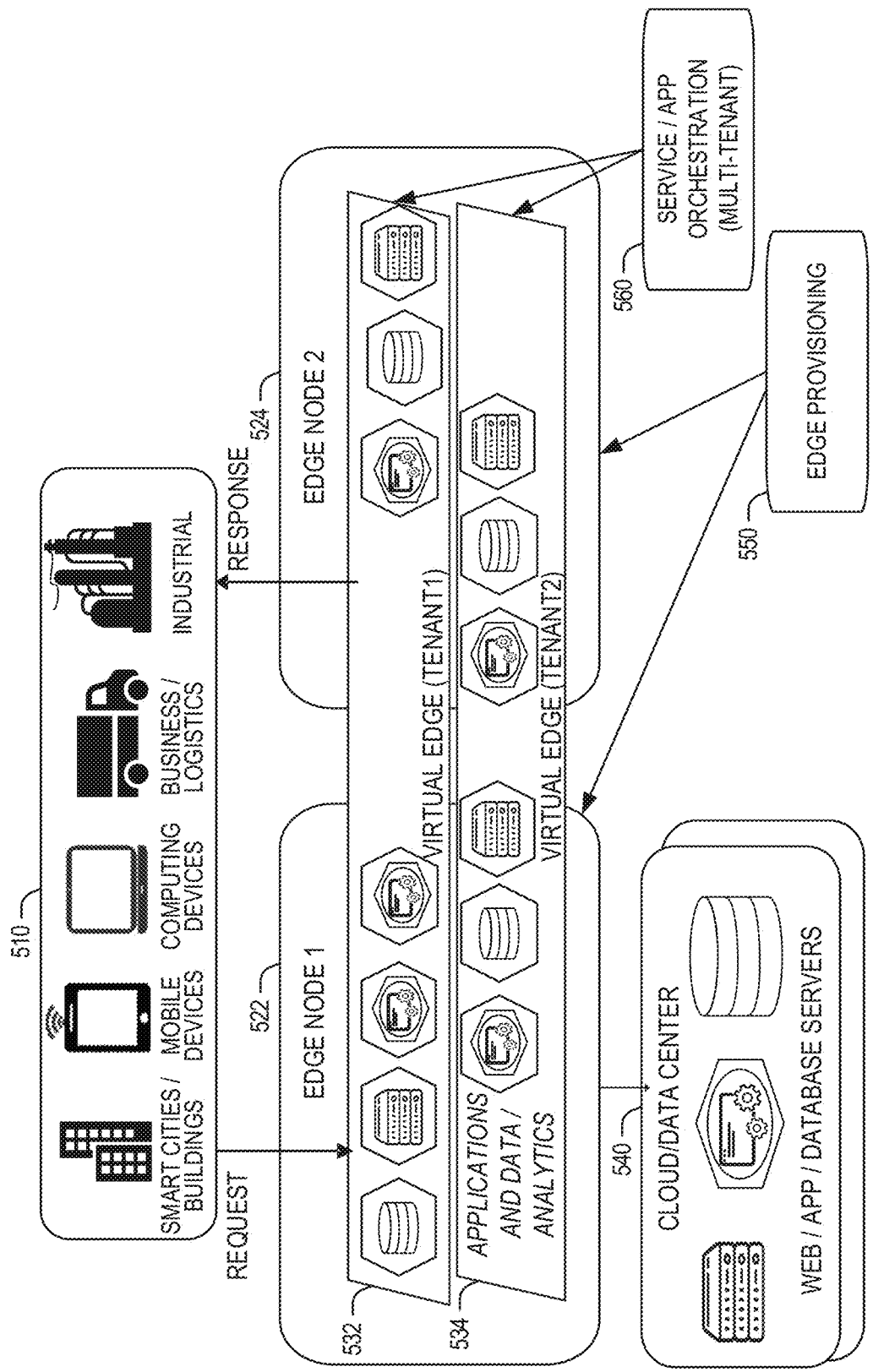
FIGS. 5 and 6 illustrate deployment and orchestration for virtual edge configurations across an edge computing system operated among multiple edge nodes and multiple tenants.
Figure 6:
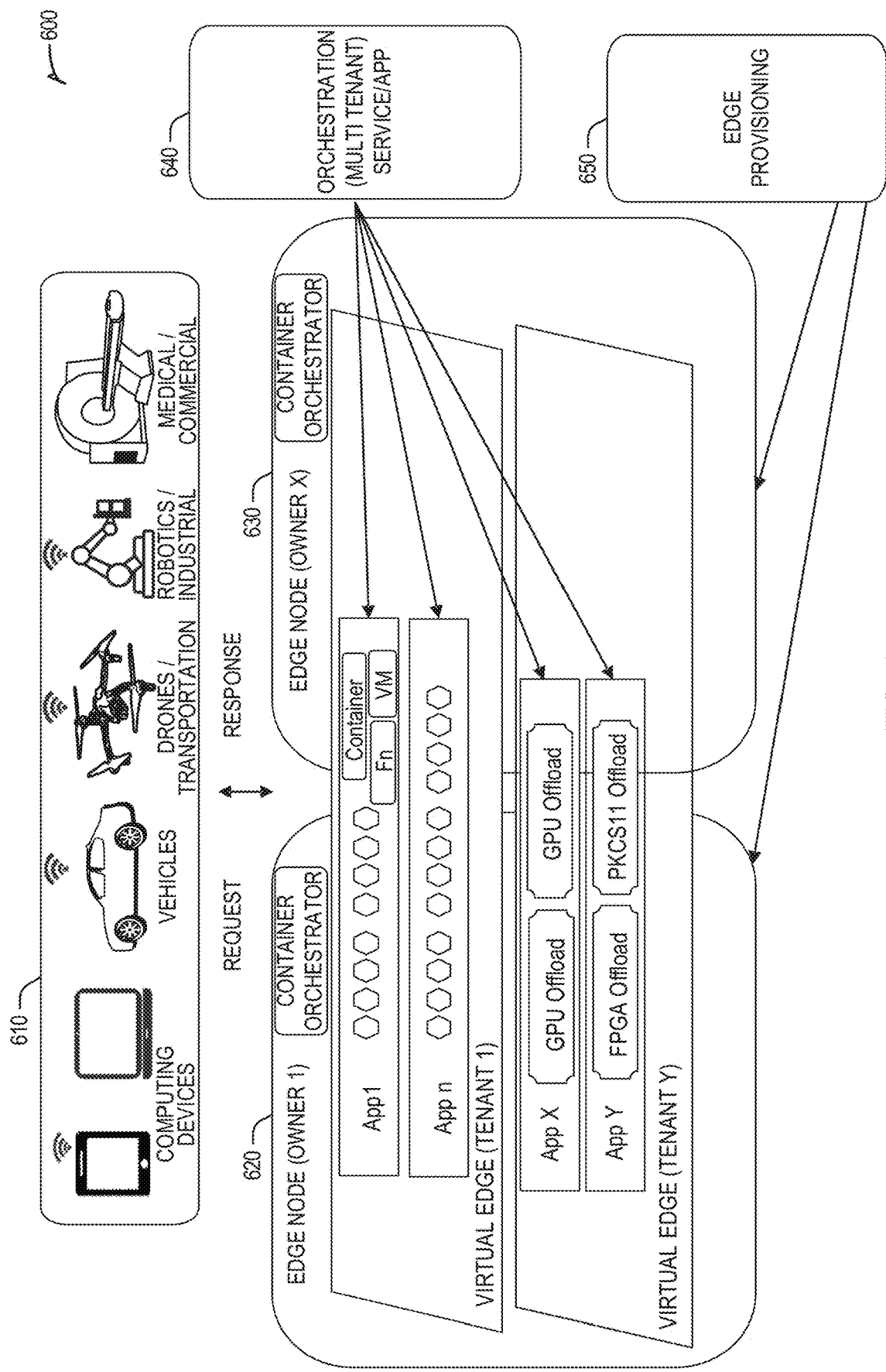

As an extension of either CSP or TSP configurations, FIGS. 5 and 6 illustrate deployment and orchestration for virtual edge configurations across an edge computing system operated among multiple edge nodes and multiple tenants.

Specifically, FIG. 5 depicts coordination of a first edge node 522 and a second edge node 524 in an edge computing system 500, to fulfill requests and responses for various client endpoints 510 (e.g., smart cities/building systems, mobile devices, computing devices, business/logistics systems, industrial systems, etc.) which access various virtual edge instances. The virtual edge instances provide edge compute capabilities and processing in an edge cloud, with access to a cloud/data center 540 for higher-latency requests for websites, applications, database servers, etc. However, the edge cloud enables coordination of processing among multiple edge nodes for multiple tenants or entities.

In the example of FIG. 5, these virtual edge instances include: a first virtual edge 532, offered to a first tenant (Tenant 1), which offers a first combination of edge storage, computing, and services; and a second virtual edge 534, offering a second combination of edge storage, computing, and services. The virtual edge instances 532, 534 are distributed among the edge nodes 522, 524, and may include scenarios in which a request and response are fulfilled from the same or different edge nodes. The configuration of the edge nodes 522, 524 to operate in a distributed yet coordinated fashion occurs based on edge provisioning functions 550. The functionality of the edge nodes 522, 524 to provide coordinated operation for applications and services, among multiple tenants, occurs based on orchestration functions 560.

It should be understood that some of the devices in 510 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 622, 624 may operate as LSM or security feature enforcement points for local resources allocated to multiple tenants per node. Additionally, tenant runtime and application execution (e.g., in instances 632, 634) may serve as an enforcement point for an LSM or other security feature that creates a virtual edge abstraction of resources spanning potentially multiple physical hosting platforms. Finally, the orchestration entity 660 may operate as an LSM or security feature enforcement point for marshalling resources along tenant boundaries.

Edge nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 510, 522, and 540 may coordinate the establishment of a distributed trusted computing base (DTCB) such that a tenant-specific virtual trusted secure channel linking all elements end to end can be established.

In the example of FIG. 6, an edge computing system 600 is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 6. An orchestrator may use a DICE layering and fan-out construction to create a root of trust context that is tenant specific. Thus, orchestration functions 640, provided by an orchestrator discussed below, may participate as a tenant-specific orchestration provider.

Similar to the scenario of FIG. 6, the edge computing system 600 is configured to fulfill requests and responses for various client endpoints 610 from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

Within the edge cloud, a first edge node 620 (operated by a first owner) and a second edge node 630 (operated by a second owner) respectively operate an orchestrator to coordinate the execution of various applications within the virtual edge instances offered for respective tenants. The edge nodes 630 are coordinated based on edge provisioning functions 650, while the operation of the various applications are coordinated with orchestration functions 640. Furthermore, the orchestrator may identify specific hardware features that are offered to one owner but hidden from a second owner, however offered across the ownership boundaries in order to ensure that services complete according to their SLA(s). Accordingly, the virtual edge, container orchestrator, and service/app orchestrator may provide an LSM or other security enforcement point, for node-specific resources tied to specific tenants.

Figure 7:
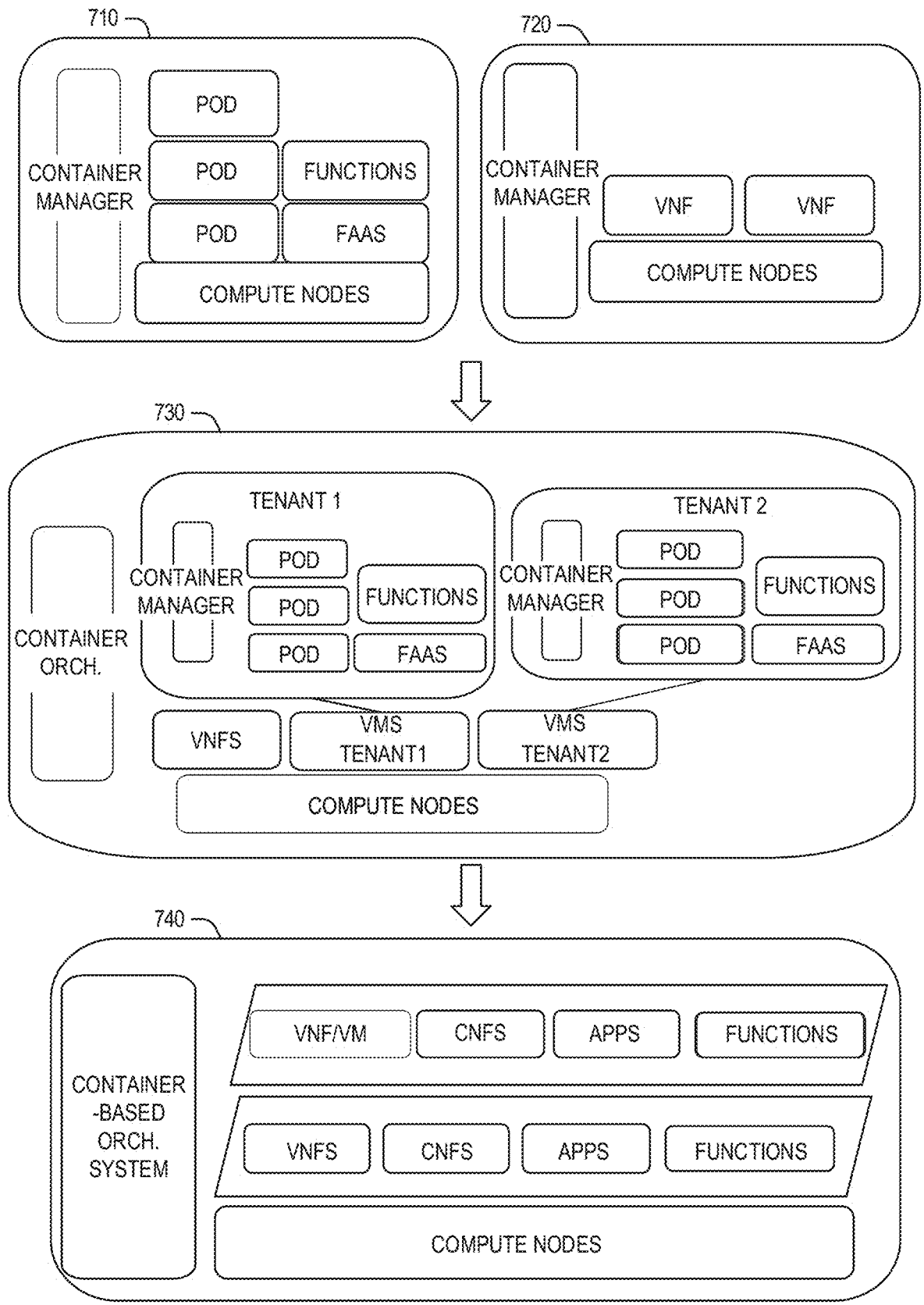
FIG. 7 illustrates various compute arrangements deploying containers in an edge computing system.

FIG. 7 illustrates various compute arrangements deploying containers in an edge computing system. As a simplified example, system arrangements 710, 720 depict settings in which a container manager is adapted to launch containerized pods, functions, and functions-as-a-service instances through execution via compute nodes (in arrangement 710), or to separately execute containerized virtualized network functions through execution via compute nodes (in arrangement 720). This arrangement is adapted for use by multiple tenants in system arrangement 730, where containerized pods, functions, and functions-as-a-service instances are launched within virtual machines specific to respective tenants (aside the execution of virtualized network functions). This arrangement is further adapted for use in system arrangement 740.

The system arrangements depicted in FIGS. 6 and 7 provide an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 7, the container manager, container orchestrator, and individual nodes may provide an LSM or other security enforcement point. However, in either of the configurations of FIG. 6 or 7, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof. Functions, such as those provided in a FaaS environment, discussed further below, may run in any of these isolation environments to enforce tenant boundaries.

Figure 8A:
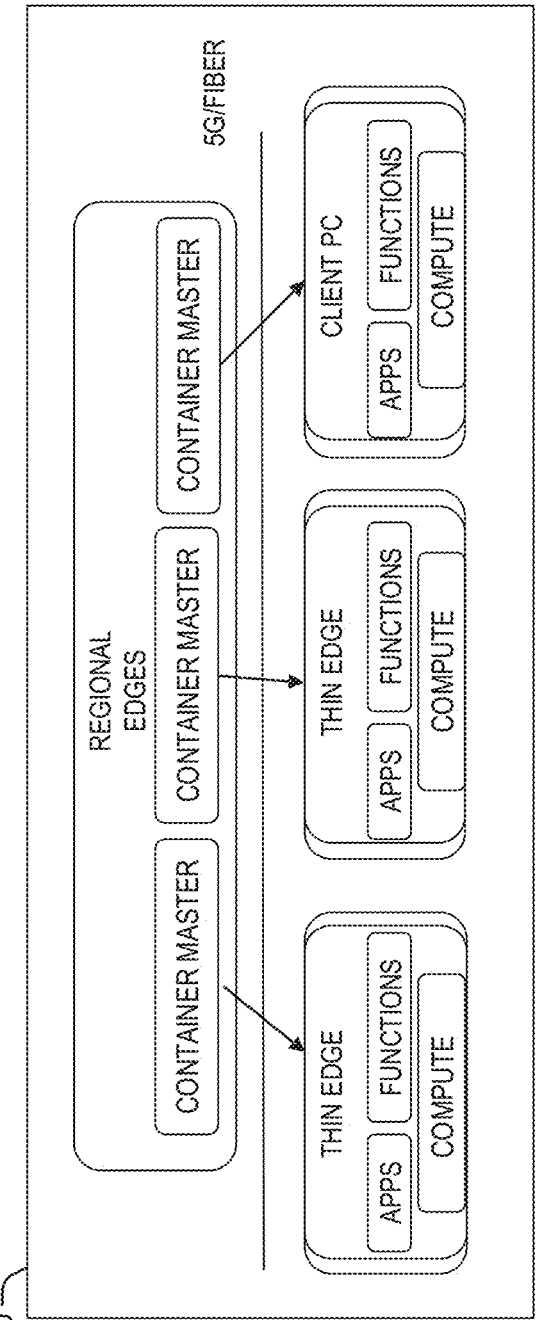
FIGS. 8A and 8B illustrate distributed edge compute deployments, using coordinated compute functions and services in an edge computing system.
Figure 8B:
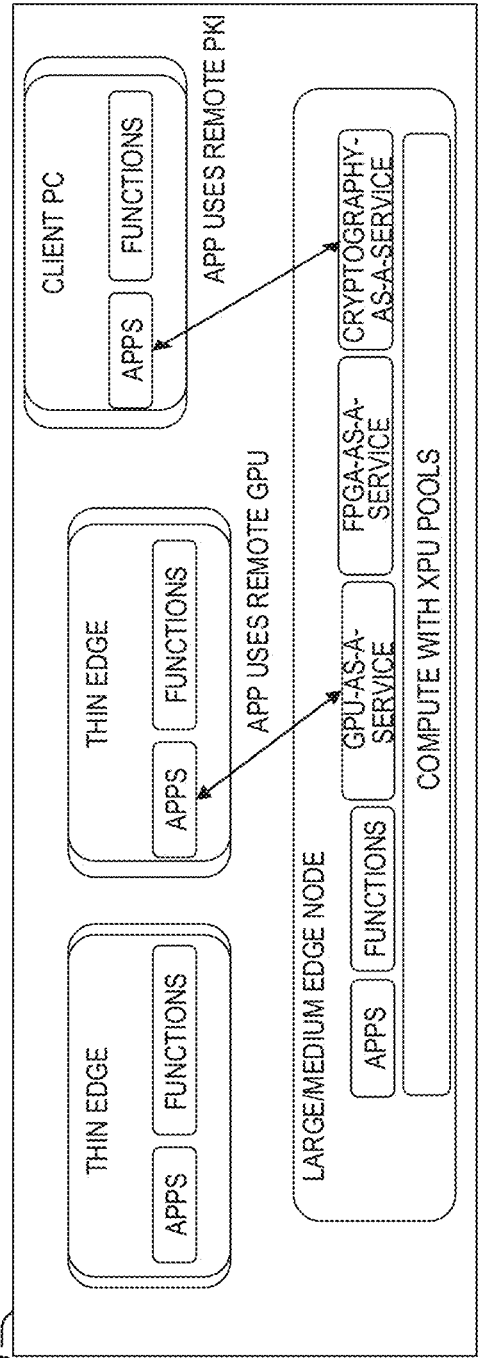

FIGS. 8A and 8B illustrate distributed edge compute deployments, using coordinated compute functions and services in instances of an edge computing system. Within edge computing environment 810, a number of regionally located edges include container managers to coordinate the execution of services, via applications and functions on compute resources on distributed edges (thin edge instances). Within edge computing environment 820, the distributed edges (thin edge instances) are coordinated with other distributed edges having additional processing capabilities (large/medium edge instances). For instance, an application operating at a specific distributed edge instance (thin edge) may invoke GPU processing capabilities further in the edge cloud (offered by the large/medium edge instance, in the form of a GPU-as-a-service); or as another example, a client computer (client PC) may invoke processing capabilities further in the edge cloud (offered by the offered by the large/medium edge instance, in the form of cryptography-as-a-service). Other functions-as-a-service or accelerator-as-a-service may be offered by the edge cloud, coordinated or distributed among the edge nodes, and the like. Furthermore, in an edge computing architecture, each edge node, VM, container or even bare metal node may be self-describing, self-aware and self-managing in order to create a set of offerings that other nodes can use for-as-a-service models.

In further examples, aspects of software-defined or controlled silicon hardware, and other configurable hardware, may integrate with the applications, functions, and services of FIGS. 8A and 8B, and other scenarios discussed herein. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

In further configurations, aspects of orchestration may be implemented in the edge computing system through service aspects of a "Orchestration as a Service (OaaS)" deployment, enabling stakeholder decentralization among many aspects of edge orchestration and multi-tenancy. In an example, an edge computing system tenant discovers OaaS providers as part of an SLA creation process (enabled as part of a bootstrap capability, a configuration wizard, a storefront, etc.). The technical capabilities needed to support the discovery and use of may be baked into respective devices by a manufacturer, and an "onboarding"-type procedure may occur with each OaaS that the tenant selects and utilizes within the edge computing system. Furthermore, during an SLA creation process, the OaaS provider may separate what resources, requirements or features are requested versus available from the pool and create a separate service request for the enablement/activation or subscription to certain features/functions in order to utilize the resource.

Various types of hardware improvements and configurations may be implemented within edge computing devices to support OaaS. For example, hardware capabilities may pre-provision OaaS trust anchors, or provide information to enable a hardware manufacturer to act as a trusted clearing house for brokering OaaS introductions. Other types of software and service improvements and configurations suggested herein may also be implemented within the edge computing system to support features of OaaS.

Workload Distribution and Management

Figure 9:
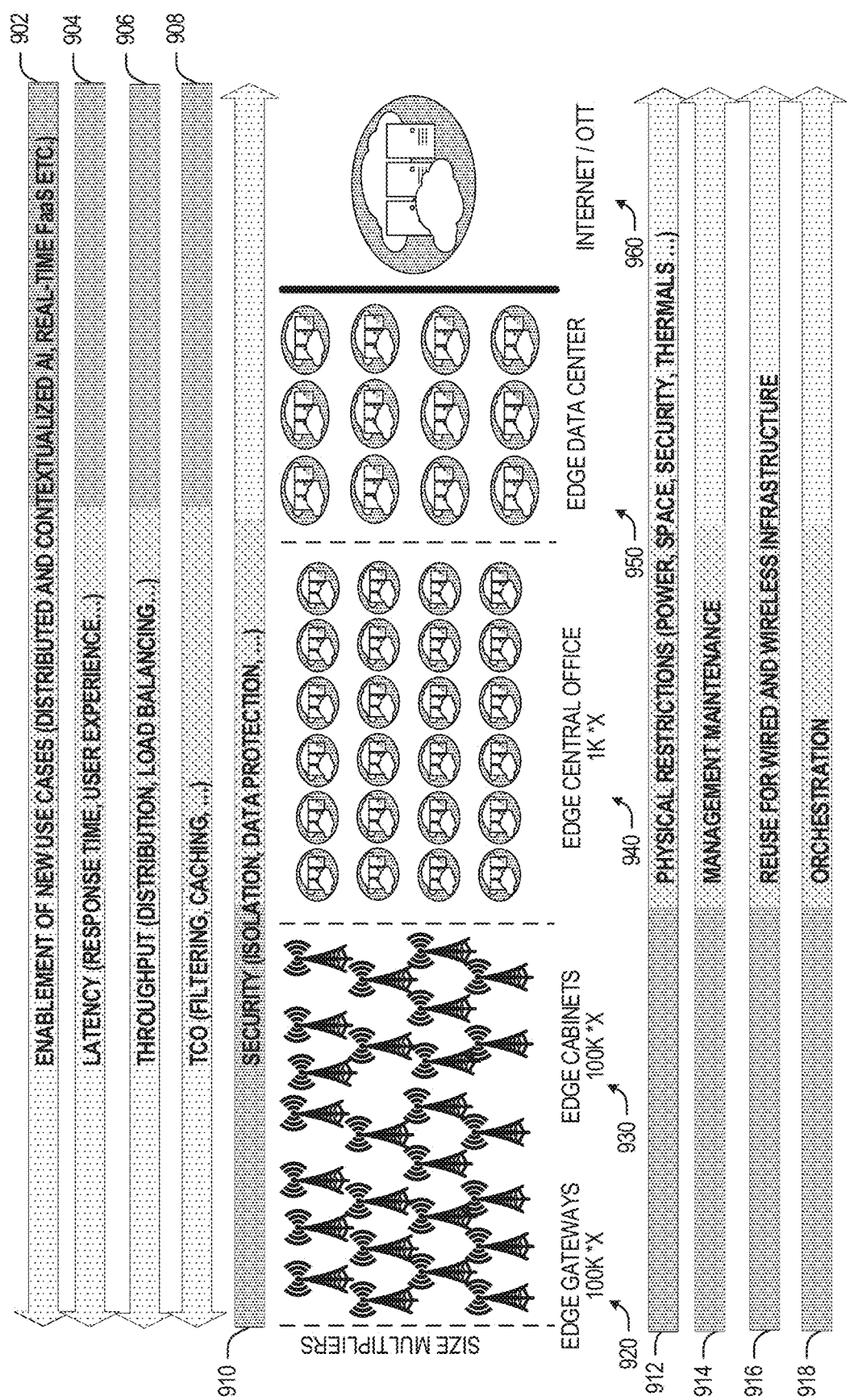
FIG. 9 illustrates a comparison of operational considerations for edge computing among operational network layers.

FIG. 9 illustrates a comparison of operational considerations for edge computing among operational network layers. Specifically, FIG. 9 illustrates the degrees and types of tradeoffs experienced among different compute processing locations. At the different layers of the network (e.g., detailing equipment located among the network access layer 220 and core network layer 230 of FIG. 2), such as among edge gateways 920 (e.g., base stations, access points) and edge cabinets 930 (e.g., street or roadside cabinets, on-premise cabinets) of a near-device edge cloud, a point of aggregation at a central office 940, a point of aggregation at a data center 950, or a cloud data center at an internet or over-the-top service 960, various service properties 902-918 are increased or decreased. When moving closer to the edge endpoints, an increase may be experienced in the enablement of new use cases 92 (e.g., distributed and contextualized AI, real-time FaaS), reduced latency 904 (e.g., reduced response time, faster user experience), increased throughput 906 (e.g., coordinated distribution, load balancing, etc.), reduced total cost of ownership and traffic 908 (e.g., via improved endpoint or edge filtering, caching, etc.). However, as moving closer to the cloud data center, an improvement may be found in security 910 (e.g., via improved isolation, data protection), decreased physical restrictions 912 (e.g., power, space, security, and thermal constraints), reduced management maintenance 914, reuse capabilities for wired and wireless infrastructure 916, and more complex orchestration 918.

Figure 10:
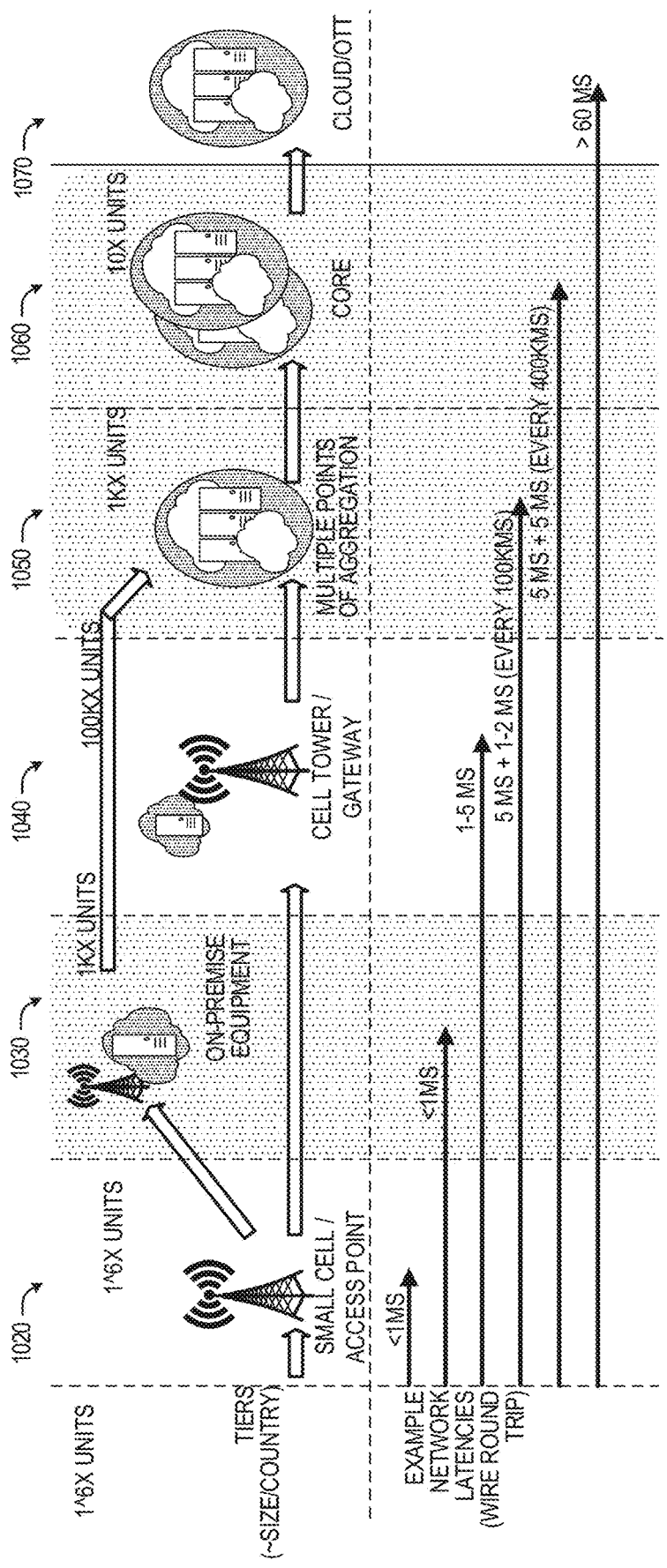
FIG. 10 illustrates deployments and latencies for edge computing among operational network layers.

These tradeoffs are magnified by characteristics of mobility and different types of communication networks. FIG. 10 illustrates operational deployments and latencies for edge computing among operational network layers, in a cellular (mobile) wireless network. Specifically, FIG. 10 illustrates an example of network latency occurring to respective mobile network layers 1020-1070 in an example country deployment, providing an example of round trip timings to a local layer 1020 (e.g., typically less than one ms to a small cell base station or access point), an on-premise layer 1030 (e.g., having on-premise equipment or cloudlets/edgelets, typically also under one ms), a base station layer 1040 (e.g., having a cell tower base station or other wireless network gateway, typically between 1-5 ms), an aggregation layer 1050 (e.g., having multiple aggregation servers or locations, typically between 5 ms plus 1-2 ms added for every 100 kilometers (KMs) of distance, a core network layer 1060 (e.g., having multiple core network servers or locations, typically between 5 ms plus 5 ms added for every 400 KMs of distance, based on currently used telecommunications technologies); and a cloud layer 1070 (e.g., having one or more cloud processing locations, typically exceeding 60 ms). Such latency times are provided for purposes of illustration only and may vary depending on the type of communication technology involved (although limited by the speed of light). The deployment of an edge cloud system (e.g., an implementation of edge cloud 1010) is discussed below with reference to layers 1020-1050.

Endpoint devices being used by the end user or accessible via the nearby local layer 1020 may be considered as the "far edge" devices. Devices in this scenario may provide the lowest latency possible. However, at some point, far edge devices may become compute limited or may not be power efficient as needed to perform a given task. For instance, at some point of network traffic load, AR/VR use cases will experience severe degradation (even to the point of providing a worse performance than executing the workload only at the far edge on the device itself).

On premise computing at the on-premise layer 1030 is a next potential tier of a low-latency network edge architecture. On premise refers to a location (typically within the customer premises) that may be able to host a certain amount of compute (from a small form factor rack to multiple racks). Such on-premise compute platforms may be owned and operated by the enterprise, cloud service provider, or a communications service provider.

Computing at a base station in the base station layer 1040 may aggregate multiple antennas, which in many cases may be hosted as a first potential edge from a Communication Service Provider perspective. Base stations may run virtual radio access network (e.g., vRAN) type of workloads to process 5G radio traffic. The main design challenges to run other services on the base station relate to: (1) limited space; (2) physical exposure that requires more security and better thermal solutions; (3) limited amount of power; (4) operating expense (OPEX) or total cost of ownership (TCO) derived from managing such a highly distributed compute environment. Having outlined the challenges of deploying services on the base station, it is important to emphasize that they are one of the unique points in the infrastructure that can still provide sub millisecond latencies.

Computing at a central office (CO) in the aggregation layer 1050 may serve as an aggregation point of multiple base stations within a local area. For instance, one CO may aggregate traffic from around 30 base stations. This number may vary depending on the country and population density. These central offices may then link to regional points of presence (POPs) (e.g., with wired, including optical, links) before connecting to a regional switch site. The CO may also bring together wireless and wireline services. The latencies to reach a CO satisfy many edge use cases (e.g., power, space, ease of management) which may make them a desirable location to place edge services. Central office or switching sites may also aggregate multiple central office connections.

Figure 11:
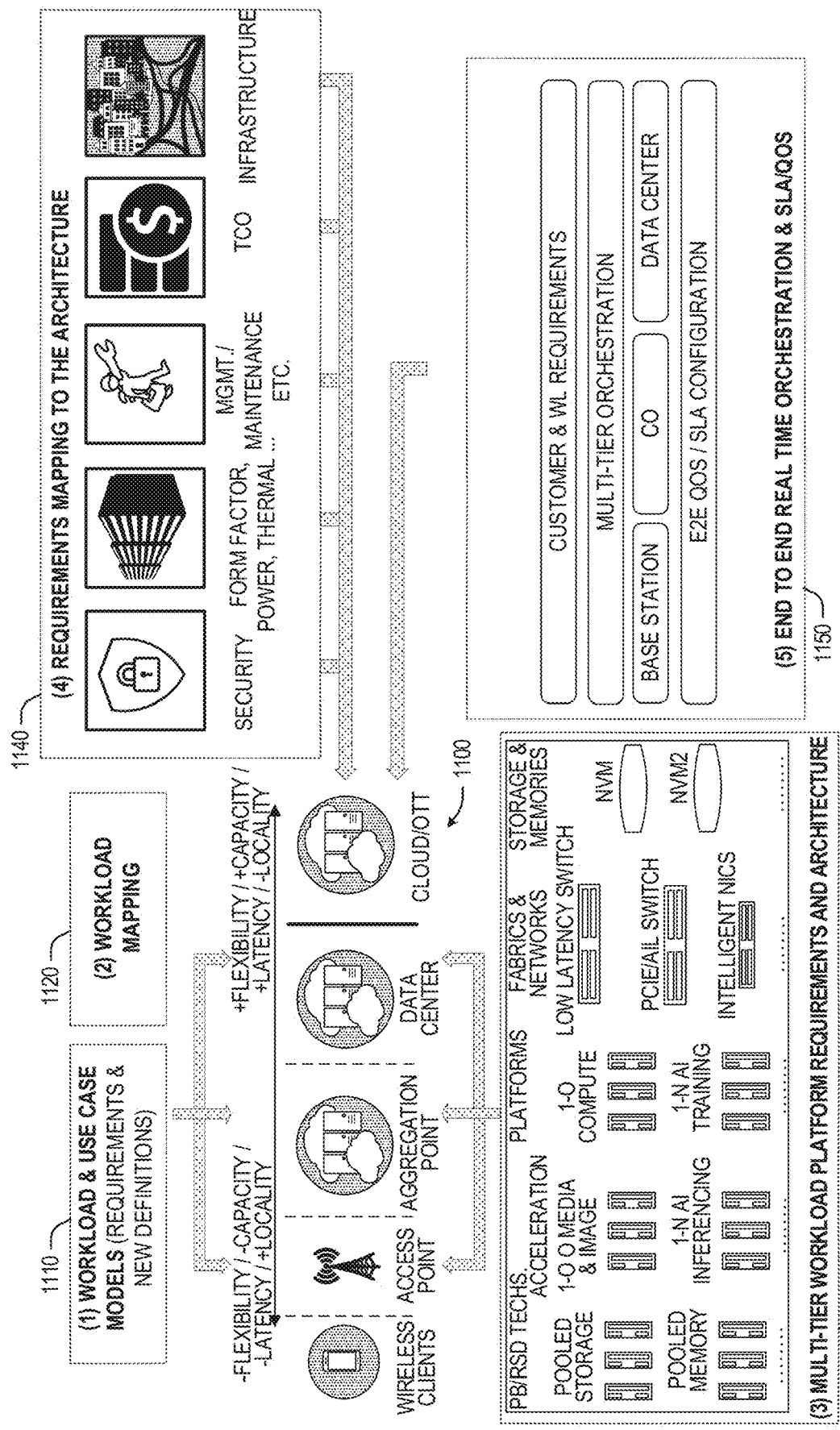
FIG. 11 illustrates workload deployments and mapping to operational layers of an edge computing system.

FIG. 11 illustrates workload deployments and mapping to operational layers (e.g., corresponding to layers 1020-1070) of an edge computing system 1100. Within this arrangement, multiple considerations and capabilities are evaluated for the location and type of workload execution among devices of the edge computing system 100, as various coordination is performed to bring the compute resources to the workload data, and bring the workload data to the compute resources. These considerations may include:

(1) Choosing the right platform architecture, rack design, or other hardware features or configurations, for short-term and long term usage (in addition to conducting an appropriate mapping of the services and workloads) depending on the restrictions of each of the locations (e.g., power, space, and platform security). Different options may be mapped to different architecture configurations.

(2) Determining what requirements originate from network or service operators will shape the architecture. This may indicate a platform architecture that satisfies operator requirements (e.g., capital expense vs. operating expense, form factors, security, and QoS).

(3) Determining the correct software architecture to manage, monitor and orchestrate the edge computing architecture. Without the right interfaces to orchestrate, complex distributed scenarios cloud architectures will not work. Furthermore, exposing appropriate abstractions and interfaces to the services to access to the hardware resources underneath is at the same level of criticality.

Based on these and other determinations, various workloads and use case models 1110 may be first mapped among locations of the edge computing system 1100 according to workload mapping definitions 1120. Such workload mapping definitions 1120 may identify platform requirements and architecture elements 1130 that can be deployed among the edge computing system 1100. Further, the workload mapping definitions 1120 may be based on requirements mapping 1140 addressing aspects such as security, physical constraints, management, cost, infrastructure restrictions and capabilities, and the like.

Further, the end-to-end considerations of the edge computing system 1100 may include evaluation of real time orchestration, service-level agreement (SLA), and QoS characteristics, as provided in definitions 1150. These definitions 1150 may be used to select the platform requirements and architecture elements 1130, rank or prioritize requirements mapping 1140, and ultimately change the workload mapping 1120. These considerations, recorded in the definitions 1150 or elsewhere, may reflect the following features:

(1) Latency used to provide a first key performance indicator (KPI) with a significant role in edge service location. Since the speed of light is approximately 300,000 km/s and transmission on the wire is ~⅔ of that a required response latency will determine how far from a device may be from the edge. For example, if some services require response latency of less than 4 ms they cannot be further than ~150 kms from the device. Thus, for some of the workloads (e.g., IoT device data processing) the unique edge definition may be only consumed by a base station, whereas others may be consumed by a central office;

(2) Data Privacy, sovereignty and sensitivity, used to determine compliance and verify operability. These considerations may dictate that some of the services can only reside on certain locations of the edge. For example, in the healthcare segment, some hospitals may want to host and share some services on the edge cloud but without having the data crossing certain boundaries of the infrastructure (e.g., equipment on premise, central office etc.);

(3) Reduction in backhaul traffic. Backhaul traffic data savings may be achieved by filtering traffic at the different edges of the network in order to reduce OPEX/TCO (as well as CAPEX as smaller bandwidth may be required on the backhaul network). In this case, filtering may happen at any of the different potential edges of the infrastructure. For example, video surveillance can be processed in the base station to identify what images are to be sent to the cloud or to the central office while the content delivery network may be placed into the central office.

(4) Enabling of new edge processing use cases: For example, a service on the edge that allows biometry authentication. Or, a service which enables payment to be done real-time via voice analysis as long as the reliability requirements are met.

(5) Definition and use of resource level trust, which allows for the authorization for access to capabilities across platforms and resources.

(6) Defining where the actual edge resides for a particular use case or workload is directly related to the KPI or value proposition that a particular location provides to it. For example, defining edge compute for execution of an IoT or AR/VR workload in the core of an operator infrastructure might be impossible to satisfy KPI requirements in terms of latency. Thus, the edge compute for this workload is located closer to the device (in the base station or a more local central office). On the other hand, edge compute for a content distribution network (CDN) (also known as a "content delivery network" or a "content defined network") workload may be located at a base station, central office or any other intermediate point of aggregation (POA or POP) of the operator infrastructure. In this case, to define what is the most suitable edge location, the associated OPEX/TCO may derive what is the best location for placing the CDN workload.

In further examples, advanced forms of workload mapping may be used in an edge computing system to map specific forms of compute activities to specific locations and systems (or types of systems and location capabilities, to more efficiently bring the workload data to available compute resources).

Figure 12:
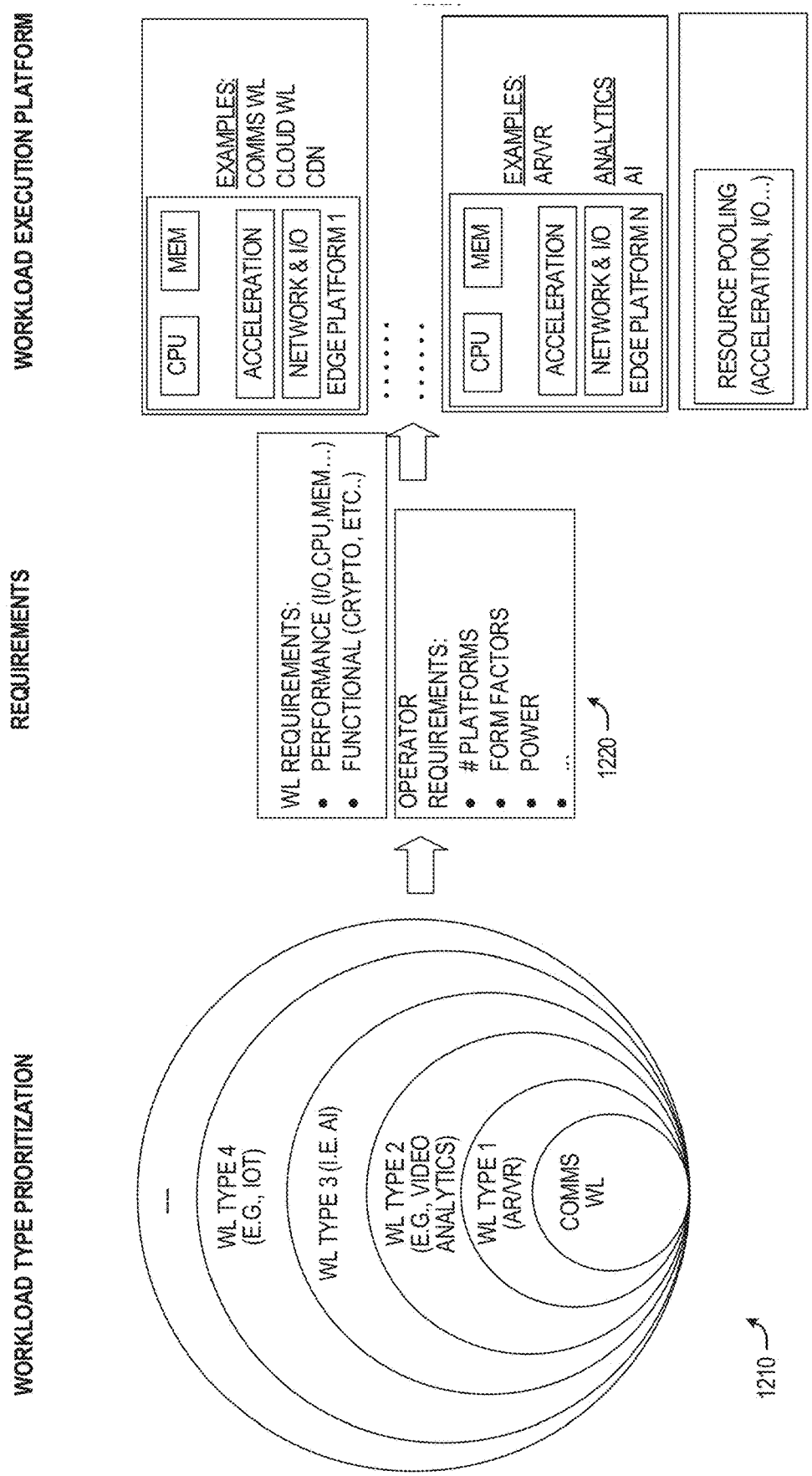
FIG. 12 illustrates workload type mapping to execution platforms in an edge computing system.

FIG. 12 illustrates workload type mapping to execution platforms in an edge computing system. As shown, a set of workload types 1210 progressively advance from a type classification indicating lowest priority and latency requirements of the workload (e.g., for IoT data processing) to a type classification indicating highest priority and latency requirements of the workload (e.g., for network communication functions) with intermediate type classifications (e.g., for AI workloads, video analytics workloads, AR/VR workloads). These workload types 1210 may be orchestrated in a multi-stakeholder, multi-tenant edge system according to the type classification.

The respective type classifications may be associated with sets of requirements 1220, which may specify workload requirements for the particular classification (e.g., performance requirements, functional requirements), as compared with operator requirements or constraints (available number of platforms, form factors, power, etc.). As result of the requirements 1220 for the invoked workload(s), a selection may be made for a particular configuration of a workload execution platform 1230. The configuration for the workload execution platform 1230 may be selected by identifying an execution platform from among multiple edge nodes (e.g., platforms 1 to N); by reconfiguring an execution platform within a configurable rack scale design system; or by reconfiguring an execution platform through pooling or combining resources from one or multiple platforms.

In addition to requirements and constraints provided from the mapping of workload types, other measurements or indicators may be used to select or configure an edge execution platform. For instance, mapping of services on a particular execution platform may consider: KPI performance benefits or user experience benefits (e.g., what latency is required to provide a good user experience for 360-degree video); OPEX/TCO (e.g., derived from placing a service into a particular location versus the expected monetization); SLA and service level objective (SLO) definitions; and the like. These considerations are balanced with operator concerns to manage the potential high cost of management among a distributed ecosystem and disparate hardware locations.

Figure 13:
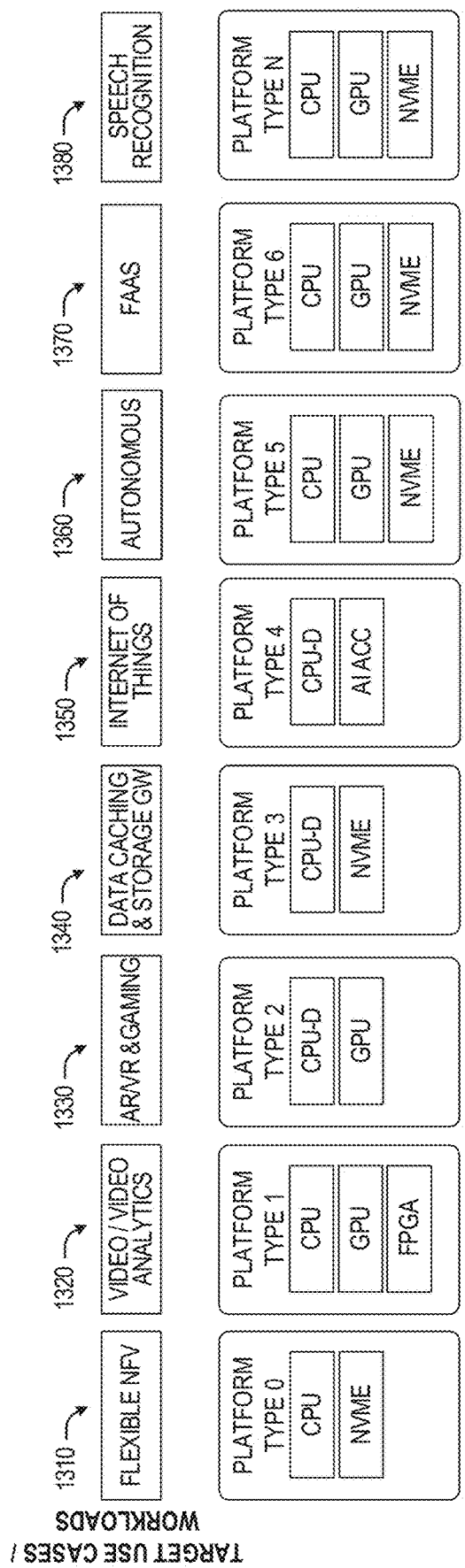
FIG. 13 illustrates further mapping of use cases and workloads to operational deployments of edge computing hardware configurations.

FIG. 13 illustrates further mapping of use cases and workloads to operational deployments of edge computing hardware configurations. Specifically, FIG. 13 shows how different workloads relevant to the edge cloud, each with varying requirements, applications and value propositions, may be deployed by service providers.

The various types of use cases and workloads may be mapped to different platform types, based on the selection or reconfiguration of hardware configurations. For example a flexible NFV workload 1310 may be mapped to a first platform type providing CPU and storage resources; a video processing or video analytics workload 1320 may be mapped to a second platform type providing low-power CPU and specialized GPU and FPGA processing; AR/VR and gaming workloads 1330 may be mapped to a third platform type providing CPU and storage resources; data caching and storage gateway workloads 1340 may be mapped to a fourth platform type providing low-power CPU and storage resources; internet of things processing 1350 may be mapped to a fifth platform type providing low-power CPU and AI acceleration resources; autonomous vehicle workloads 1360 and function-as-a-service workloads 1370 may be mapped to sixth and seventh platform types providing CPU, storage, and specialized GPU processing resources; speech recognition workloads 1380 may be mapped to an Nth platform type having CPU and storage resources, and specialized GPU processing; etc.

Different locations therefore may be usable across the edge cloud 110 to perform services management, as both compute resources are mapped to the workload data, and workload data instances are mapped to the compute resources. In a highly distributed architecture, the features are based on mapping services on the base station. In this case, the platform physical requirements in terms of power and space will mostly limit the amount of hardware that can be placed in this particular edge node. Furthermore, in order to get more service density, acceleration schemes such as hardware inference acceleration may be utilized. In a central office architecture, the architecture is less distributed but less power and space constrained according to the capabilities and servicing location of the central office. In this case, with fewer space and power constraints, the architectural solution can be more homogenous at the cost of sacrificing some degree of performance or service density.

It should be understood that initial workload mapping may not be effective for runtime activities during the life-cycle of the workload or in the construct of a workflow. Additional services that should be enabled are the workload assessment as a service, which can provide the assessment and reallocation of a workload based on over time characterization of the workload. Based on this, as suggested by the examples below, a workload may be migrated to another location or another hardware or system configuration in order to support the workload needs.

In further examples, various types of distribution, upgrade, and change architectures may be implemented to support software (and firmware and hardware feature) updates to implement workloads and edge computing services generally. Normally, a vendor of a computing platform is responsible for producing feature changes or security patches that apply to deployed platforms. A vendor typically does not enable other supply chain entities to develop firmware updates and/or allow another entity to apply them. This scenario may also apply in edge computing environments, although a distributed computing environment may enable new software distribution and upgrade dynamics. When a workload is dissected and distributed across a 'slice' or 'flavor' of resources spanning multiple platforms and therefore multiple administrators and vendors, considerations may be made on whether the user and orchestrator have enough control over which versions of what software/firmware.

In an example, a workload may be validated or simulated on a particular configuration and deployment 'flavor' where the simulation outcome may exhaustively depend on the firmware, software and other configuration parameters. In some cases, the security vulnerabilities in hardware, firmware, and software also predict how the workload execution behaves. However, if the environment used to validate and/or simulate the workload execution differs from the actual environment that executes it, then that differential represents added risk.

An edge computing ecosystem may be optimized for minimizing risk differential as a way to manage software, firmware, and hardware feature updates. A three phased approach to workload deployment can be utilized: (1) Setup a workload validation environment that identifies the execution environment dependencies. This considers which software models are required to process the workload application. This dependency graph is identified as part of a validation environment setup. Additionally, excess functionality presents an increased attack surface that adds runtime execution risk. These non-dependencies can be removed from the validation environment. (2) The simulation creates the actual environment needed to process the workload. It could involve use of simulated hardware, virtualization or simulated performance scenarios. The workload executes with an expectation of interacting with other workloads, orchestration, users, collaborations etc. The simulation ensures the operational corner cases are exposed. The simulation may also specify which versions of hardware, software, and firmware are used. These may be actual hardware, software, and firmware resources to better understand expected actual behavior. (3) The simulation environment is reproduced in a real-world deployment. The version of hardware, software, and firmware are adjusted appropriately. Possibly, this implies moving to a backward revision or passing over backward revisions to find and allocate resources according to the simulation defined environment. This may also involve removal of hardware, software, and firmware that isn't used by the workload.

Hardware Components

Figure 14A:
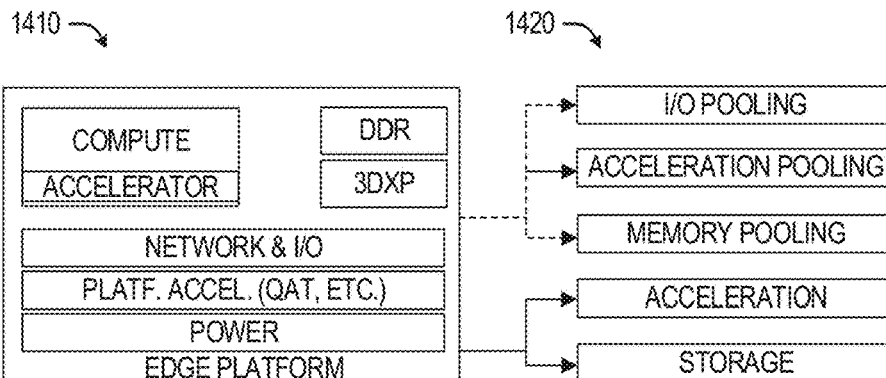
FIGS. 14A to 14C illustrates further examples of edge computing hardware configurations, based on operational objectives.

FIG. 14A illustrates a first edge computing hardware configuration, which maps various architectural aspects of an edge platform 1410 (e.g., compute hardware, network features, power management features, etc.) to specific edge platform capabilities 1420 (e.g., I/O pooling, acceleration pooling, memory pooling, acceleration technologies, storage capabilities). To offer the edge cloud configuration as an overall solution for services, then the workloads or basic hardware components for services and service requirements/constraints (e.g., network and I/O, platform acceleration, power) are considered in light of available architectural aspects (e.g., pooling, storage, etc.).

Within the edge platform capabilities 1420, specific acceleration types may be configured or identified in order to ensure service density is satisfied across the edge cloud. Specifically, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators; (3) Inferencing accelerators; (4) Crypto and compression related workloads (implemented such as in Intel® QuickAssist™ technology). Thus, the particular design or configuration of the edge platform capabilities 1420 can consider which is the right type of acceleration and platform product models that needs to be selected in order to accommodate the service and throughput density as well as available power.

Figure 14B:
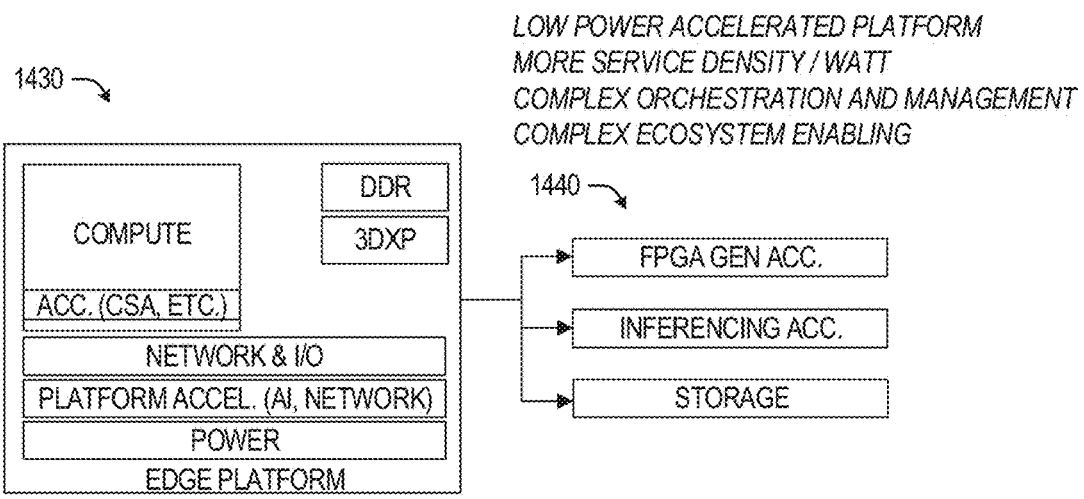

FIG. 14B illustrates a second edge computing hardware configuration, offering a second edge platform 1430 with a second set of edge platform capabilities 1440, and deployable for a low power but more service-dense solution. This approach is targeted to define a lower power solution which uses acceleration schemes in order to achieve better service density or service throughout per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt.

The platform capabilities 1440 may be designed to be favorable in terms of power envelope as well in terms of physical space. As a result, the configuration of FIG. 14B may provide a suitable target for base station deployments. However, the platform capabilities 1440 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 14C:
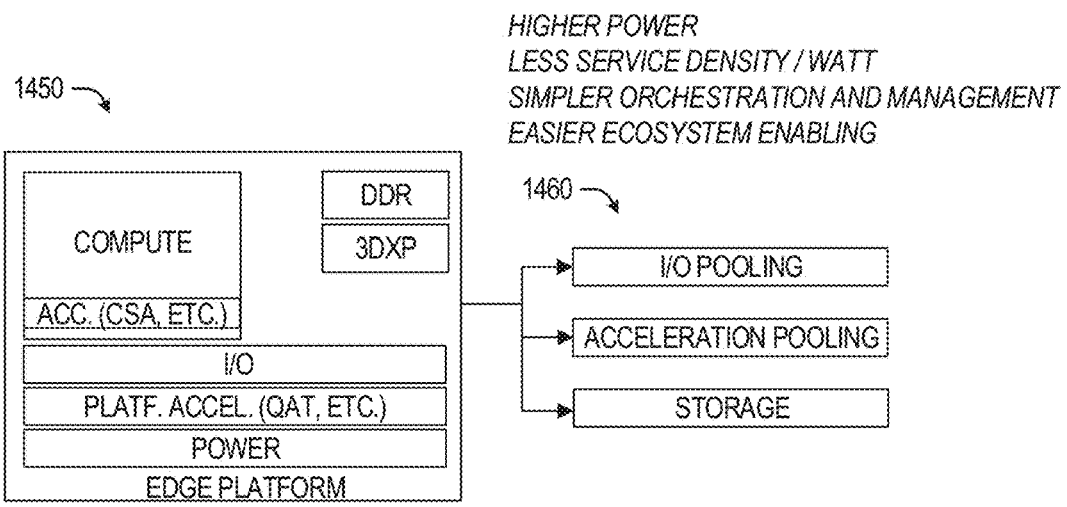

FIG. 14C illustrates a third edge computing hardware configuration, offering a third edge platform 1450 with a second set of edge platform capabilities 1460 offering a high power yet homogenous and generic architecture. FIG. 14C provides an approach that is opposite as compared FIG. 14B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 1460 may implement general purpose acceleration (such as in the form of FPGAs).

Other derivative functions of the edge platforms depicted in FIGS. 14A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

In further examples, any of the compute nodes or devices discussed with reference to the present edge computing systems and environment may be fulfilled based on the components depicted in FIGS. 15A and 15B. Respective edge nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 15A:
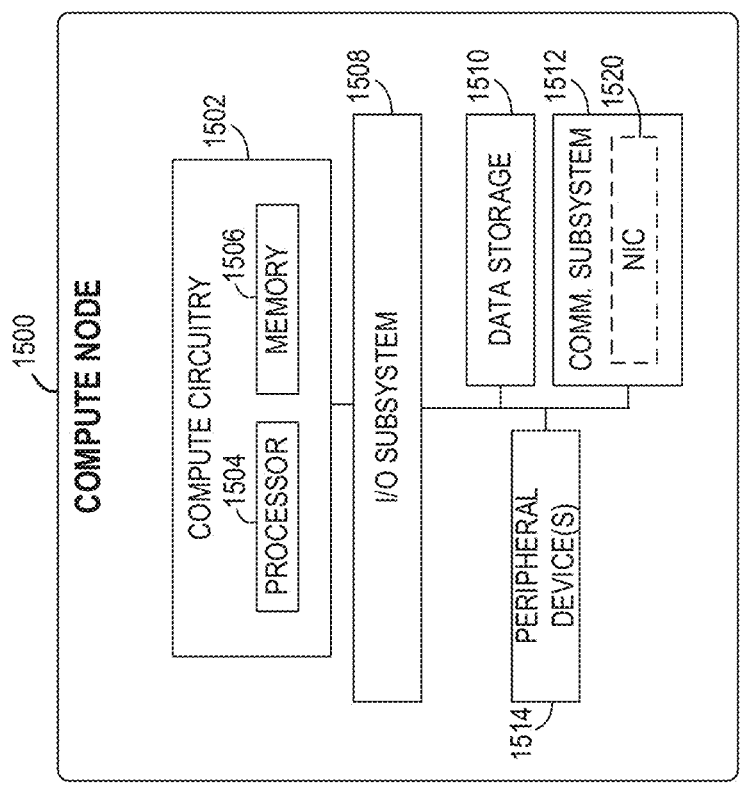
FIG. 15A provides an overview of example components for compute deployed at a compute node in an edge computing system.

In the simplified example depicted in FIG. 15A, an edge node 1500 includes a compute engine (also referred to herein as "compute circuitry") 1502, an input/output (I/O) subsystem 1508, data storage 1510, a communication circuitry subsystem 1512, and, optionally, one or more peripheral devices 1514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1500 may be embodied as any type of engine, device, or collection of devices capable of performing various compute functions. In some examples, the compute node 1500 may be embodied as a single device such as an integrated circuit, an embedded system, a field-programmable gate array (FPGA), a system-on-a-chip (SOC), or other integrated system or device. In the illustrative example, the compute node 1500 includes or is embodied as a processor 1504 and a memory 1506. The processor 1504 may be embodied as any type of processor capable of performing the functions described herein (e.g., executing an application). For example, the processor 1504 may be embodied as a multi-core processor(s), a microcontroller, or other processor or processing/controlling circuit. In some examples, the processor 1504 may be embodied as, include, or be coupled to an FPGA, an application specific integrated circuit (ASIC), reconfigurable hardware or hardware circuitry, or other specialized hardware to facilitate performance of the functions described herein.

The main memory 1506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1506 may be integrated into the processor 1504. The main memory 1506 may store various software and data used during operation such as one or more applications, data operated on by the application(s), libraries, and drivers.

The compute circuitry 1502 is communicatively coupled to other components of the compute node 1500 via the I/O subsystem 1508, which may be embodied as circuitry and/or components to facilitate input/output operations with the compute circuitry 1502 (e.g., with the processor 1504 and/or the main memory 1506) and other components of the compute circuitry 1502. For example, the I/O subsystem 1508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1508 may form a portion of a system-on-a-chip (SoC) and be incorporated, along with one or more of the processor 1504, the main memory 1506, and other components of the compute circuitry 1502, into the compute circuitry 1502.

The one or more illustrative data storage devices 1510 may be embodied as any type of devices configured for short-term or long-term storage of data such as, for example, memory devices and circuits, memory cards, hard disk drives, solid-state drives, or other data storage devices. Individual data storage devices 1510 may include a system partition that stores data and firmware code for the data storage device 1510. Individual data storage devices 1510 may also include one or more operating system partitions that store data files and executables for operating systems depending on, for example, the type of compute node 1500.

The communication circuitry 1512 may be embodied as any communication circuit, device, or collection thereof, capable of enabling communications over a network between the compute circuitry 1502 and another compute device (e.g., an edge gateway node 312 of the edge computing system 300). The communication circuitry 1512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1512 includes a network interface controller (NIC) 1520, which may also be referred to as a host fabric interface (HFI). The NIC 1520 may be embodied as one or more add-in-boards, daughter cards, network interface cards, controller chips, chipsets, or other devices that may be used by the compute node 1500 to connect with another compute device (e.g., an edge gateway node 312). In some examples, the NIC 1520 may be embodied as part of a system-on-a-chip (SoC) that includes one or more processors, or included on a multichip package that also contains one or more processors. In some examples, the NIC 1520 may include a local processor (not shown) and/or a local memory (not shown) that are both local to the NIC 1520. In such examples, the local processor of the NIC 1520 may be capable of performing one or more of the functions of the compute circuitry 1502 described herein. Additionally, or alternatively, in such examples, the local memory of the NIC 1520 may be integrated into one or more components of the client compute node at the board level, socket level, chip level, and/or other levels.

Additionally, in some examples, a respective compute node 1500 may include one or more peripheral devices 1514. Such peripheral devices 1514 may include any type of peripheral device found in a compute device or server such as audio input devices, a display, other input/output devices, interface devices, and/or other peripheral devices, depending on the particular type of the compute node 1500. In further examples, the compute node 1500 may be embodied by a respective edge node in an edge computing system (e.g., client compute node 302, edge gateway node 312, edge aggregation node 322) or like forms of appliances, computers, subsystems, circuitry, or other components.

Figure 15B:
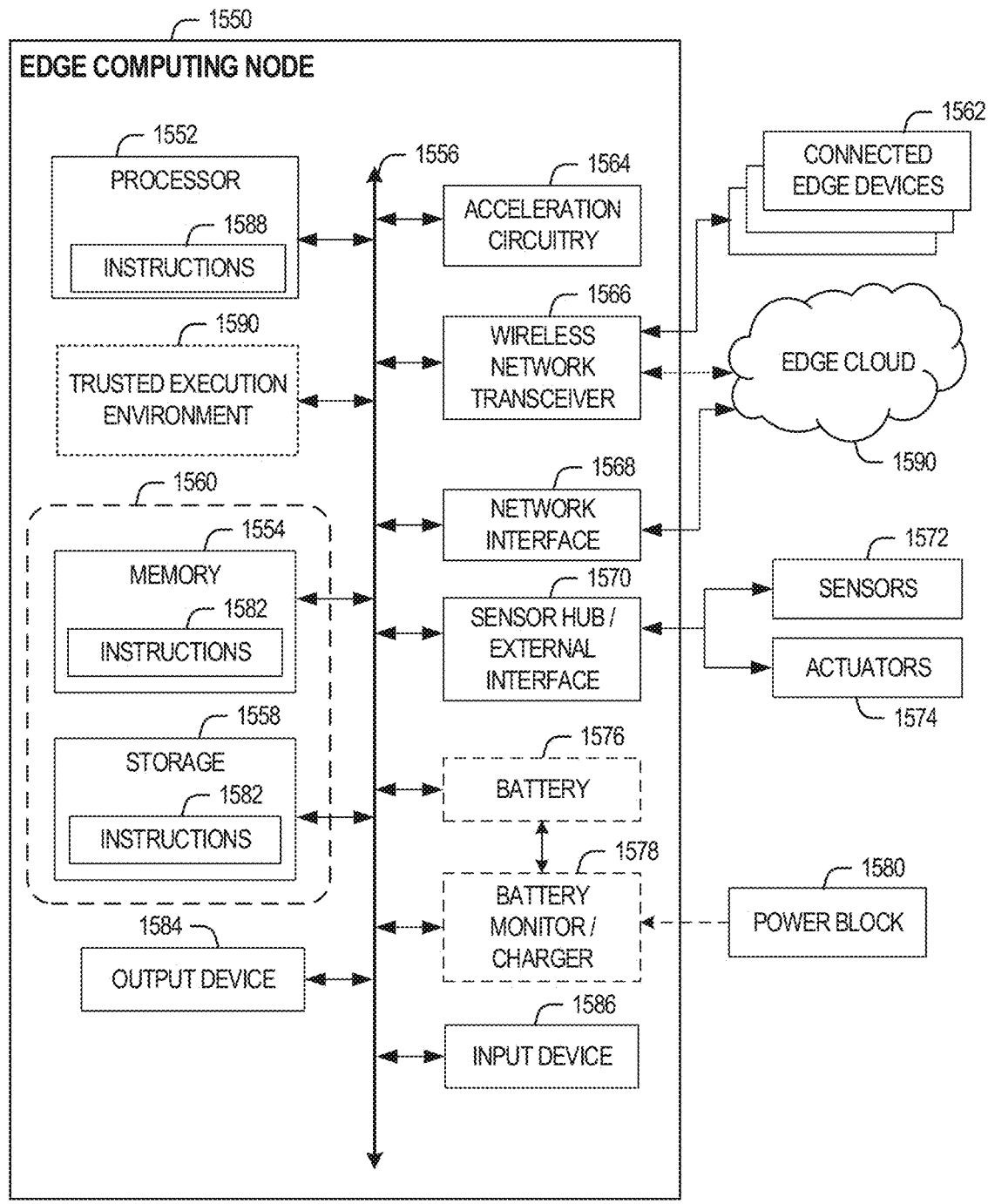
FIG. 15B provides a further overview of example components within a computing device in an edge computing system.

In a more detailed example, FIG. 15B illustrates a block diagram of an example of components that may be present in an edge node 1550 for implementing the techniques (e.g., operations, processes, methods, and methodologies) described herein. This edge node 1550 provides a closer view of the respective components of node 1500 when implemented as or as part of a computing device (e.g., as a mobile device, a base station, server, gateway, etc.). The edge node 1550 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge node 1550, or as components otherwise incorporated within a chassis of a larger system.

The edge computing device 1550 may include processing circuitry in the form of a processor 1552, which may be a microprocessor, a multi-core processor, a multithreaded processor, an ultra-low voltage processor, an embedded processor, or other known processing elements and/or one or more processors. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, Calif. As an example, the processor 1552 may include an Intel® Architecture Core™ based processor, such as a Quark™, an Atom™, an i3, an i5, an i7, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-

3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others. 8922

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an I2C interface, an SPI interface, point to point interfaces, and a power bus, among others.

The interconnect 1556 may couple the processor 1552 to a transceiver 1566, for communications with the connected edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the edge node 1550 may communicate with close devices, e.g., within about 10 meters, using a local transceiver based on BLE, or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1590 via local or wide area network protocols. The wireless network transceiver 1566 may be an LPWA transceiver that follows the IEEE 802.15.4, or IEEE 802.15.4g standards, among others. The edge node 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the edge cloud 1590 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The edge node 1550 may include or be coupled to acceleration circuitry 1564, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, global navigation system (e.g., GPS) sensors, pressure sensors, barometrics pressure sensors, and the like. The hub or interface 1570 further may be used to connect the edge node 1550 to actuators 1574, such as power switches, valve actuators, an audible sound generator, a visual warning device, and the like.

In some optional examples, various input/output (I/O) devices may be present within or connected to, the edge node 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge node 1550. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge node 1550, although, in examples in which the edge node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the edge node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge node 1550. A wireless battery charging circuit, such as an LTC4020 chip from Linear Technologies of Milpitas, Calif., among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine-readable medium 1560 including code to direct the processor 1552 to perform electronic operations in the edge node 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram (s) of operations and functionality depicted above. As used herein, the terms "machine-readable medium" and "computer-readable storage medium" are interchangeable.

In further examples, a machine-readable medium or computer-readable storage medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 15C:
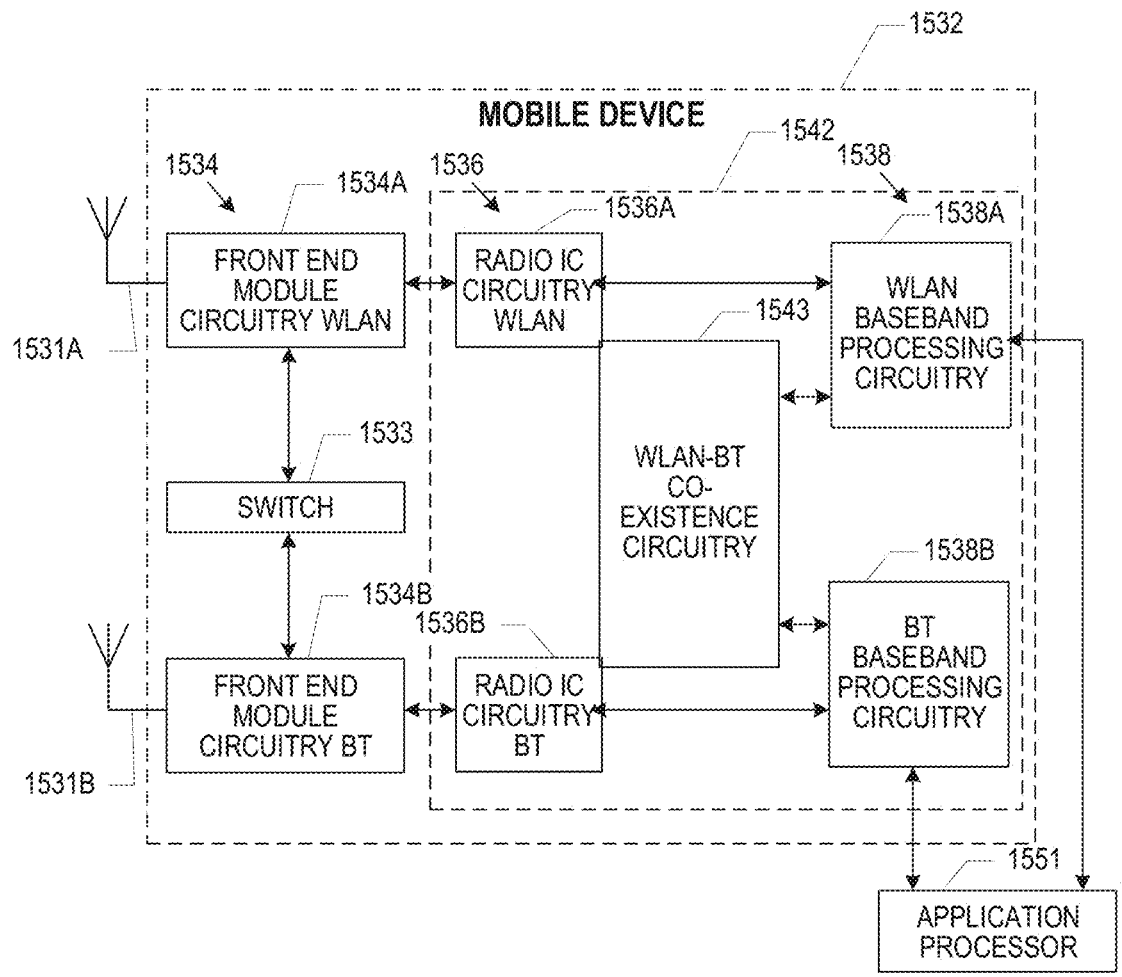
FIG. 15C provides a further overview of example components within a mobile computing device in an edge computing system.

FIG. 15C is a block diagram of communication components within an example mobile device 1532. This mobile device 1532 provides a closer view of the communication processing components of node 1500 or device 1550 when implemented as a user equipment or a component of a user equipment. The mobile device 1532 may include radio front-end module (FEM) circuitry 1534, radio IC circuitry 1536 and baseband processing circuitry 1538. The mobile device 1532 as shown includes both Wireless Local Area Network (WLAN) functionality and Bluetooth (BT) functionality although aspects of the device are not so limited, and other radio technologies discussed herein may be implemented by similar circuitry. FEM circuitry 1534 may include, for example, a WLAN or Wi-Fi FEM circuitry 1534A and a Bluetooth (BT) FEM circuitry 1534B. The WLAN FEM circuitry 1534A may include a receive signal path comprising circuitry configured to operate on WLAN RF signals received from one or more antennas 1531A, to amplify the received signals and to provide the amplified versions of the received signals to the WLAN radio IC circuitry 1536A for further processing. The BT FEM circuitry 1534B may include a receive signal path which may include circuitry configured to operate on BT RF signals received from one or more antennas 1531B, to amplify the received signals and to provide the amplified versions of the received signals to the BT radio IC circuitry 1536B for further processing. FEM circuitry 1534A may also include a transmit signal path which may include circuitry configured to amplify WLAN signals provided by the radio IC circuitry 1536A for wireless transmission by one or more of the antennas 1531A. In addition, FEM circuitry 1534B may also include a transmit signal path which may include circuitry configured to amplify BT signals provided by the radio IC circuitry 1536B for wireless transmission by the one or more antennas 1531B. In the example of FIG. 15C, although FEM 1534A and FEM 1534B are shown as being distinct from one another, aspects of the present disclosure are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1536 as shown may include WLAN radio IC circuitry 1536A and BT radio IC circuitry 1536B. The WLAN radio IC circuitry 1536A may include a receive signal path which may include circuitry to down-convert WLAN RF signals received from the FEM circuitry 1534A and provide baseband signals to WLAN baseband processing circuitry 1538A. BT radio IC circuitry 1536B may in turn include a receive signal path which may include circuitry to down-convert BT RF signals received from the FEM circuitry 1534B and provide baseband signals to BT baseband processing circuitry 1538B. WLAN radio IC circuitry 1536A may also include a transmit signal path which may include circuitry to up-convert WLAN baseband signals provided by the WLAN baseband processing circuitry 1538A and provide WLAN RF output signals to the FEM circuitry 1534A for subsequent wireless transmission by the one or more antennas 1531A. BT radio IC circuitry 1536B may also include a transmit signal path which may include circuitry to up-convert BT baseband signals provided by the BT baseband processing circuitry 1538B and provide BT RF output signals to the FEM circuitry 1534B for subsequent wireless transmission by the one or more antennas 1531B. In the example of FIG. 15C, although radio IC circuitries 1536A and 1536B are shown as being distinct from one another, aspects of the present disclosure are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1538 may include a WLAN baseband processing circuitry 1538A and a BT baseband processing circuitry 1538B. The WLAN baseband processing circuitry 1538A may include a memory, such as, for example, a set of RAM arrays in a Fast Fourier Transform or Inverse Fast Fourier Transform block (not shown) of the WLAN baseband processing circuitry 1538A. Each of the WLAN baseband circuitry 1538A and the BT baseband circuitry 1538B may further include one or more processors and control logic to process the signals received from the corresponding WLAN or BT receive signal path of the radio IC circuitry 1536, and to also generate corresponding WLAN or BT baseband signals for the transmit signal path of the radio IC circuitry 1536. Each of the baseband processing circuitries 1538A and 1538B may further include physical layer (PHY) and medium access control layer (MAC) circuitry, and may further interface with application processor 1551 (or, in other examples, processor circuitry 1550) for generation and processing of the baseband signals and for controlling operations of the radio IC circuitry 1536.

Referring still to FIG. 15C, according to the illustrated aspects, WLAN-BT coexistence circuitry 1543 may include logic providing an interface between the WLAN baseband circuitry 1538A and the BT baseband circuitry 1538B to enable use cases requiring WLAN and BT coexistence. In addition, a switch 1533 may be provided between the WLAN FEM circuitry 1534A and the BT FEM circuitry 1534B to allow switching between the WLAN and BT radios according to application needs. In addition, although the antennas 1531A, 1531B are depicted as being respectively connected to the WLAN FEM circuitry 1534A and the BT FEM circuitry 1534B, aspects of the present disclosure include within their scope the sharing of one or more antennas as between the WLAN and BT FEMs, or the provision of more than one antenna connected to each of FEM 1534A or 1534B.

In some aspects of the present disclosure, the front-end module circuitry 1534, the radio IC circuitry 1536, and baseband processing circuitry 1538 may be provided on a single radio card. In other aspects, the one or more antennas 1531A, 1531B, the FEM circuitry 1534 and the radio IC circuitry 1536 may be provided on a single radio card. In some other aspects of the present disclosure, the radio IC circuitry 1536 and the baseband processing circuitry 1538 may be provided on a single chip or integrated circuit (IC).

Figure 15D:
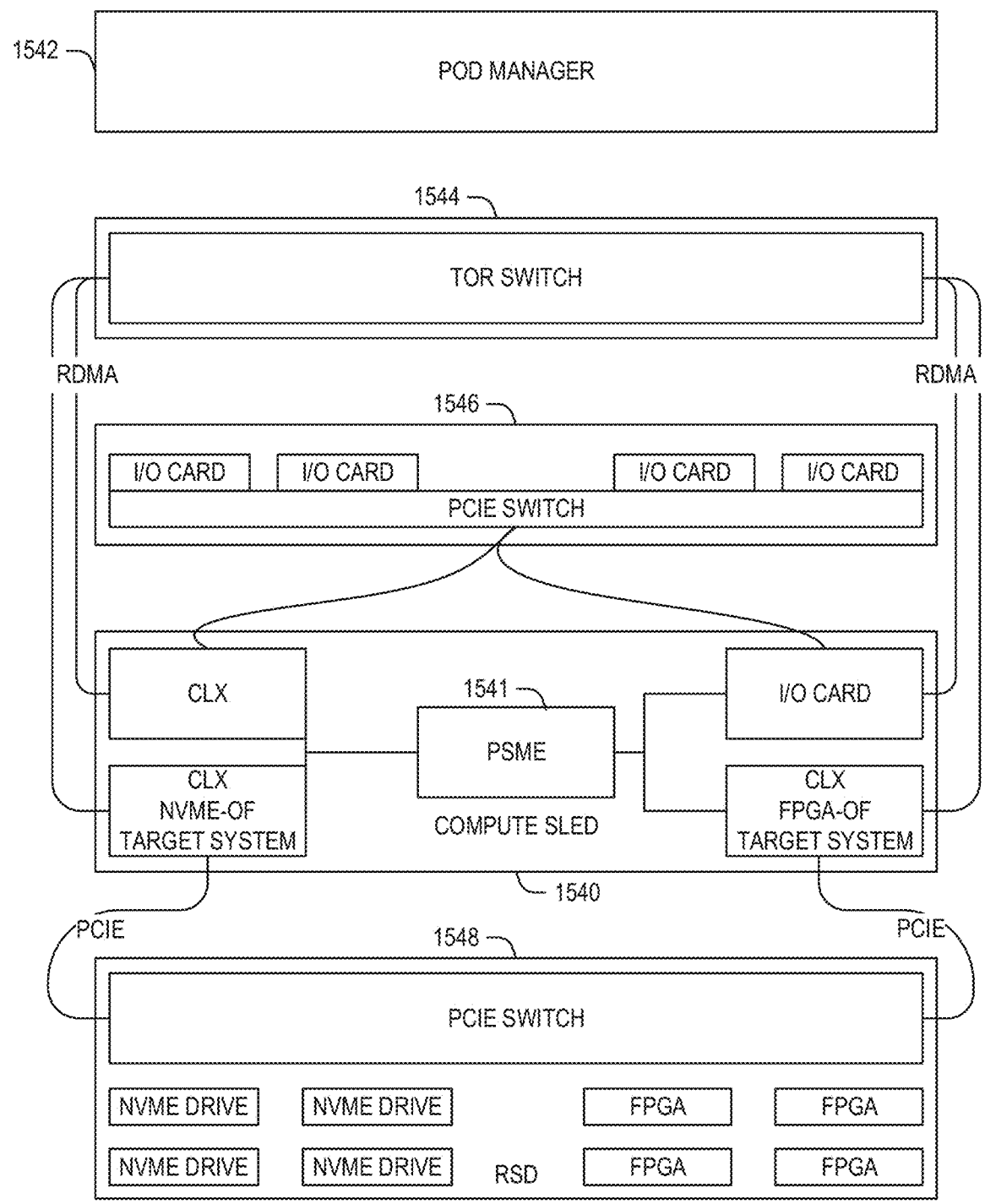
FIG. 15D provides a further overview of example components within a configurable server rack in an edge computing system.

FIG. 15D illustrates Rack Scale Design (RSD) components that may be included a part of a server or other discrete compute node in an edge platform architecture. This arrangement provides a closer view of the configurable processing components of node 1500 or device 1550 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible network functions. This architecture enables scaling network interfaces according to the expected data rate or network load for a particular virtual network function (VNF). This architecture also enables flexibility to map different network cards to compute nodes depending on the type of network processing happening at a given node.

The illustrated RSD architecture includes a point of delivery (POD) Manager 1542. The POD Manager 1542 is responsible of managing the resources—including compute and disaggregated resources—within a POD (e.g., one or more racks). The POD Manager 1542 exposes interfaces to an orchestrator in order to create, manage, or destroy composed nodes. Managing a composed node includes the feature of scaling up or down the amount of pooled resources 1548 connected to a particular compute sled 1540. The POD Manager 1542 typically runs on a node controller. The POD Manager 1542 is responsible for discovery of resources in the POD, configuring and managing the resources, and composing a logical server. In an example, the POD Manager 1542 is an optional separate component and will not be required in-rack. However, in an example, to be "RSD conformant" a Rack is manageable by a certified POD Manager.

The following are some example attributes of a POD Manager 1542. For example, a rack may include a set of compute sleds 1540 used to execute edge services and other related system software stacks (e.g., such as orchestration or other system services). One type of compute sled 1540 may be a Pooled Resources Sled. This compute sled 1540 may manage a set of disaggregated resources. Here, a compute sled 1540 may include a pooled System Management Engine software (PSME) 1541. The PSME 1541 provides a management interface to manage the modules or blades at a drawer level. In an example, a rack contains one or more logical PSME(s). For example, each drawer may have a PSME or server drawers may share a PSME, or a PSME may run on a top-of-rack (TOR) 1544 switch or on a separate host. In an example, the PSME 1541 supports the RSD APIs.

In an example, the compute sled 1540 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 1546 providing access to the target resources (FPGA or NVME in the RSD 1548).

Various RSD edge-composed node flavors may be used in the compute sled 1540 to run edge services. Services running on those nodes may use client software libraries or drivers to provide transparent access to the disaggregated FPGAS and NVME in the RSD 1548. In a further example, the rack includes one or more PCIE switches connecting the compute sleds 1540 to a set of disaggregated resources (e.g., RSD 1548).

The block diagrams of FIGS. 15A, 15B, 15C, and 15D are intended to depict a high-level view of components of a varying device, subsystem, or arrangement of an edge node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 15A-15C and 15A-15D may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

Use Cases for Edge Computing Systems

Edge computing meets several value propositions and key performance indicators (KPI) for many types of use cases and deployments involving multi-system compute operations (multi-tenant, multi-user, multi-stakeholder, multi-device, etc.). These value propositions enable improved response latency, increased security, lower backhaul traffic, all while enabling new use cases.

Defining where the actual computing edge "resides" for a particular use case or workload is directly related to the KPI or value proposition that a particular location provides to it. For example, defining a compute edge for an IoT or augmented reality/virtual reality (AR/VR) workload in the core of the operator infrastructure does not satisfy its KPI requirements in terms of latency. Thus, the compute edge for this workload is located closer to the device (such as in the base station or central office, bringing the compute resources closer to the workload data). On the other hand, a computing edge for a CDN workload may be hosted at a base station, at a central office, or at any other intermediate point of aggregation (POA or POP) of the operator infrastructure.

Devices being used by the end user (or meshes of devices) may be considered as the far edge devices, but many also offer some compute edge capabilities. Devices in this scenario may provide the lowest latency possible and may serve in types of mesh or connected IoT networks. However, at some point end devices may become compute limited or may not be power efficient as needed to perform a given task. For instance, at some point of network traffic load, the AR/VR user will experience severe degradation (even to the point of providing a worse performance than executing the workload in the far edge on the device itself).

Top priorities for edge computing among various network layers include central office (telecom) functionality, video on demand/content data network serving, Media Analytics, Live Streaming/Transcoding, and AV/VR including online gaming. Central office workloads may include, for example, SDN/NFV for converged footprint and new service models. Video on demand/content data network workloads may include, for example, streaming, surveillance, alarm systems, building access, and the like. Live Streaming/Transcoding may include, for example, enhanced user experience (UX) such as live streaming from social networking applications. AR/VR workloads may include, for example, real-time retail, gaming networks, etc. Media analytics (including both audio and video) may also be extensively deployed within edge deployments. These workloads constitute another important pillar used in many of the aforementioned workloads (such as surveillance, AR etc.).

In addition to these priorities, other use cases may be enabled within the edge cloud. In-memory databases (IMBD) are becoming more relevant in the design on edge computing deployments. Their target utilization is to serve online transaction processing (OLTP, to handle small transaction processing requests—such as small reads or writes) and online analytical processing (OLAP, to handle larger analytic processing requests—such as bigger data set queries and compute tasks). These two types of workloads are mostly mapped to network analytics to improve infrastructure management or other type of analysis or data storage (such as IoT).

Enterprise and government use cases also may be enabled within the edge cloud. In this case, some of the enterprise customers are looking potentially edge deployment as potential ways to improve some of their own processes. Examples of this are thin clients. Thin clients can move across the edge infrastructure as the employees of a given enterprise move across the geography in order to provide a low latency access to the thin clients.

Use cases related to Industry 4.0 initiatives may also be enabled. This may be improved by virtualization in manufacturing—such as with use cases for ultra-reliable low latency communications via 5G. Such communications may allow TSP providers to offer more complete solutions for both industrial workloads and localized 5G networking.

Healthcare is another area where, as technology evolves and security technologies become more mature, hospitals and other healthcare institutions will use the edge cloud to securely store and process healthcare related data. In this setting, the edge cloud will facilitate resource sharing, and assist with reducing CAPEX and OPEX/TCO costs.

Another use case area that may be enabled via the edge cloud includes V2V, V2X, and other type of advanced driver assistance system (ADAS) workloads. As automotive technologies become more mature, the edge cloud will enable communication between devices as well as a means for users inside the edge to access to edge services (V2X).

The following sections lay out many different example workload use cases relevant for edge clouds, along with their requirements, example applications, and value propositions for third-party service providers. These sections are broadly classified into the following areas: Data Caching, Video/Video Analytics, NFV, RAN, Augmented Reality/Virtual Reality (AR/VR), Vehicle Driving and Assistance, Internet of Things (IoT), Industry Applications, Gaming, Accelerated Browsing, and Speech Analytics. However, it will be understood that some edge cloud use cases or architectures may be relevant under multiple or other categories.

Figure 16:
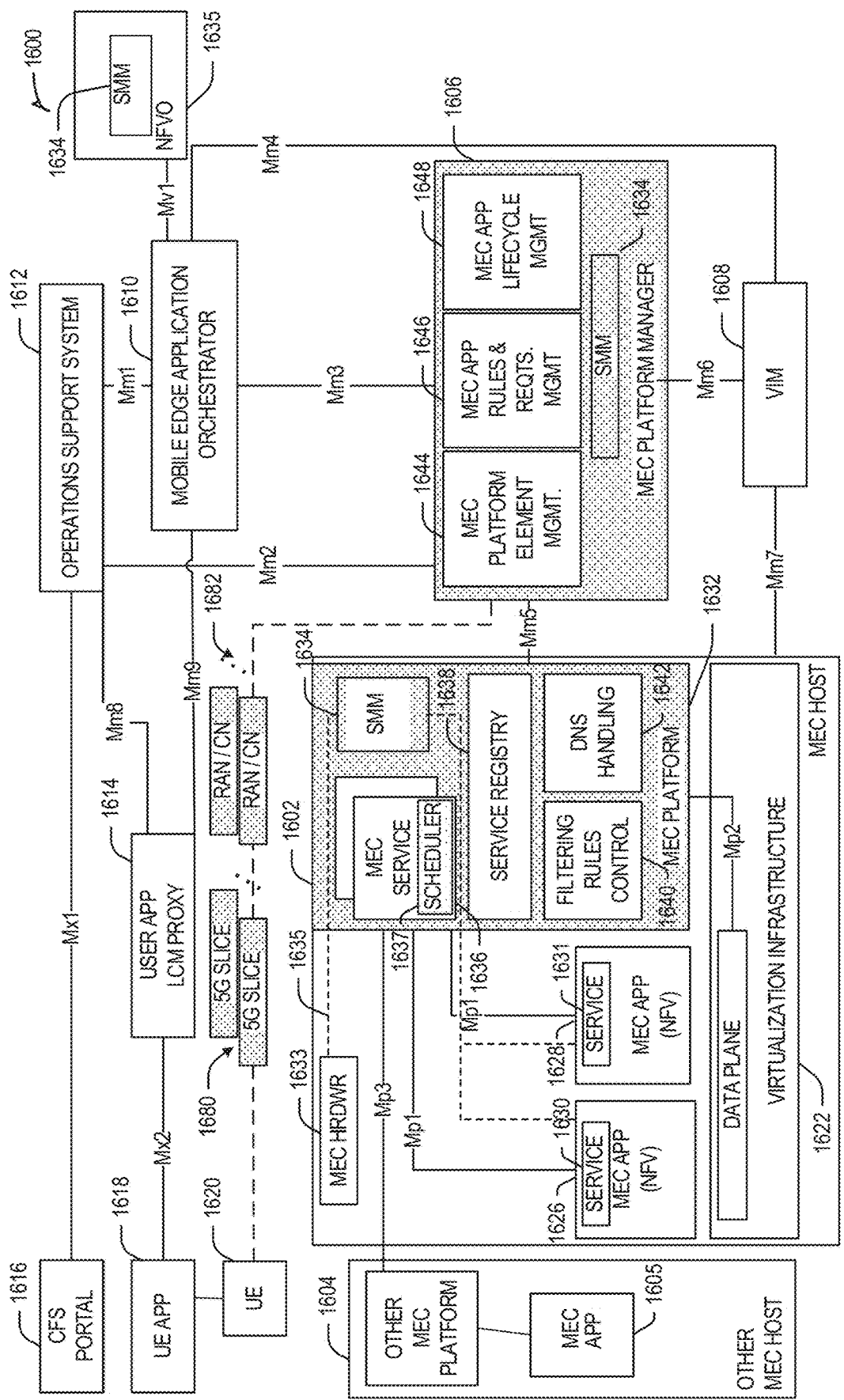
FIG. 16 illustrates a MEC network architecture supporting slice management, resource management, and traceability functions, deployable from an example edge computing system.

FIG. 16 illustrates a MEC network architecture 1600 supporting slice management, resource management, and traceability functions. FIG. 16 specifically illustrates a MEC architecture 1600 with MEC hosts 1602 and 1604 providing functionalities in accordance with the ETSI GS MEC-003 specification, with the shaded blocks used to indicate processing aspects for the MEC architecture configuration described herein in connection with slice management, resource management, and traceability functions. Specifically, enhancements to the MEC platform 1632 and the MEC platform manager 1606 may be used for providing slice management, resource management, and traceability functions within the MEC architecture 1600. This may include provisioning of one or more network slices, dynamic management of resources used by the network slices, as well as resource traceability functions within the MEC architecture.

In a further example, every entity in a MEC architecture could be instrumented to load an LSM or other security policy, and be an enforcement point for security operations. Operational and management entities can be tasked with provisioning of LSMs according to various ways resources are allocated to users, workloads, tenants, domains, uServices, functions, hosting environments.

Referring to FIG. 16, the MEC network architecture 1600 can include MEC hosts 1602 and 1604, a virtualization infrastructure manager (VIM) 1608, an MEC platform manager 1606, an MEC orchestrator 1610, an operations support system 1612, a user app proxy 1614, a UE app 1618 running on UE 1620, and CFS portal 1616. The MEC host 1602 can include a MEC platform 1632 with filtering rules control component 1640, a DNS handling component 1642, service registry 1638, and MEC services 1636. The MEC services 1636 can include at least one scheduler 1637, which can be used to select resources for instantiating MEC apps (or NFVs) 1626 and 1628 upon virtualization infrastructure 1622. The MEC apps 1626 and 1628 can be configured to provide services 1630 and 1631, which can include processing network communications traffic of different types associated with one or more wireless connections (e.g., connections to one or more RAN or telecom-core network entities).

The MEC platform manager 1606 can include a MEC platform element management component 1644, MEC app rules and requirements management component 1646, and a MEC app lifecycle management component 1648. The various entities within the MEC architecture 1600 can perform functionalities as disclosed by the ETSI GS MEC-003 specification.

In some aspects, the UE 1620 can be configured to communicate to one or more of the telecommunication core networks 1682 via one or more of the network slices 1680. In some aspects, the telecommunication core networks 1682 can use slice management functions (e.g., as provided by a slice management module, or SMM, 1634) to dynamically configure slices 1680, including dynamically assign a slice to a UE, reassign a slice to a UE, dynamically allocate or reallocate resources (including MEC resources) used by one or more of the slices 1680, or other slice related management functions. One or more of the functions performed in connection with slice management can be initiated based on user requests (e.g., via a UE) or request by a service provider. In some aspects, the slice management functions in connection with network slices 1680 can be facilitated by E2E multi-slice support functions for MEC-enabled 5G deployments, provided by the SMM 1634 within the MEC host 1602 or the MEC platform manager 1606 (or within another MEC entity).

In some aspects, the SMM 1634 can be within an NFV orchestrator (NFVO) 1635, which can be coupled to the MEC orchestrator 1610, as well as to other MEC entities.

Figure 17:
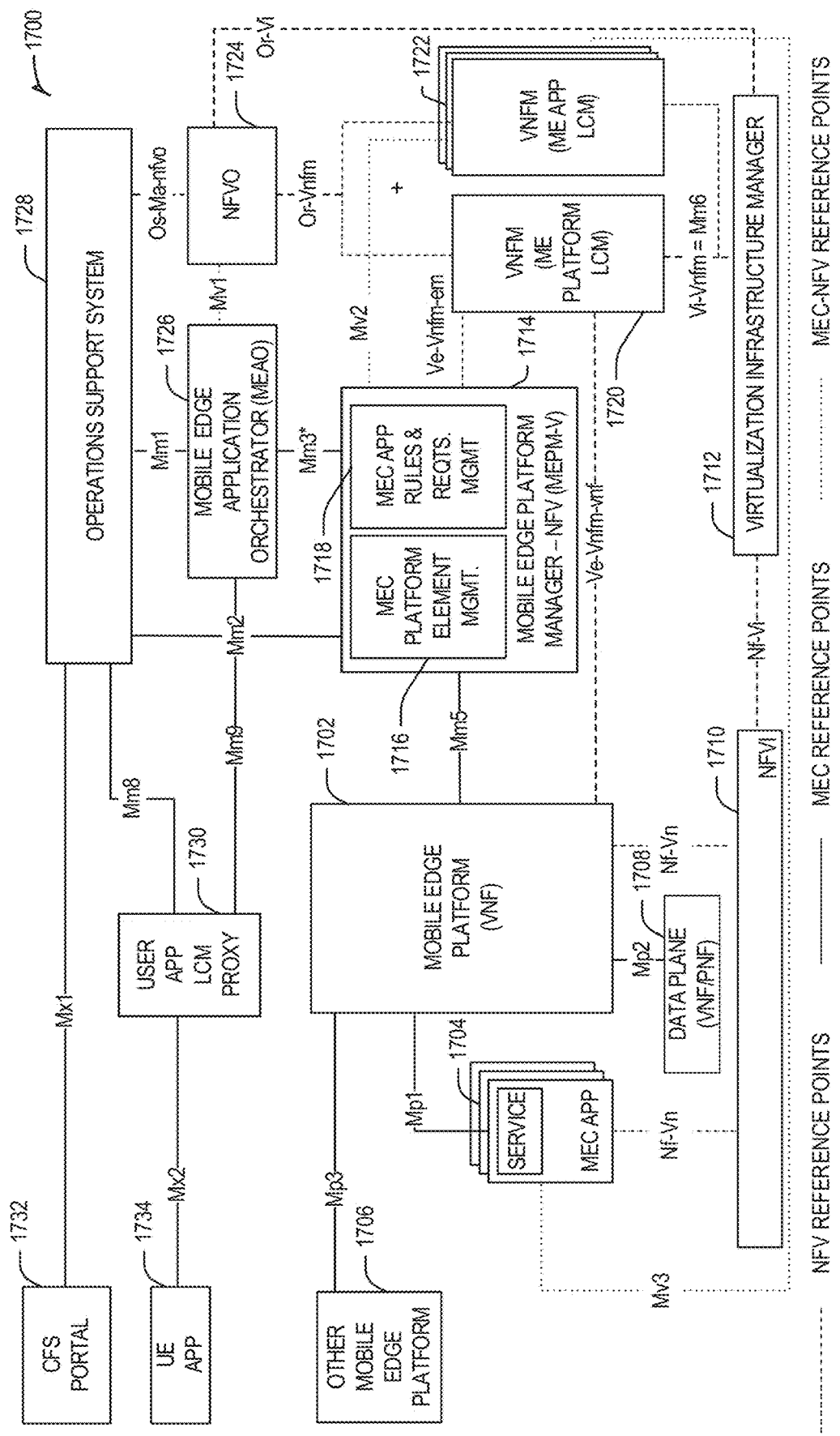
FIG. 17 illustrates a MEC reference architecture in a Network Function Virtualization (NFV) environment, deployable from an example edge computing system.

FIG. 17 illustrates a MEC reference architecture 1700 in a Network Function Virtualization (NFV) environment. The MEC architecture 1700 can be configured to provide functionalities in accordance with the ETSI GR MEC-017 specification.

In some aspects, ETSI MEC can be deployed in an NFV environment as illustrated in FIG. 17.

The MEC reference architecture 1700 includes a mobile edge platform 1702, a mobile edge platform manager 1714, a data plane 1708, a network function virtualization infrastructure (NFVI) 1710, virtual network function managers (VNFMs) 1720 and 1722, and NFVO 1724, a mobile edge application orchestrator (MEAO) 1726, an operations support system 1728, a user app LCM proxy 1730, a UE app 1734, and a CFS portal 1732. The mobile edge platform manager 1714 can include a MEC platform element management 1716 and MEC app rules and requirements management 1718. In some aspects, the mobile edge platform 1702 can be coupled to another mobile edge platform 1706 via an MP3 interface.

In some aspects, the MEC platform 1702 is deployed as a virtualized network function (VNF). The MEC applications 1704 can appear like VNFs towards the ETSI NFV Management and Orchestration (MANO) components. This allows re-use of ETSI NFV MANO functionality. In some aspects, the full set of MANO functionality may be unused and certain additional functionality may be needed. Such a specific ME application is denoted by the name "ME app VNF" as discussed herein. In some aspects, the virtualization infrastructure is deployed as an NFVI and its virtualized resources are managed by the virtualized infrastructure manager (VIM) 1712. For that purpose, one or more of the procedures defined by ETSI NFV Infrastructure specifications, e.g., ETSI GS NFV-INF 003, ETSI GS NFV-INF 004, and ETSI GS NFV-INF 005 can be used.

In some aspects, the ME application (or app) VNFs 1704 will be managed like individual VNFs, allowing that a MEC-in-NFV deployment can delegate certain orchestration and Life Cycle Management (LCM) tasks to the NFVO 1724 and VNFM functional blocks 1720 and 1722, as defined by ETSI NFV MANO.

In some aspects, the Mobile Edge Platform Manager (MEPM) 1714 can be transformed into a "Mobile Edge Platform Manager-NFV" (MEPM-V) that delegates the LCM part to one or more virtual network function manager (s) (VNFM(s)) 1720 and 1722. The Mobile Edge Orchestrator (MEO), as defined in the MEC reference architecture ETSI GS MEC-003, can be transformed into a "Mobile Edge Application Orchestrator" (MEAO) 1726 that uses the NFVO 1724 for resource orchestration, and for orchestration of the set of ME app VNFs as one or more NFV Network Services (NSs).

In some aspects, the Mobile Edge Platform VNF, the MEPM-V 1714, and the VNFM (ME platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mp1 reference point between a ME application and the ME platform can be optional for the ME application, unless it is an application that provides and/or consumes a ME service In some aspects, the Mm3* reference point between MEAO 1726 and the MEPM-V 1714 is based on the Mm3 reference point, as defined by ETSI GS MEC-003. Changes may be configured to this reference point to cater for the split between MEPM-V and VNFM (ME applications LCM).

In some aspects, the following new reference points (Mv1, Mv2, and Mv3) are introduced between elements of the ETSI MEC architecture and the ETSI NFV architecture to support the management of ME app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the ME app VNFs with the MEPM-V to allow LCM related notifications to be exchanged between these entities; it is related to the Ve-Vnfm-em reference point as defined in ETSI NFV, but may possibly include additions, and might not use all functionality offered by Ve-Vnfm-em); Mv3 (this reference point connects the VNF Manager with the ME app VNF instance, to allow the exchange of messages (e.g., related to ME application LCM or initial deployment-specific configuration); it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each ME app VNF with the NFVI); Nf-Vi (this reference point connects the NFVI and the VIM); Os-Ma-nfvo (this reference point connects the OSS and the NFVO. It is primarily used to manage NSs, e.g., a number of VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

Figure 18:
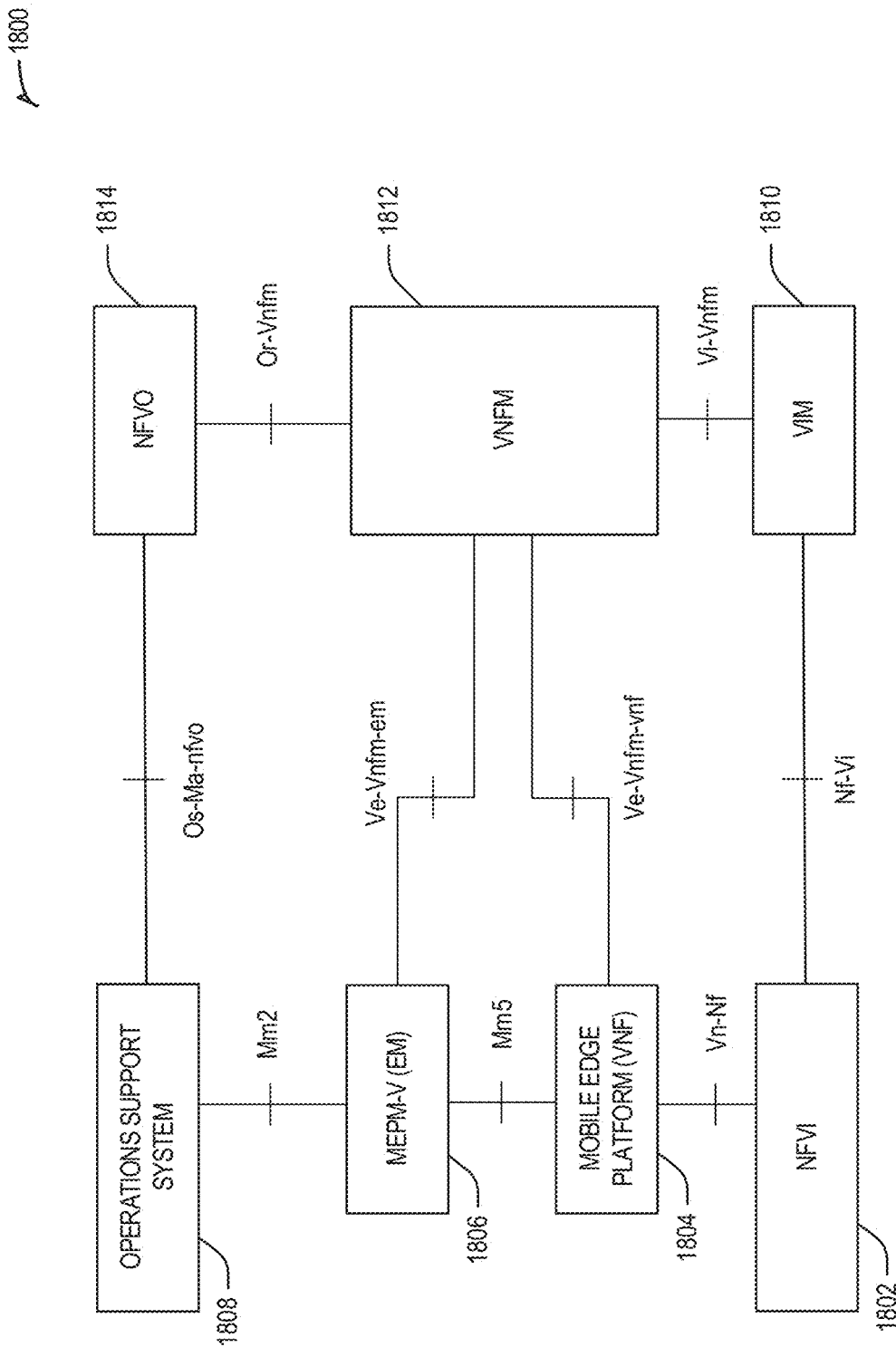
FIG. 18 illustrates the management of a MEC platform as a virtualized network function (VNF), deployable from an example edge computing system.

FIG. 18 illustrates the management of a MEC platform as a virtualized network function (VNF). Referring to FIG. 18, diagram 1800 illustrates management components from the MEC reference architecture 1800 in an NFV environment. More specifically, diagram 1800 illustrates the operations support system 1808, the MEPM-V 1806, the mobile edge platform 1804, the NFVI 1802, the NFVO 1814, the VNFM 1812, and the VIM 1810.

In some aspects, the MEPM-V 1806 can be configured to function as the Element Manager (EM) of the ME platform VNF 1804. In some aspects, a VNF Manager (VNFM) 1812, according to ETSI NFV (e.g., Specific VNFM, Generic VNFM), is used to perform LCM of the ME platform VNF 1804.

Diagram 1800 further illustrates the following reference point connects between the management components 1802-1814, as defined by ETSI NFV:

Ve-Vnfm-em: this reference point connects the VNF Manager (VNFM) that manages the lifecycle of the ME platform with the Mobile Edge Platform Manager-NFV (MEPM-V). The Ve-Vnfm-em reference point can be as defined in ETSI NFV. Since the Mobile Edge Platform VNF is considered as a network function, it is not expected that there are any impacts to the Ve-Vnfm-em procedures as defined by ETSI NFV.

Ve-Vnfm-vnf: this reference point connects the VNFM that manages the lifecycle of the ME platform with the Mobile Edge Platform VNF. The Ve-Vnfm-vnf reference point can be as defined in ETSI NFV. Since the Mobile Edge Platform VNF is considered as a network function, it is not expected that there are any impacts to the Ve-Vnfm-vnf procedures as defined by ETSI NFV.

Nf-Vn: this reference point connects the Mobile Edge Platform VNF and the NFVI. Nf-Vi: this reference point connects the NFVI and the VIM. Os-Ma-nfvo: this reference point connects the OSS and the NFVO. It is primarily used to manage NSs, e.g., a number of VNFs connected and orchestrated to deliver a service. Or-Vnfm: this reference point connects the NFVO and the VNFM that manages the lifecycle of the ME platform. It is primarily used for the NFVO to invoke VNF LCM operations. Vi-Vnfm: this reference point connects the VIM and the VNFM that manages the lifecycle of the ME platform. It is primarily used by the VNFM to invoke resource management operations to manage the cloud resources that are needed by the VNF. Or-Vi: this reference point connects the NFVO and the VIM. It is primarily used by the NFVO to manage cloud resources capacity.

In some aspects, 5G adoption depends on the ability to provide TSPs the ability to provision, manage, adjust, and operate multiple virtual networks over a common set of physical (wireless and wired) network infrastructure. End-to-end "slices" carve out virtual logical networks using physical computing and network resources. Each slice can be specifically configured to support performance related to the service supported including capacity, security levels, geographical coverage, and latency. Slices included partitioning the wireless radio of Radio Access Network (RAN), telecommunication system core infrastructure including the Evolved Packet Core (EPC), as well as the switches and Data Center Servers where the 5G mobile applications and content may be hosted. Furthermore, 5G EDGE devices may also be included in the slice depending on the service latency requirements.

In some aspects, 5G network slices will support a wide range of applications from (semi-)autonomous vehicles, remote health monitoring and first-responder applications requiring the best security/traceability to tiered smartphone plans and IoT devices that may be ok without extra resource traceability.

In some aspects, the information elements required to perform the disclosed interactions are complex and dynamic and must be access-controlled. It may be visualized as a resource graph (e.g., visualizing which CPUs, memories, bandwidth, I/O, storage systems, network nodes), which resources are owned by which actor, the state of allocation (of a resource) to a particular service instance. However, for security, not all parts of this "graph" are equally visible to each actor. The elements are stored in different slices; communication between slices and thus blockchain is based on policies and rights settings, which are dynamic in nature. In some aspects, AI techniques disclosed herein can be used to infer/predict SLA impacts to the network operator resources and the enterprise SLAs, including the price of resourcing at the time of request for transfer of resourcing.

A need exists for improved Quality-of-Service (QoS) for application providers of mobility related use-cases, such as, for example with respect to the provision of services or workloads in vehicular networks, and for improved efficiencies for infrastructure providers underpinning such services or workloads.

Network service/workload delivery according to the state of the art is typically based on signal strength (i.e. closer stations have higher signal strengths), via a configurable mechanism that considers pertinent attributes of the requesting/connecting device and of the network infrastructure that serves the device. In other words, features or attributes of the mobile device such as speed, vector of request and features of the servicing infrastructure such as capacity, processing capability, and link capability typically form the input to the orchestration algorithm.

Orchestration of services, such as radio services, according to the state of the art is typically made on a platform of a compute node (e.g. on a physical device or modem of a compute node) without any knowledge by the compute node of available edge computing system resources apart from signal strength/availability discernable by the platform of the compute node. Telecommunications companies are therefore aiming to add more capacity and bandwidth to edge gateway nodes to provide the ability to onboard requested services more efficiently. However, the state of the art could be optimized more effectively.

Embodiments aim to augment network service/workload delivery by establishing novel orchestration functions within an edge computing system so as to achieve an improvement with respect to the state-of-the-art overall system utilization (such as 5G state of the art overall system utilization), and an improvement, as compared to the state of the art, in terms of reducing the time to establish a connection with a physical infrastructure device of an edge computing system in order to receive a service. Embodiments use information regarding the individual features/attributes of edge computing system resources such as access layer physical infrastructure devices and of clients requesting services or workloads within the edge computing system as input in the context of orchestration of the requested services/workloads.

Some embodiments encompass extending/configuring the above to further take into consideration other influential attributes of an edge computing system to achieve other orchestration functions, such as, by way of example, instructing an autonomous device to change its route.

Some embodiments advantageously result in an eight-fold improvement over 5G state-of-the-art in overall system utilization, and/or a 2-fold improvement in time to establish connection measurement as compared with the state of the art.

The current approach of orchestrating services or workloads within a compute node computing system was devised long before the current rise in data consumption and network speed requirements. The state of the art orchestration method tends towards oversubscription of networks, for example by increasing the number of subscriptions in a short period of time, as suggested by way of example in FIG. 19 graph (a) described further below. Current methods aiming to solve the problem of service orchestration for a MEC use case do not base workload orchestration on the combination of attributes noted and described in the context of embodiments herein.

Figure 19:
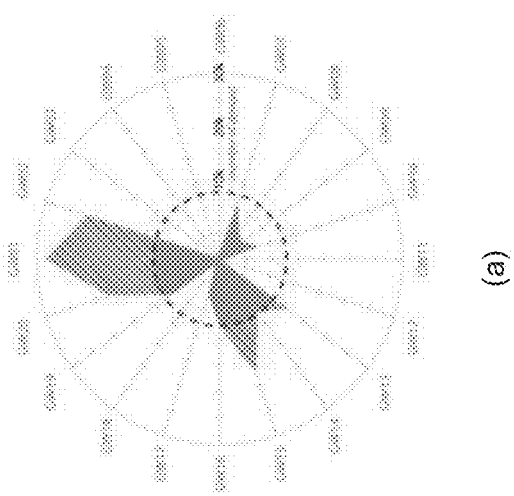
FIG. 19 illustrates three graphs (a), (b) and (c) plotting system use versus edge computing system capacity for a state of the art scenario (a), for an optimized orchestration scenario according to an embodiment (b), and for a breaking point scenario (c)

In particular, FIG. 19 depicts three graphs (a), (b) and (c) showing example plots of utility or system use (shown by way of the shaded areas) versus edge computing system capacity (shown by way of dotted lines) for a state of the art scenario (a), for an optimized orchestration scenario according to an embodiment using 100K service-requesting clients of the edge computing system (b), and for a breaking point scenario using 136K service-requesting clients of the edge computing system (c). FIG. 19 shows the number of physical edge gateway devices GW at the perimeter of each circle of graphs (a) through (c). FIG. 19 suggests an advantage of embodiments in terms of an optimized orchestration/management of resource utilization and capacity across available gateways in an edge computing system while meeting service/workload QoS goals.

Embodiments provide a novel orchestration mechanism and associated algorithm to be implemented by a compute node of an edge computing system, such as a MEC edge computing system. The novel orchestration mechanism and associated algorithm may use one or more movement-related attributes of a plurality of service-requesting clients, such as a physical acceleration and/or a movement vector (including a speed and direction) of the plurality of service-requesting clients, in combination with resource-related attributes of the services being requested, and resource-related attributes of the physical infrastructure devices of the edge computing system (such as edge gateway node devices, edge aggregation node devices, access points, base stations, etc.) with resources and processing capacity capable of providing the requested services, as combined input into a comparative utility function/algorithm at the compute node. The utility function according to some embodiments is to be used by the compute node to implement an optimized assignment of respective physical infrastructure devices, per requested service, to respective ones of the service-requesting clients.

As can be seen from the results plotted in the graphs of FIG. 19 described above, some embodiments can results in an eight-fold improvement in utilization due to optimized workload placement at the respective physical infrastructure devices by way of a managed use optimization of the edge computing system's assets, and a two-fold improvement in the time it takes to make a decision regarding workload placement in an edge computing system.

An algorithm according to some demonstrative embodiments allows the implementation of decision making regarding workload placement at respective selected physical infrastructure devices of an edge computing system. Algorithms according to some embodiments may be used in the context of, for example, autonomous cars or drones as clients. Algorithms offer improved quality of service/workload (QoS), in some embodiments with an eight-fold increase in a network congestion threshold of an edge computing system. Such congestion can be significant with respect to its impact on the QoS of a workload deployment, especially for applications such as those involving autonomous cars or drones where network response time is crucial.

Embodiments aim to improve the QoS with respect to physical infrastructure devices that are to deploy services to clients, some of which are in motion. Such services could include radio communication services, video streaming or any other services. Embodiments encompass an optimized selection of physical infrastructure devices within an edge computing system in order to achieve an optimized QoS for services being requested, taking into consideration location and movement features of the service-requesting clients. Embodiments therefore solve a problem of determining where within the available infrastructure of the edge computing system to onboard a moving client to give that client an optimized QoS based on the location and speed of that moving client, and further based on the features of the service. According to some embodiments, whether or not a client is a "moving client" may be based on a speed of the client, for example classifying a "non-moving client" as a client whose speed is zero, or a client is speed is below a given threshold/negligible based on application needs.

Some embodiments implement an association of service-requesting clients with respective selected physical infrastructure devices of an edge computing system based on, among other things, location and movement attributes of the service-requesting clients, resource-related attributes of the services being requested, and the location-related attributes and resource-related attributes of physical infrastructure devices of the edge computing system.

With respect to a selected physical infrastructure device for a given service to be provided to a service-requesting client requesting that service, the selected physical infrastructure device may correspond to a spatially nearest physical infrastructure device that further has the resources to fulfill the service request, or to a spatially near physical infrastructure device that further has the best resources to fulfill the service request.

A physical infrastructure device may correspond to physical instantiation of an "access edge layer" as described above in the Terminology section above of the instant disclosure. A physical infrastructure device may include a radio enabled device of the edge computing system, and/or a device that is a single network hop away from the service-requesting device in the edge computing system. A physical infrastructure device may further include a devices that are multiple network hops away from the service-requesting client. A computing node according to some embodiments may serve as an orchestrator that understands what physical infrastructure devices of the edge computing system are closest to a service-requesting client or group or subgroup of service-requesting clients and have the resources to deliver the requested services.

Advantages of some embodiments include, by way of example, a reduction in infrastructure cost, a reduction in the number of migrations of workloads between physical infrastructure devices, and faster decision making with respect to a selection of physical infrastructure devices that are to provide the requested services.

In particular, with respect to reducing infrastructure costs, using an algorithm according to some embodiments leads to an improvement in the distribution of workloads to optimize resource utilization to the benefit/profit of both the consumer (who gains better QoS) and the service provider (who gets more capacity from available infrastructure or who can reduce costs by deploying less infrastructure in the first instance).

With respect to a reduction in the number of migrations of workloads between physical infrastructure devices, some algorithms according to embodiments use specific attributes including speed and direction of travel of service-requesting clients for optimally selecting physical infrastructure devices that are placed along appropriate physical communication paths relative to each one of the service-requesting clients. A pre-provisioning/reservation of destination physical infrastructure devices' capabilities (such as compute capacity, power, etc.) according to some embodiments also helps to reduce the need for the migration of services from one node to the other which typically has to occur when a selection of destination compute nodes has not been optimized, such as according to the current state of the art.

With respect to faster decision making, embodiments shorten the time needed to establish a wireless connection with the physical infrastructure devices as compared with connections made according to the state of the art.

Details of some demonstrative embodiments will now be addressed below.

Figure 20:
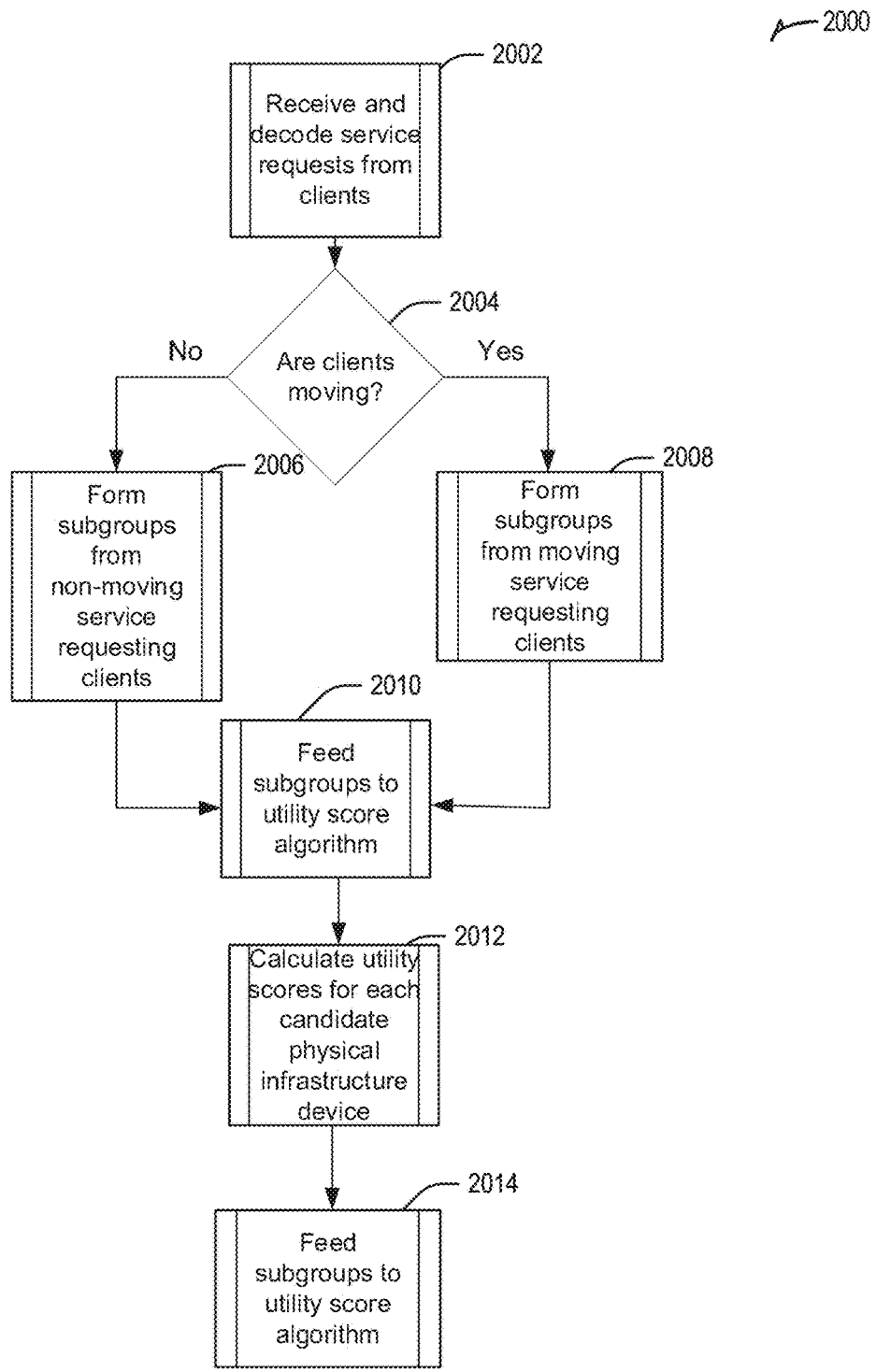
FIG. 20 illustrates a workload optimization flow according to some embodiments.

In FIG. 20, a basic workload optimization method 2000 is shown according to some embodiments.

At process 2002 of method 2000, a compute node receives a plurality of service requests from respective service-requesting clients of an edge computing system. The service requests may be broadcast, and may include metadata. Each of the service requests may include a unique identifier (ID) of the service-requesting client. Each of the service requests may specify a service being requested by a service-requesting client. Each of the service requests may further specify one or more of the following: a compute resource capacity $R_c$ for the service being requested, a storage resource capacity $R_s$ for the service being requested, a network resource capacity $R_n$ for the service being requested, current physical coordinates $X_{R1}$ of the service-requesting client, anticipated future physical coordinates of the service-requesting client $X_{R2}$, an acceleration a of the service-requesting client, and a vector-related attribute V of the service-requesting client which may include information on a vector of movement of the service-requesting client, or on a speed and direction of travel of the service-requesting client (from which the vector of movement of the service-requesting client may be determined). The current physical coordinates $X_{R1}$ of the service-requesting client, anticipated future physical coordinates $X_{R2}$ of the service-requesting client, and the vector-related attribute V, and acceleration of the service-requesting client are examples of location-related attributes and movement-related attributes of the service-requesting client. The compute resource capacity $R_c$ for the service being requested, the storage resource capacity $R_s$ for the service being requested, and the network resource capacity $R_n$ for the service being requested are examples of resource-related attributes for the service being requested. According to another embodiment, information concerning one or more of the location-related attributes and movement-related attributes of the service-requesting client and/or one or more of the resource-related attributes of for service being requested may be provided to the compute node by way of data sent to the compute node by way of edge nodes other than the service-requesting client. The compute node and/or the network may determine spatial coordinates of a service-requesting client, such as XYZ coordinates, and or a speed and direction of movement of a service-requesting client, and may make predictions regarding the movement path and anticipated future coordinates of the service-requesting client.

Referring still to FIG. 20, once the service requests are received at the compute node by way of process 2002, the compute node may determine, at decision 2004, whether each of the service-requesting clients is a moving client or a non-moving client. The compute node may make decision 2004 based on location-related attributes and movement-related attributes of the service-requesting clients, for example, by determining whether $X_{R1}=X_{R2}$ and/or whether $X_{R1} \approx X_{R2}$ and/or whether attribute V has a value of zero to classify a service-requesting client as a non-moving service-requesting client. Therefore, movement-related attributes as used herein is not to necessarily denote actual movement per se, but rather a measure of movement, whether that movement be non-existent (for a non-moving service-requesting device) or whether that movement be apt for further processing for example by referring to change in physical coordinates, velocity and/or acceleration. On the other hand, location-related attributes as used herein is to refer to physical location coordinates.

At processes 2006 and 2008, for the shown method 2000, the compute node may classify the service-requesting clients into groups, for example based on whether they are non-moving service-requesting clients or moving service-requesting clients.

At both processes 2006 and 2008, for the non-moving service-requesting clients and for the moving service-requesting clients, the compute node may classify the service-requesting clients into subgroups based on the resource-related attributes (or payload size) of the services that the service-requesting clients are requesting. For example, the compute node may further classify the non-moving service-requesting clients of the non-moving group and/or the moving service-requesting clients of the moving group based on the values of one or more of the $R_c$'s, $R_s$'s and $R_n$'s of the services that each of the service-requesting clients are requesting. In the case of payload size, we assume the load is equal to a minimum capacity step where a maximum capacity is equal to 100.

At process 2006, the compute node may classify the non-moving service-requesting clients into subgroups based on their physical coordinates, such as, for example, $X_{R1}$ and $X_{R2}$ (with $X_{R1}$ equal to or substantially equal to $X_{R2}$) grouping together those non-moving service-requesting clients whose coordinates are within a certain predetermined distance with respect to one another. At process 2006, according to one embodiment, the non-moving service-requesting clients may first be classified into subgroups based on their location related attributes (such as spatial coordinates), and then further classified into subgroups based on the resource-related attributes of the services they are requesting. At process 2006, according to another embodiment, the non-moving service-requesting clients may first be classified into subgroups based on the resource-related attributes of the services they are requesting, and then further classified into subgroups based on their location related attributes (such as spatial coordinates). According to a further embodiments, both the location related attributes and the resource related attributes may be otherwise combined in order to classify the non-moving service-requesting clients into subgroups.

At process 2008, for the moving service-requesting clients, the computing node may classify the moving service-requesting clients into subgroups based on their movement-related attributes, such as, for example, $X_{R1}$ coupled with one or more of $X_{R2}$, V, or service-requesting client acceleration. At process 2008, according to one embodiment, the moving service-requesting clients may first be classified into subgroups spatially according to their location-related attributes and movement-related attributes, and then further classified into subgroups based on the resource-related attributes of the services they are requesting. At process 2008, according to another embodiment, the moving service-requesting clients may first be classified into subgroups based on the resource-related attributes of the services they are requesting, and then further classified into subgroups spatially according to their location-related attributes and movement-related attributes. According to a further embodiments, both the location-related attributes and movement-related attributes and the resource related attributes may be otherwise combined in order to classify the moving service-requesting clients into subgroups.

The subgroupings achieved at processes 2006 and 2008 allow a faster decision process and therefore lower latency when the location-related attributes and resource-related attributes of candidate physical infrastructure devices to provide the requested services (i.e. physical infrastructure devices available to provide the requested services, such as physical infrastructure devices capable of radio communication with the given service-requesting client and/or otherwise capable of delivering the requested services) are taken into consideration, as will be explained in a more detailed fashion in relation to processes 2010 through 2014 below.

Orchestration by a compute node according to some embodiments may be logically centralized, but may be physically distributed across various compute devices (such as edge gateway devices) of an edge computing system, with a decision as to which physical infrastructure device is to be used to deliver a requested service that is being implemented at an edge computing system/network level amongst physically distributed compute devices. According to such embodiments, any compute node at any moment during implementation of a method described herein may perform any portion of the method, acting as a controller and making a decision at a network level. Said any compute node may therefore have knowledge of various physical infrastructure devices of the edge computing system that are capable of providing a service to each service-requesting client. According to some other embodiments, orchestration by a compute node according to embodiments may be both logically and physically centralized.

The compute node according to some embodiments may serve as a mobile edge orchestrator, which maintains a holistic view of the physical infrastructure devices, including their available resources and services. The mobile edge orchestrator on-boards and records applications and services, performing integrity checks while confirming the rules and requirements, for running the service software packages, complying with operator policies. With a complete topological view of the entire mobile edge computing system, the mobile edge orchestrator can select the most appropriate physical infrastructure device as a mobile edge host from which to instantiate the application/the service requested.

At process 2010, the subgroups as determined by way of processes 2006 and 2008 are fed into a utility score calculation portion of an algorithm according to some embodiments. The utility score may be used by the compute node at process 2014 in order to select one or more physical infrastructure devices to provide the requested services and to schedule the one or more respective selected physical infrastructure devices for the provision of the requested services.

In particular, at process 2012, the compute node may use a novel utility formula to determine a measure of congestion and/or load cost to deploy one or more requested services at each of the candidate physical infrastructure devices. The utility score according to some embodiments may be determined at a subgroup level, that is, per subgroup per physical infrastructure device (as shown for the embodiment of FIG. 20), or on a per service-requesting client level, that is, per service-requesting client per physical infrastructure device.

A utility value according to some embodiments may be calculated for each subgroup of service-requesting clients against each candidate physical infrastructure device, using, as input, the average attribute values for location-related attributes and movement-related attributes on the one hand, and for resource related attributes on the other hand, of service-requesting clients within said each subgroup.

In order to select each of the respective selected physical infrastructure devices, the compute node may take into consideration, as noted above, resource-related attributes and location-related attributes of the candidate physical infrastructure devices. Each candidate physical infrastructure device may be associated with the following: a compute resource capacity $e_c$, a compute processing capacity $p_c$, a storage resource capacity $e_s$, a storage processing capacity $p_s$, a network resource capacity $e_n$, a network processing capacity $p_n$, coordinates $X_E$ (that may be fixed), and a radius or distance $P_E$ from the candidate physical infrastructure device to a farthest point within the edge computing system at which the requested service would need to be accessed for deployment by the physical infrastructure. The current physical coordinates $X_E$ of the candidate physical infrastructure device and the radius or distance $P_E$ from the candidate physical infrastructure device to the farthest point within the edge computing system at which the requested service would need to be accessed for deployment by the physical infrastructure device are examples of location-related attributes of the candidate physical infrastructure device. The compute resource capacity $e_c$, the compute processing capacity $p_c$, the storage resource capacity $e_s$, the storage processing capacity $p_s$, the network resource capacity $e_n$, and the network processing capacity $p_n$ are examples of resource-related attributes for the candidate physical infrastructure device.

According to some embodiments, an apparatus of compute node of an edge computing system, the apparatus to select and schedule respective physical infrastructure devices of the edge computing system to implement services requested by respective service-requesting clients is provided, the apparatus including processing circuitry, and a memory storing instructions and coupled to the processing circuitry. The apparatus may be the apparatus of a compute node, such as, for example, of a base station or gateway. The compute node may, in instances where it is physically centralized, correspond to the example compute nodes 1500 of FIGS. 15A and 1550 of FIG. 15B, although embodiments are not so limited, and include within their scope a compute node that is distributed.

The processing circuitry is to implement the instructions to: decode service requests from the respective service-requesting clients, such as, for example, from clients 302 of FIG. 3; determine, from the respective service requests, the services requested; for each candidate physical infrastructure device of the edge computing system ((i.e. physical infrastructure devices available to provide the requested services, such as physical infrastructure devices that are one hop away or multiple hops away from the service-requesting clients), and calculate a utility score corresponding to each of the services requested per each of the respective service-requesting clients. That is, the apparatus is to calculate the utility score for each candidate physical infrastructure device, per service requested per service-requesting client requesting that service. The utility score is based on location attributes of said each of the respective service-requesting clients, movement attributes of said each of the respective service-requesting clients, resource-related attributes of said each of the services requested, location-related attributes of said each candidate physical infrastructure device, and resource-related attributes of said each candidate PI; and select the respective physical infrastructure devices based on the utility score of said each candidate physical infrastructure device; and schedule the respective selected physical infrastructure devices to implement the services requested at the respective service-requesting clients.

An embodiment to calculate a utility score is described below. For a given time window, calculation of the utility score for any candidate physical infrastructure device E of the plurality of candidate physical infrastructure devices may first involve calculation of an approach vector ($AV_{Ei}$) for each service-requesting client i, where $AV_{Ei}$ may be given by Equation (1) below:

$$AV_{Ei} = \text{distance}(X_E, X_{R1i}) - \text{distance}(X_E, X_{R2i}) \quad \text{Eq. (1)}$$

where $X_{R1i}$ corresponds to current physical coordinates of the service-requesting client i, $X_{R2i}$ corresponds to anticipated future physical coordinates of the service-requesting client i, and $X_E$ corresponds to the physical coordinates of the candidate physical infrastructure device E. $A_{VEi}$ is a measure of whether the service-requesting client i is moving toward or away from the candidate physical infrastructure device E.

According to some embodiments, the utility score, which is to provide a measure of the congestion/load cost per physical infrastructure device per service per service-requesting client or per physical infrastructure device per service per subgroup of service-requesting clients may be based on the approach vector.

According to one embodiment, the utility score $U_{Eik}$ for a candidate physical infrastructure device E for a service k being requested by the service-requesting client i may be calculated as set forth in Equation (2) below, under the condition that $p_{cE}$, $p_{sE}$, $p_{nE}$ > threshold:

$$U_{Eik} = AV_{Ei} * P_{Ek} * (e_{cE} - R_{ck} + e_{sE} - R_{sk} + e_{nE} - R_{nk}) * \frac{1}{V_i} \quad \text{Eq. (2)}$$

and where $p_{cE}$ corresponds to the compute processing capacity of physical infrastructure device E, $p_{sE}$ corresponds to the storage processing capacity of physical infrastructure device E, $p_{nE}$ corresponds to the network processing capacity of physical infrastructure device E, $P_{Ek}$ corresponds to radius or distance from the candidate physical infrastructure device E to the farthest point within the edge computing system at which the requested service k would need to be accessed for deployment by the physical infrastructure device, $e_{cE}$ corresponds to the compute resource capacity of physical infrastructure device E, $R_{ck}$ corresponds to a compute resource capacity for the requested service k, $e_{sE}$ corresponds to the storage resource capacity of physical infrastructure device E, $R_{sk}$ corresponds to a storage resource capacity for the requested service k, $e_{nE}$ corresponds to the network resource capacity of physical infrastructure device E, $R_{nk}$ corresponds to a network resource capacity for the requested service k, and V corresponds to the vector-related attribute of the service-requesting client i.

For an embodiment where groups and subgroups of the service-requesting clients are first identified, as described above in the context of the example of FIG. 20, the approach vector $AV_{Ej}$ for each candidate physical infrastructure device E may be calculated on a per subgroup basis, corresponding to a measure of whether a given subgroup j is moving toward or away from the candidate physical infrastructure device E, as given by Equation (3):

$$AV_{Ej} = \text{distance}(X_E, X_{R1j}) - \text{distance}(X_E, X_{R2j}) \quad \text{Eq. (3)}$$

where $X_{R1j}$ corresponds to current physical coordinates of a subgroup j, $X_{R2j}$ corresponds to anticipated future physical coordinates of the subgroup j. For the purposes of determining $X_{R1j}$ and $X_{R22}$, the apparatus of the compute node may, for example, determine the average values of $X_{R1i}$'s for all service-requesting clients i within the subgroup j to determine the value of $X_{R1j}$, and determine the average values of $X_{R2i}$'s for all service-requesting clients i within the subgroup j to determine the value of $X_{R2j}$.

Thereafter, the utility score $U_{Ejk}$ for a candidate physical infrastructure device E for a service k being requested for a service-requesting client within the subgroup j may be calculated as set forth in Equation (4) below, under the condition that $p_{cE}$, $p_{sE}$, $p_{nE}$ > threshold:

$$U_{Ejk} = AV_{Ej} * P_{Ek} * (e_{cE} - R_{ck} + e_{sE} - R_{sk} + e_{nE} - R_{nk}) * \frac{1}{V_j} \quad \text{Eq. (4)}$$

and where $p_{cE}$ corresponds to the compute processing capacity of physical infrastructure device E, $p_{sE}$ corresponds to the storage processing capacity of physical infrastructure device E, $p_{nE}$ corresponds to the network processing capacity of physical infrastructure device E, $P_{Ek}$ corresponds to radius or distance from the candidate physical infrastructure device E to the farthest point within the edge computing system at which the requested service k would need to be accessed for deployment by the physical infrastructure device, $e_{cE}$ corresponds to the compute resource capacity of physical infrastructure device E, $R_{ck}$ corresponds to a compute resource capacity for the requested service k, $e_{sE}$ corresponds to the storage resource capacity of physical infrastructure device E, $R_{sk}$ corresponds to a storage resource capacity for the requested service k, $e_{nE}$ corresponds to the network resource capacity of physical infrastructure device E, $R_{nk}$ corresponds to a network resource capacity for the requested service k, and V corresponds to the vector-related attribute of the subgroup j.

For the purposes of determining $V_j$, the apparatus of the compute node may, for example, determine the average values of $V_i$'s for all service-requesting clients i within the subgroup j to determine the value of $V_j$.

According to some embodiments, instead of using an advance vector AV to determine the utility score, we can also use other algorithms, such as an extended version of the "D* Lite" algorithm described in "D* Lite", Sven Koenig and Maxim Likhachev, The American Association for Artificial Intelligence, (2002) in order to see if the group is moving towards or away from any given physical infrastructure device. However, using the D* Lite algorithm as noted above may make the solution slower and would likely require much more processing power than calculate AV to associate the client to its physical infrastructure device.

It can be seen from Equation (4) that a subgrouping of service-requesting clients according to some embodiments, such as described by way of example in relation to FIG. 20, advantageously substantially reduces the problem size in instances where many service requests are to be handled by an edge computing system. In a prototype implementation of embodiments, by way of example, for a problem involving a probe size of 100,000, calculating a utility score based on subgroups reduced the problem from 100,000 combinations to only 1785. Grouping and subgrouping according to embodiments can therefore improve the processing of client request combination.

According to some embodiments, each service request may contain metadata about its service-requesting client's features, such as vector, acceleration, the unique ID of the service-requesting client. For each compute node, the edge computing system has a knowledge about the actual available capacity of resources. According to some embodiments, an orchestration service implemented at a compute node, upon receiving a service request, is advantageously able to make fast utility driven decisions, for example by weighing a current physical position of a service-requesting client that sent the service request versus its potential future position, based on dataset features embodiments for which were described above, in order to evenly spread the resource allocation with respect to selecting a physical infrastructure device to deliver the requested service, and in this way reduce the need for more costly rebalancing or migration of services later on where a less suitable physical infrastructure device was initially selected according to the state of the art.

For each candidate physical infrastructure device, the geo-aware algorithm, embodiments of which were described above, may select all requests in range of that physical infrastructure device by making a fast geospatial query of the service-requesting clients that sent the requests, and may aggregate the service-requesting clients into further groups and subgroups for example by direction of travel and velocity.

Figure 21:
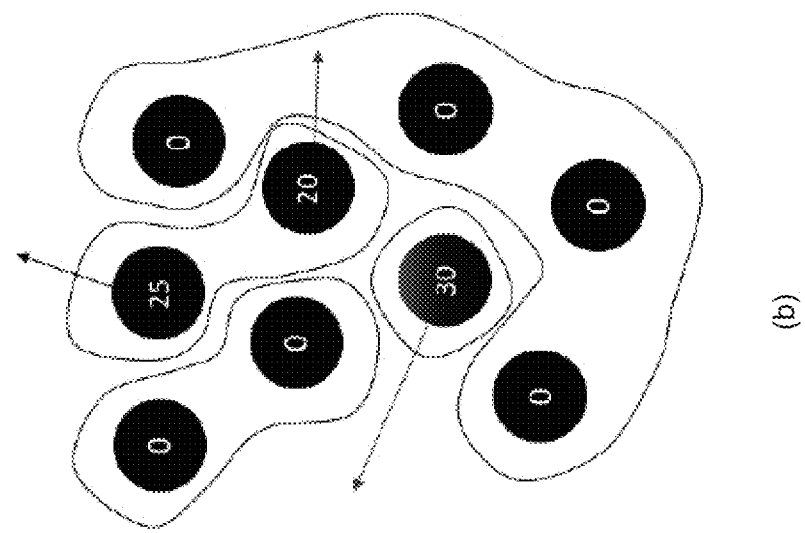
FIG. 21 illustrates a plurality of moving and non-moving service-requesting clients.
Figure 21:
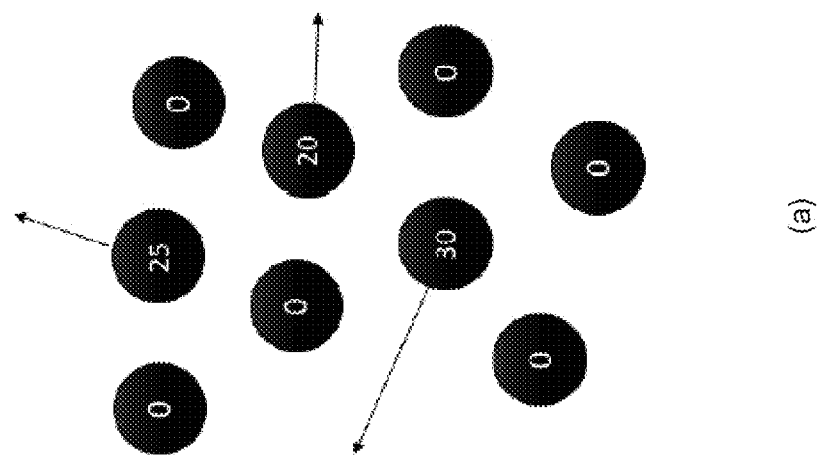

Reference in this respect is now made to FIG. 21, which shows, at scenarios (a) and (b), a plurality of service-requesting clients, some of which are non-moving service-requesting clients as indicated by the speed number "0" thereon, and some of which are moving service-requesting clients, as indicated by their speeds "20," "25" and "30" thereon (for example in miles/hour), where the arrows for the moving service-requesting clients depicts a direction and amount of acceleration. The simplified vector acceleration view of FIG. 21 for each service-requesting client depicts service-requesting clients for a prototype on which an orchestration mechanism according to an embodiment was implemented to yield service-requesting client subgroupings. In particular, scenario (a) shows the service-requesting clients prior to a subgrouping thereof, and scenario (b) shows the service-requesting clients post subgrouping, for example based on the subgrouping processes explained above in relation to the embodiment of FIG. 20. As can be seen from FIG. 21, non-moving service-requesting clients have been subgrouped into two separate subgroups, whereas the moving service-requesting clients have been subgrouped into two separate subgroups as well, yielding a total of four subgroups the attributes of which was fed into a utility score algorithm according to some embodiments.

After subgrouping as explained by way of example in the context of FIGS. 20 and 21, a utility value may be calculated according to one embodiment, for example using Equations (3) and (4) above. The utility value may be calculated for each subgroup against each candidate physical infrastructure device using the average attribute values of the request subgroup as input.

Figure 22:
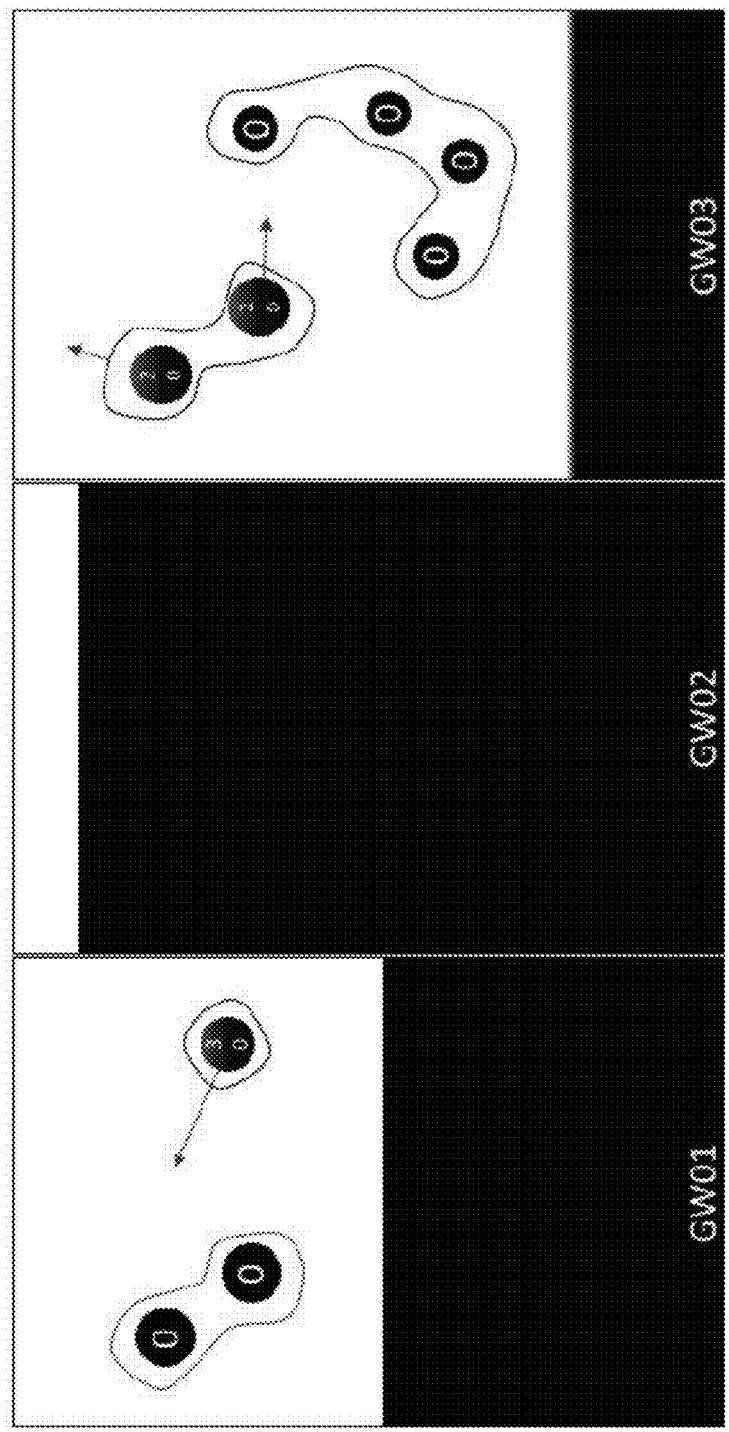
FIG. 22 illustrates for the service-requesting clients and subgroups of FIG. 21, a selection of gateways for the deployment of services.

Reference with respect to the above is now made to FIG. 22, which shows, for the service-requesting clients and subgroups of FIG. 21, a selection of physical infrastructure devices, in the form of gateways GW01 and GW03. In particular, FIG. 22 shows that, within a particular time window of interest, gateway GW02 (GW02) has a utilization level that would prevent it from deploying services to the service-requesting clients of FIG. 21, but that GW01 and GW03 show utilization levels that made them potentially suitable to do so. Thus, where GW01, GW02 and GW03 are candidate physical infrastructure devices, the utility score for GW02 would show that GW02 should not be selected as a physical infrastructure device to provide any of the requested services within the time window of interest. FIG. 22 further shows that GW01 has been selected to provide the services requested from two subgroups, one with the two non-moving service-requesting clients, and one with a service-requesting client having a speed of 30 miles per hour and an acceleration generally in a northwest direction. FIG. 22 also shows that GW02 has been selected to provide the services requested from the two remaining subgroups, one with the four non-moving service-requesting clients, and one with the two service-requesting clients having a speed of 20 miles per hour and an acceleration generally having an eastward component. In the prototype used as depicted schematically in FIGS. 21 and 22, a utility score was used per subgroup in order to achieve the gateway selection of FIG. 22.

Figure 23:
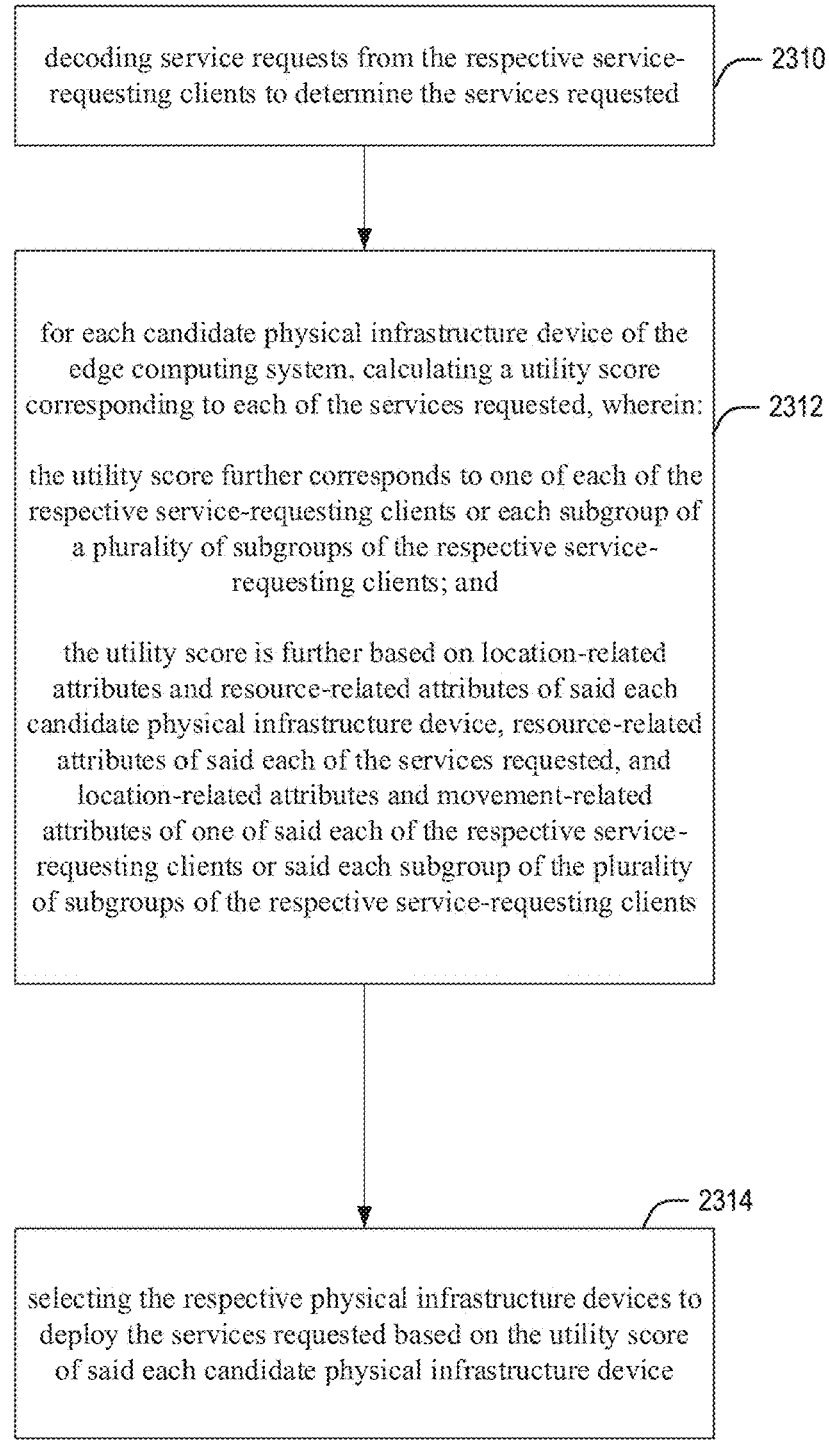
FIG. 23 illustrates a process according to some embodiments.

FIG. 23 shows a process 2300 according to embodiments. At operation 2302 the process including decoding service requests from the respective service-requesting clients to determine the services requested; in operation 2304, the method includes, for each candidate physical infrastructure device of the edge computing system, calculating a utility score corresponding to each of the services requested, wherein: the utility score further corresponds to one of each of the respective service-requesting clients or each subgroup of a plurality of subgroups of the respective service-requesting clients; and the utility score is further based on location-related attributes and resource-related attributes of said each candidate physical infrastructure device, resource-related attributes of said each of the services requested, and location-related attributes and movement-related attributes of one of said each of the respective service-requesting clients or said each subgroup of the plurality of subgroups of the respective service-requesting clients; and at operation 2306, the process includes selecting the respective physical infrastructure devices to deploy the services requested based on the utility score of said each candidate physical infrastructure device.

Using embodiments of the orchestration mechanisms herein, we can resolve or alleviate many utilization-based problems of 5G or radio networks. In the near future, as utilization of the networks and radio services continues to grow, we will need to change the existing approach to radio service orchestration. Doing so will be necessary, especially for the expected increase in self-driving cars and autonomous systems.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a non-transitory computer-readable storage medium to select respective physical infrastructure devices of an edge computing system to implement services requested by respective service-requesting clients, the computer-readable storage medium comprising computer-readable instructions that, when executed, cause at least one processor to perform operations comprising: decoding service requests from the respective service-requesting clients to determine the services requested; for each candidate physical infrastructure device of the edge computing system, calculating a utility score corresponding to each of the services requested, wherein: the utility score further corresponds to one of each of the respective service-requesting clients or each subgroup of a plurality of subgroups of the respective service-requesting clients; and the utility score is further based on location-related attributes and resource-related attributes of said each candidate physical infrastructure device, resource-related attributes of said each of the services requested, and location-related attributes and movement-related attributes of one of said each of the respective service-requesting clients or said each subgroup of the plurality of subgroups of the respective service-requesting clients; and selecting the respective physical infrastructure devices to deploy the services requested based on the utility score of said each candidate physical infrastructure device.

Example 2 includes the subject matter of Example 1, and optionally, wherein: the resource-related attributes of said each of the services requested k include at least one of: a compute resource capacity $R_{ck}$; a storage resource capacity $R_{sk}$; or a network resource capacity $R_{nk}$; and the resource-related attributes of said each candidate physical infrastructure device E include at least one of: a compute resource capacity $e_{cE}$; a compute processing capacity $p_{cE}$; a storage resource capacity $e_{sE}$; a storage processing capacity $p_{sE}$; a network resource capacity $e_{nE}$; or a network processing capacity $p_{nE}$.

Example 3 includes the subject matter of any one of Examples 1-2, and optionally, wherein respective ones of the service requests include information regarding the resource-related attributes of a corresponding one said each of the services requested k.

Example 4 includes the subject matter of any one of Examples 1-3, and optionally, wherein the location-related attributes of said each candidate physical infrastructure device E include at least one of: physical coordinates $X_E$; or a distance $P_{Ek}$ from said each candidate physical infrastructure device E to a farthest point within the edge computing system at which said each of the services requested k is to be accessed for deployment.

Example 5 includes the subject matter of any one of Examples 1-4, and optionally, wherein: said location-related attributes of said each of the respective service-requesting clients i include current physical coordinates $(X_{R1i})$; said location-related attributes of said each subgroup/of the plurality of subgroups of the respective service-requesting clients include current physical coordinates $(X_{R1j})$; said movement-related attributes of said each of the respective service-requesting clients i include at least one of: current physical coordinates $(X_{R1i})$ and anticipated future physical coordinates $(X_{R2i})$ velocity vector $V_i$; or acceleration $a_i$; and said movement-related attributes of said each subgroup j of the plurality of subgroups of the respective service-requesting clients include at least one of: current physical coordinates $(X_{R1j})$ and anticipated future physical coordinates $(X_{R2j})$; velocity vector $V_j$, or acceleration $a_j$.

Example 6 includes the subject matter of Example 5, and optionally, wherein calculating the utility score includes: calculating of an approach vector $(AV_{Ei})$ for each service-requesting client i, wherein $AV_{Ei}$ is given by: $AV_{Ei}$=distance $(X_E, X_{R1i})$–distance $(X_E, X_{R2i})$; and in response to a determination that $p_{cE}$, $p_{sE}$, $p_{nE}$>a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{V_i}.$$

Example 7 includes the subject matter of Example 5, and optionally, wherein the operations further include at least one of: determining the current physical coordinates $(X_{R1j})$ and anticipated future physical coordinates $(X_{R2j})$ based on, respectively, an average value of $X_{R1i}$'s of all service-requesting clients i of subgroup j and an average value of $X_{R2i}$'s of all service-requesting clients i of subgroup j; determining the velocity vector $V_j$ based on an average value of $V_i$'s of all service-requesting clients i of subgroup j; or determining the acceleration $a_j$ based on an average value of $a_i$'s of all service-requesting clients i of subgroup j.

Example 8 includes the subject matter of any one of Examples 5 and 7, and optionally, wherein the operations further including: classifying the respective service-requesting clients into a first group including non-moving service-requesting clients, and a second group including moving service-requesting clients based on location-related attributes and the movement-related attributes of said each of the respective service-requesting clients; and classifying the first group into respective first subgroups of the plurality of subgroups, classifying the first group based on location-related attributes of each service-requesting device of the first group; and classifying the second group into respective second subgroups of the plurality of subgroups, classifying the second group based on movement-related attributes of each service-requesting device of the second group.

Example 9 includes the subject matter of Example 8, and optionally, wherein classifying the first group and classifying the second group further include classifying service-requesting clients of the first group and of the second group based on the resource-related attributes of said each of the services requested.

Example 10 includes the subject matter of any one of Examples 5 and 7-9, wherein calculating the utility score includes: calculating of an approach vector $(AV_{Ej})$ for each subgroup j, wherein $AV_{Ej}$ is given by: $AV_{Ej}$=distance($X_E$, $X_{R1j}$)–distance ($X_E$, $X_{R2j}$); and in response to a determination that $p_{cE}$, $p_{sE}$, $p_{nE}$>a threshold value, determining the utility score $U_{Ejk}$, wherein:

$$U_{Ejk} = AV_{Ej} * P_{Ek} * (e_{cE} - R_{ck} + e_{sE} - R_{sk} + e_{nE} - R_{nk}) * \frac{1}{V_j}.$$

Example 11 includes the subject matter of any one of Examples 1-10, and optionally, wherein the operations further include scheduling the respective selected physical infrastructure devices to implement the services requested at the respective service-requesting clients.

Example 12 includes the subject matter of any one of Examples 1-11, and optionally, wherein the physical infrastructure devices include edge gateway nodes.

Example 13 includes a device of a compute node of an edge computing system, the apparatus to select respective physical infrastructure devices of the edge computing system to implement services requested by respective service-requesting clients, the apparatus comprising a memory storing instructions, and a processing circuitry coupled to the memory and adapted to execute the instructions to: decode service requests from the respective service-requesting clients to determine the services requested; for each candidate physical infrastructure device of the edge computing system, calculate a utility score corresponding to each of the services requested, wherein: the utility score further corresponds to one of each of the respective service-requesting clients or each subgroup of a plurality of subgroups of the respective service-requesting clients; and the utility score is further based on location-related attributes and resource-related attributes of said each candidate physical infrastructure device, resource-related attributes of said each of the services requested, and location-related attributes and movement-related attributes of one of said each of the respective service-requesting clients or said each subgroup of the plurality of subgroups of the respective service-requesting clients; and select the respective physical infrastructure devices to deploy the services requested based on the utility score of said each candidate physical infrastructure device.

Example 14 includes the subject matter of Example 13, and optionally, wherein: the resource-related attributes of said each of the services requested k include at least one of: a compute resource capacity $R_{ck}$; a storage resource capacity $R_{sk}$; or a network resource capacity $R_{nk}$; and the resource-related attributes of said each candidate physical infrastructure device E include at least one of: a compute resource capacity $e_{cE}$; a compute processing capacity $p_{cE}$; a storage resource capacity $e_{sE}$; a storage processing capacity $p_{sE}$; a network resource capacity $e_{nE}$; or a network processing capacity $p_{nE}$.

Example 15 includes the subject matter of any one of Examples 13-14, and optionally, wherein respective ones of the service requests include information regarding the resource-related attributes of a corresponding one said each of the services requested k.

Example 16 includes the subject matter of any one of Examples 13-15, and optionally, wherein the location-related attributes of said each candidate physical infrastructure device E include at least one of: physical coordinates $X_E$; or a distance $P_{Ek}$ from said each candidate physical infrastructure device E to a farthest point within the edge computing system at which said each of the services requested k is to be accessed for deployment.

Example 17 includes the subject matter of any one of Examples 13-16, and optionally, wherein: said location-related attributes of said each of the respective service-requesting clients i include current physical coordinates $(X_{R1i})$; said location-related attributes of said each subgroup j of the plurality of subgroups of the respective service-requesting clients include current physical coordinates $(X_{R1j})$; said movement-related attributes of said each of the respective service-requesting clients i include at least one of: current physical coordinates $(X_{R1i})$ and anticipated future physical coordinates $(X_{R2i})$ velocity vector $V_i$; or acceleration $a_i$; and said movement-related attributes of said each subgroup j of the plurality of subgroups of the respective service-requesting clients include at least one of: current physical coordinates $(X_{R1j})$ and anticipated future physical coordinates $(X_{R2j})$; velocity vector $V_j$; or acceleration $a_j$.

Example 18 includes the subject matter of Example 17, and optionally, wherein calculating the utility score includes: calculating of an approach vector $(AV_{Ei})$ for each service-requesting client i, wherein $AV_{Ei}$ is given by: $AV_{Ei}$=distance $(X_E, X_{R1i})$–distance $(X_E, X_{R2i})$; and in response to a determination that $p_{cE}$, $p_{sE}$, $p_{nE}$>a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{V_i}.$$

Example 19 includes the subject matter of Example 17, and optionally, wherein the processing circuitry is to at least one of: determine the current physical coordinates $(X_{R1j})$ and anticipated future physical coordinates $(X_{R2j})$ based on, respectively, an average value of $X_{R1i}$'s of all service-requesting clients i of subgroup j and an average value of $X_{R2i}$'s of all service-requesting clients i of subgroup j; determine the velocity vector $V_j$ based on an average value of $V_i$'s of all service-requesting clients i of subgroup j; or determine the acceleration $a_j$ based on an average value of $a_i$'s of all service-requesting clients i of subgroup j.

Example 20 includes the subject matter of any one of Examples 16 and 19, wherein the processing circuitry is to at least one of: classify the respective service-requesting clients into a first group including non-moving service-requesting clients, and a second group including moving service-requesting clients based on location-related attributes and the movement-related attributes of said each of the respective service-requesting clients; and classify the first group into respective first subgroups of the plurality of subgroups, classifying the first group based on location-related attributes of each service-requesting device of the first group; and classify the second group into respective second subgroups of the plurality of subgroups, classifying the second group based on movement-related attributes of each service-requesting device of the second group.

Example 21 includes the subject matter of Example 20, and optionally, wherein classifying the first group and classifying the second group further include classifying service-requesting clients of the first group and of the second group based on the resource-related attributes of said each of the services requested.

Example 22 includes the subject matter of any one of Examples 17 and 19-21, wherein calculating the utility score includes: calculating of an approach vector $(AV_{Ej})$ for each subgroup j, wherein $AV_{Ej}$ is given by: $AV_{Ej}$=distance$(X_E, X_{R1j})$–distance$(X_E, X_{R2j})$; and in response to a determination that $p_{cE}, p_{sE}, p_{nE} >$ a threshold value, determining the utility score $U_{Ejk}$, wherein:

$$U_{Ejk} = AV_{Ej} * P_{Ek} * (e_{cE} - R_{ck} + e_{sE} - R_{sk} + e_{nE} - R_{nk}) * \frac{1}{V_j}.$$

Example 23 includes the subject matter of any one of Examples 13-22, and optionally, wherein the processing circuitry to schedule the respective selected physical infrastructure devices to implement the services requested at the respective service-requesting clients.

Example 24 includes the subject matter of any one of Examples 13-23, and optionally, wherein the physical infrastructure devices include edge gateway nodes.

Example 25 includes a method to be implemented at a compute node of an edge computing system to select respective physical infrastructure devices of the edge computing system to implement services requested by respective service-requesting clients, the method comprising: decoding service requests from the respective service-requesting clients to determine the services requested; for each candidate physical infrastructure device of the edge computing system, calculating a utility score corresponding to each of the services requested, wherein: the utility score further corresponds to one of each of the respective service-requesting clients or each subgroup of a plurality of subgroups of the respective service-requesting clients; and the utility score is further based on location-related attributes and resource-related attributes of said each candidate physical infrastructure device, resource-related attributes of said each of the services requested, and location-related attributes and movement-related attributes of one of said each of the respective service-requesting clients or said each subgroup of the plurality of subgroups of the respective service-requesting clients; and selecting the respective physical infrastructure devices to deploy the services requested based on the utility score of said each candidate physical infrastructure device.

Example 26 includes the subject matter of Example 25, and optionally, wherein: the resource-related attributes of said each of the services requested k include at least one of: a compute resource capacity $R_{ck}$; a storage resource capacity $R_{sk}$; or a network resource capacity $R_{nk}$; and the resource-related attributes of said each candidate physical infrastructure device E include at least one of: a compute resource capacity $e_{cE}$; a compute processing capacity $p_{cE}$; a storage resource capacity $e_{sE}$; a storage processing capacity $p_{sE}$; a network resource capacity $e_{nE}$; or a network processing capacity $p_{nE}$.

Example 27 includes the subject matter of any one of Examples 25-26, and optionally, wherein respective ones of the service requests include information regarding the resource-related attributes of a corresponding one said each of the services requested k.

Example 28 includes the subject matter of any one of Examples 25-27, and optionally, wherein the location-related attributes of said each candidate physical infrastructure device E include at least one of: physical coordinates $X_E$; or a distance $P_{Ek}$ from said each candidate physical infrastructure device E to a farthest point within the edge computing system at which said each of the services requested k is to be accessed for deployment.

Example 29 includes the subject matter of any one of Examples 25-28, and optionally, wherein: said location-related attributes of said each of the respective service-requesting clients i include current physical coordinates $(X_{R1i})$; said location-related attributes of said each subgroup j of the plurality of subgroups of the respective service-requesting clients include current physical coordinates $(X_{R1j})$; said movement-related attributes of said each of the respective service-requesting clients i include at least one of: current physical coordinates $(X_{R1i})$ and anticipated future physical coordinates $(X_{R2i})$ velocity vector $V_i$; or acceleration $a_i$; and said movement-related attributes of said each subgroup j of the plurality of subgroups of the respective service-requesting clients include at least one of: current physical coordinates $(X_{R1j})$ and anticipated future physical coordinates $(X_{R2j})$; velocity vector $V_j$; or acceleration $a_j$.

Example 30 includes the subject matter of Example 29, and optionally, wherein calculating the utility score includes: calculating of an approach vector $(AV_{Ei})$ for each service-requesting client i, wherein $AV_{Ei}$ is given by: $AV_{Ei}$=distance $(X_E, X_{R1i})$–distance $(X_E, X_{R2i})$; and in response to a determination that $p_{cE}, p_{sE}, p_{nE} >$ a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{V_i}.$$

Example 31 includes the subject matter of Example 29, and optionally, further including at least one of: determining the current physical coordinates $(X_{R1j})$ and anticipated future physical coordinates $(X_{R2j})$ based on, respectively, an average value of $X_{R1i}$'s of all service-requesting clients i of subgroup j and an average value of $X_{R2i}$'s of all service-requesting clients i of subgroup j; determining the velocity vector $V_j$ based on an average value of $V_i$'s of all service-requesting clients i of subgroup j; or determining the acceleration $a_j$ based on an average value of $a_i$'s of all service-requesting clients i of subgroup j.

Example 32 includes the subject matter of any one of claims 29 and 31, further including: classifying the respective service-requesting clients into a first group including non-moving service-requesting clients, and a second group including moving service-requesting clients based on location-related attributes and the movement-related attributes of said each of the respective service-requesting clients; and classifying the first group into respective first subgroups of the plurality of subgroups, classifying the first group based on location-related attributes of each service-requesting device of the first group; and classifying the second group into respective second subgroups of the plurality of subgroups, classifying the second group based on movement-related attributes of each service-requesting device of the second group.

Example 33 includes the subject matter of Example 32, and optionally, wherein classifying the first group and classifying the second group further include classifying service-requesting clients of the first group and of the second group based on the resource-related attributes of said each of the services requested.

Example 34 includes the subject matter of any one of Examples 29 and 31-33, wherein calculating the utility score includes: calculating of an approach vector ($AV_{Ej}$) for each subgroup j, wherein $AV_{Ej}$ is given by: $AV_{Ej}$=distance($X_E$, $X_{R1j}$)–distance($X_E$, $X_{R2j}$); and in response to a determination that $p_{cE}$, $p_{sE}$, $p_{nE}$>a threshold value, determining the utility score $U_{Ejk}$, wherein:

$$U_{Ejk} = AV_{Ej} * P_{Ek} * (e_{cE} - R_{ck} + e_{sE} - R_{sk} + e_{nE} - R_{nk}) * \frac{1}{V_j}.$$

Example 35 includes the method of any one of Examples 25-34, and optionally, further including scheduling the respective selected physical infrastructure devices to implement the services requested at the respective service-requesting clients.

Example 36 includes the method of any one of Examples 25-35, and optionally, wherein the physical infrastructure devices include edge gateway nodes.

Example 37 include a device of a compute node of an edge computing system, the apparatus to select respective physical infrastructure devices of the edge computing system to implement services requested by respective service-requesting clients, the apparatus comprising: means for decoding service requests from the respective service-requesting clients to determine the services requested; means for calculating, for each candidate physical infrastructure device of the edge computing system, a utility score corresponding to each of the services requested, wherein: the utility score further corresponds to one of each of the respective service-requesting clients or each subgroup of a plurality of subgroups of the respective service-requesting clients; and the utility score is further based on location-related attributes and resource-related attributes of said each candidate physical infrastructure device, resource-related attributes of said each of the services requested, and location-related attributes and movement-related attributes of one of said each of the respective service-requesting clients or said each subgroup of the plurality of subgroups of the respective service-requesting clients; and means for selecting the respective physical infrastructure devices to deploy the services requested based on the utility score of said each candidate physical infrastructure device.

Example 38 includes the subject matter of Example 37, and optionally, wherein: the resource-related attributes of said each of the services requested k include at least one of: a compute resource capacity $R_{ck}$; a storage resource capacity $R_{sk}$; or a network resource capacity $R_{nk}$; and the resource-related attributes of said each candidate physical infrastructure device E include at least one of: a compute resource capacity $e_{cE}$; a compute processing capacity $p_{cE}$; a storage resource capacity $e_{sE}$; a storage processing capacity $p_{sE}$; a network resource capacity $e_{nE}$; or a network processing capacity $p_{nE}$.

Example 39 includes the subject matter of any one of Examples 37-38, and optionally, wherein respective ones of the service requests include information regarding the resource-related attributes of a corresponding one said each of the services requested k.

Example 40 includes the subject matter of any one of Examples 37-39, and optionally, wherein the location-related attributes of said each candidate physical infrastructure device E include at least one of: physical coordinates $X_E$; or a distance $P_{Ek}$ from said each candidate physical infrastructure device E to a farthest point within the edge computing system at which said each of the services requested k is to be accessed for deployment.

Example 41 includes the subject matter of any one of Examples 37-40, and optionally, wherein: said location-related attributes of said each of the respective service-requesting clients i include current physical coordinates ($X_{R1i}$); said location-related attributes of said each subgroup j of the plurality of subgroups of the respective service-requesting clients include current physical coordinates ($X_{R1j}$); said movement-related attributes of said each of the respective service-requesting clients i include at least one of: current physical coordinates ($X_{R1i}$) and anticipated future physical coordinates ($X_{R2i}$) velocity vector $V_i$; or acceleration $a_i$; and said movement-related attributes of said each subgroup j of the plurality of subgroups of the respective service-requesting clients include at least one of: current physical coordinates ($X_{R1j}$) and anticipated future physical coordinates ($X_{R2j}$); velocity vector $V_j$; or acceleration $a_j$.

Example 42 includes the subject matter of Example 41, and optionally, wherein the means for calculating the utility score include: means for calculating of an approach vector ($AV_{Ei}$) for each service-requesting client i, wherein $AV_{Ei}$ is given by: $AV_{Ei}$=distance ($X_E$, $X_{R1i}$)–distance ($X_E$, $X_{R2i}$); and means determining, in response to a determination that $p_{cE}$, $p_{sE}$, $p_{nE}$>a threshold value, the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{V_i}.$$

Example 43 includes the subject matter of Example 41, and optionally, further including at least one of: means for determining the current physical coordinates ($X_{R1j}$) and anticipated future physical coordinates ($X_{R2j}$) based on, respectively, an average value of $X_{R1i}$'s of all service-requesting clients i of subgroup j and an average value of $X_{R2i}$'s of all service-requesting clients i of subgroup j; means for determining the velocity vector $V_j$ based on an average value of $V_i$'s of all service-requesting clients i of subgroup j; or means for determining the acceleration $a_j$ based on an average value of $a_i$'s of all service-requesting clients i of subgroup j.

Example 44 includes the subject matter of any one of Examples 41 and 43, further including: means classifying the respective service-requesting clients into a first group including non-moving service-requesting clients, and a second group including moving service-requesting clients based on location-related attributes and the movement-related attributes of said each of the respective service-requesting clients; and means for classifying the first group into respective first subgroups of the plurality of subgroups, classifying the first group based on location-related attributes of each service-requesting device of the first group; and means for classifying the second group into respective second subgroups of the plurality of subgroups, classifying the second group based on movement-related attributes of each service-requesting device of the second group.

Example 45 includes the subject matter of Example 44, and optionally, wherein the means for classifying the first group and the means for classifying the second group further include means for classifying service-requesting clients of the first group and of the second group based on the resource-related attributes of said each of the services requested.

Example 46 includes the subject matter of any one of Examples 41 and 43-45, wherein the means for calculating the utility score includes: means calculating of an approach vector ($AV_{Ej}$) for each subgroup j, wherein $AV_{Ej}$ is given by: $AV_{Ej}$=distance($X_E$, $X_{R1j}$)–distance($X_E$, $X_{R2j}$); and means for determining, in response to a determination that $p_{cE}$, $p_{sE}$, $p_{nE}$>a threshold value, the utility score $U_{Ejk}$, wherein:

$$U_{Ejk} = AV_{Ej} * P_{Ek} * (e_{cE} - R_{ck} + e_{sE} - R_{sk} + e_{nE} - R_{nk}) * \frac{1}{V_j}.$$

Example 47 includes the subject matter of any one of Examples 37-46, and optionally, wherein further including means for scheduling the respective selected physical infrastructure devices to implement the services requested at the respective service-requesting clients.

Example 48 includes the subject matter of any one of Examples 37-47, and optionally, wherein the physical infrastructure devices include edge gateway nodes.

Another example implementation is an aggregation node, network hub node, gateway node, or core data processing node, within or coupled to an edge computing system, operable to invoke or perform the operations of any one of the method examples above, or other subject matter described herein.

Another example implementation is an access point, base station, road-side unit, street-side unit, or on-premise unit, within or coupled to an edge computing system, operable to invoke or perform the operations of any one of the method examples above, or other subject matter described herein.

Another example implementation is an edge provisioning node, service orchestration node, application orchestration node, or multi-tenant management node, within or coupled to an edge computing system, operable to invoke or perform the operations of any one of the method examples above, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of any one of the method examples above, or other subject matter described herein.

Another example implementation is an edge computing system operable as an edge mesh, as an edge mesh with side car loading, or with mesh-to-mesh communications, operable to invoke or perform the operations of any one of the method examples above, or other subject matter described herein.

Another example implementation is an edge computing system including aspects of network functions, acceleration functions, acceleration hardware, storage hardware, or computation hardware resources, operable to invoke or perform the use cases discussed herein, with use of any one of the method examples above, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of any one of the method examples above, or other subject matter described herein.

Another example implementation is an edge computing system adapted for mobile wireless communications, including configurations according to an 3GPP 4G/LTE or 5G network capabilities, operable to invoke or perform the use cases discussed herein, with use of any one of the method examples above, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A non-transitory computer-readable storage medium to select respective physical infrastructure devices of an edge computing system to implement services requested by respective service-requesting clients i, the computer-readable storage medium comprising computer-readable instructions that, when executed, cause at least one processor to perform operations comprising:

decoding service requests from the respective service-requesting clients i to determine the services requested;

for each candidate physical infrastructure device (E) of the edge computing system, calculating a utility score corresponding to each of the services requested, wherein:
the utility score further corresponds to one of each of the respective service-requesting clients i or one of each subgroup of a plurality of subgroups of the respective service-requesting clients i; and
the utility score is further based on location-related attributes and resource-related attributes of said each candidate physical infrastructure device, resource-related attributes of said each of the services requested, and location-related attributes and movement-related attributes of said one of each of the respective service-requesting clients i or said one of each subgroup of the plurality of subgroups of the respective service-requesting clients i; and
selecting the respective physical infrastructure devices to deploy the services requested based on the utility score of said each candidate physical infrastructure device, wherein:
the location-related attributes of said each candidate physical infrastructure device E include at least one of:
physical coordinates $X_E$; or
a distance $P_{Ek}$ from said each candidate physical infrastructure device E to a farthest point within the edge computing system at which said each of the services requested k is to be accessed for deployment;
the location-related attributes of said one of each of the respective service-requesting clients i include current physical coordinates ($X_{R1i}$);
the location-related attributes of said one of each subgroup j of the plurality of subgroups of the respective service-requesting clients i include current physical coordinates ($X_{R1j}$);
the movement-related attributes of said one of each of the respective service-requesting clients i include at least one of:
current physical coordinates ($X_{R1i}$) and anticipated future physical coordinates ($X_{R2i}$);
velocity vector $V_i$; or
acceleration $a_i$;
the movement-related attributes of said one of each subgroup j of the plurality of subgroups of the respective service-requesting clients i include at least one of:
current physical coordinates ($X_{R1j}$) and anticipated future physical coordinates ($X_{R2j}$);
velocity vector $V_j$; or
acceleration $a_j$; and
calculating the utility score includes:
calculating of an approach vector ($AV_{Ei}$) for each service-requesting client i, wherein $AV_{Ei}$ is given by:

$AV_{Ei}$=distance($X_E, X_{R1i}$)−distance($X_E, X_{R2i}$); and in response to a determination that $p_{cE}$, $p_{sE}$, $p_{nE}$>a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{V_i}.$$

2. The computer-readable storage medium of claim 1, wherein:
the resource-related attributes of said each of the services requested k include at least one of:
a compute resource capacity $R_{ck}$;
a storage resource capacity $R_{sk}$; or
a network resource capacity $R_{nk}$; and
the resource-related attributes of said each candidate physical infrastructure device E include at least one of:
a compute resource capacity $e_{cE}$;
a compute processing capacity $p_{cE}$;
a storage resource capacity $e_{sE}$;
a storage processing capacity $p_{sE}$;
a network resource capacity $e_{nE}$; or
a network processing capacity $p_{nE}$.

3. The computer-readable storage medium of claim 2, wherein respective ones of the service requests include information regarding the resource-related attributes of a corresponding one said each of the services requested k.

4. The computer-readable storage medium of claim 1, wherein the operations further include at least one of:
determining the current physical coordinates ($X_{R1j}$) and anticipated future physical coordinates ($X_{R2j}$) based on, respectively, an average value of $X_{R1i}$'s of all service-requesting clients i of subgroup j and an average value of $X_{R2i}$'s of all service-requesting clients i of subgroup j;
determining the velocity vector $V_j$ based on an average value of $V_i$'s of all service-requesting clients i of subgroup j; or
determining the acceleration $a_j$ based on an average value of $a_i$'s of all service-requesting clients i of subgroup j.

5. The computer-readable storage medium of claim 1, the operations further including:
classifying the respective service-requesting clients i into a first group including non-moving service-requesting clients, and a second group including moving service-requesting clients based on location-related attributes and the movement-related attributes of said each of the respective service-requesting clients i; and
classifying the first group into respective first subgroups of the plurality of subgroups, classifying the first group based on location-related attributes of each service-requesting device of the first group; and
classifying the second group into respective second subgroups of the plurality of subgroups, classifying the second group based on movement-related attributes of each service-requesting device of the second group.

6. The computer-readable storage medium of claim 5, wherein classifying the first group and classifying the second group further include classifying service-requesting clients of the first group and of the second group based on the resource-related attributes of said each of the services requested.

7. The computer-readable storage medium of claim 1, wherein calculating the utility score includes:
calculating of an approach vector ($AV_{Ej}$) for each subgroup j, wherein $AV_{Ej}$ is given by:

$AV_{Ej}$=distance($X_E, X_{R1j}$)−distance($X_E, X_{R2j}$); and in response to a determination that $p_{cE}$, $p_{sE}$, $p_{nE}$>a threshold value, determining the utility score $U_{Ejk}$, wherein:

$$U_{Ejk} = AV_{Ej} * P_{Ek} * (e_{cE} - R_{ck} + e_{sE} - R_{sk} + e_{nE} - R_{nk}) * \frac{1}{V_j}.$$

8. The computer-readable storage medium of claim 1, wherein the operations further include scheduling the respective selected physical infrastructure devices to implement the services requested at the respective service-requesting clients i.

9. An apparatus of a compute node of an edge computing system, the apparatus to select respective physical infrastructure devices of the edge computing system to implement services requested by respective service-requesting clients i, the apparatus comprising a memory storing instructions, and a processing circuitry coupled to the memory and adapted to execute the instructions to:
   decode service requests from the respective service-requesting clients i to determine the services requested;
   for each candidate physical infrastructure device (E) of the edge computing system, calculate a utility score corresponding to each of the services requested, wherein:
      the utility score further corresponds to one of each of the respective service-requesting clients i or one of each subgroup of a plurality of subgroups of the respective service-requesting clients i; and
      the utility score is further based on location-related attributes and resource-related attributes of said each candidate physical infrastructure device, resource-related attributes of said each of the services requested, and location-related attributes and movement-related attributes of said one of each of the respective service-requesting clients i or said one of each subgroup of the plurality of subgroups of the respective service-requesting clients i; and
   select the respective physical infrastructure devices to deploy the services requested based on the utility score of said each candidate physical infrastructure device, wherein:
      the location-related attributes of said each candidate physical infrastructure device E include at least one of:
         physical coordinates $X_E$; or
         a distance $P_{Ek}$ from said each candidate physical infrastructure device E to a farthest point within the edge computing system at which said each of the services requested k is to be accessed for deployment;
      the location-related attributes of said one of each of the respective service-requesting clients i include current physical coordinates $(X_{R1i})$;
      the location-related attributes of said one of each subgroup j of the plurality of subgroups of the respective service-requesting clients i include current physical coordinates $(X_{R1j})$;
      the movement-related attributes of said one of each of the respective service-requesting clients i include at least one of:
         current physical coordinates $(X_{R1i})$ and anticipated future physical coordinates $(X_{R2i})$;
         velocity vector $V_i$; or
         acceleration $a_i$;
      the movement-related attributes of said one of each subgroup j of the plurality of subgroups of the respective service-requesting clients i include at least one of:
         current physical coordinates $(X_{R1j})$ and anticipated future physical coordinates $(X_{R2j})$;
         velocity vector $V_j$; or
         acceleration $a_j$; and calculating the utility score includes:
   calculating of an approach vector $(AV_{Ei})$ for each service-requesting client i, wherein $AV_{Ei}$ is given by:

$$AV_{Ei} = \text{distance}(X_E, X_{R1i}) - \text{distance}(X_E, X_{R2i}); \text{ and}$$

in response to a determination that $p_{cE}$, $p_{sE}$, $p_{nE}$ > a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{V_i}.$$

10. The apparatus of claim 9, wherein:
   the resource-related attributes of said each of the services requested k include at least one of:
      a compute resource capacity $R_{ck}$;
      a storage resource capacity $R_{sk}$; or
      a network resource capacity $R_{nk}$; and
   the resource-related attributes of said each candidate physical infrastructure device E include at least one of:
      a compute resource capacity $e_{cE}$;
      a compute processing capacity $p_{cE}$;
      a storage resource capacity $e_{sE}$;
      a storage processing capacity $p_{sE}$;
      a network resource capacity $e_{nE}$; or
      a network processing capacity $p_{nE}$.

11. The apparatus of claim 9, wherein the processing circuitry is to at least one of:
   classify the respective service-requesting clients i into a first group including non-moving service-requesting clients, and a second group including moving service-requesting clients based on location-related attributes and the movement-related attributes of said each of the respective service-requesting clients i; and
   classify the first group into respective first subgroups of the plurality of subgroups, classifying the first group based on location-related attributes of each service-requesting device of the first group; and
   classify the second group into respective second subgroups of the plurality of subgroups, classifying the second group based on movement-related attributes of each service-requesting device of the second group.

12. The apparatus of claim 9, wherein calculating the utility score includes:
   calculating of an approach vector $(AV_{Ej})$ for each subgroup j, wherein $AV_{Ej}$ is given by:

$$AV_{Ej} = \text{distance}(X_E, X_{R1j}) - \text{distance}(X_E, X_{R2j}); \text{ and}$$

in response to a determination that $p_{cE}$, $p_{sE}$, $p_{nE}$ > a threshold value, determining the utility score $U_{Ejk}$, wherein:

$$U_{Ejk} = AV_{Ej} * P_{Ek} * (e_{cE} - R_{ck} + e_{sE} - R_{sk} + e_{nE} - R_{nk}) * \frac{1}{V_j}.$$

13. The apparatus of claim 9, wherein the physical infrastructure devices include edge gateway nodes.

14. A method to be implemented at a compute node of an edge computing system to select respective physical infrastructure devices of the edge computing system to implement services requested by respective service-requesting clients i, the method comprising:
   decoding service requests from the respective service-requesting clients i to determine the services requested;

for each candidate physical infrastructure device (E) of the edge computing system, calculating a utility score corresponding to each of the services requested, wherein:
the utility score further corresponds to one of each of the respective service-requesting clients i or one of each subgroup of a plurality of subgroups of the respective service-requesting clients i; and
the utility score is further based on location-related attributes and resource-related attributes of said each candidate physical infrastructure device, resource-related attributes of said each of the services requested, and location-related attributes and movement-related attributes of said one of each of the respective service-requesting clients i or said one of each subgroup of the plurality of subgroups of the respective service-requesting clients i; and
selecting the respective physical infrastructure devices to deploy the services requested based on the utility score of said each candidate physical infrastructure device, wherein:
the location-related attributes of said each candidate physical infrastructure device E include at least one of:
physical coordinates $X_E$; or
a distance $P_{Ek}$ from said each candidate physical infrastructure device E to a farthest point within the edge computing system at which said each of the services requested k is to be accessed for deployment;
the location-related attributes of said one of each of the respective service-requesting clients i include current physical coordinates ($X_{R1i}$);
the location-related attributes of said one of each subgroup j of the plurality of subgroups of the respective service-requesting clients i include current physical coordinates ($X_{R1j}$);
the movement-related attributes of said one of each of the respective service-requesting clients i include at least one of:
current physical coordinates ($X_{R1i}$) and anticipated future physical coordinates ($X_{R2i}$);
velocity vector $V_i$; or
acceleration $a_i$;
the movement-related attributes of said one of each subgroup j of the plurality of subgroups of the respective service-requesting clients i include at least one of:
current physical coordinates ($X_{R1j}$) and anticipated future physical coordinates ($X_{R2j}$);
velocity vector $V_j$; or
acceleration $a_j$; and
calculating the utility score includes:
calculating of an approach vector ($AV_{Ei}$) for each service-requesting client i, wherein $AV_{Ei}$ is given by:

$$AV_{Ei} = \text{distance}(X_E, X_{R1i}) - \text{distance}(X_E, X_{R2i}); \text{ and}$$

in response to a determination that $p_{cE}$, $p_{sE}$, $p_{nE} >$ a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{v_i}.$$

15. The method of claim 14, wherein:
the resource-related attributes of said each of the services requested k include at least one of:
a compute resource capacity $R_{ck}$;
a storage resource capacity $R_{sk}$; or
a network resource capacity $R_{nk}$; and
the resource-related attributes of said each candidate physical infrastructure device E include at least one of:
a compute resource capacity $e_{cE}$;
a compute processing capacity $p_{cE}$;
a storage resource capacity $e_{sE}$;
a storage processing capacity $p_{sE}$;
a network resource capacity $e_{nE}$; or
a network processing capacity $p_{nE}$.

16. The method of claim 14, wherein respective ones of the service requests include information regarding the resource-related attributes of a corresponding one said each of the services requested k.

17. An apparatus of a compute node of an edge computing system, the apparatus to select respective physical infrastructure devices of the edge computing system to implement services requested by respective service-requesting clients i, the apparatus comprising:
means for decoding service requests from the respective service-requesting clients i to determine the services requested;
means for calculating, for each candidate physical infrastructure device (E) of the edge computing system, a utility score corresponding to each of the services requested, wherein:
the utility score further corresponds to one of each of the respective service-requesting clients i or one of each subgroup of a plurality of subgroups of the respective service-requesting clients i; and
the utility score is further based on location-related attributes and resource-related attributes of said each candidate physical infrastructure device, resource-related attributes of said each of the services requested, and location-related attributes and movement-related attributes of said one of each of the respective service-requesting clients i or said one of each subgroup of the plurality of subgroups of the respective service-requesting clients i; and
means for selecting the respective physical infrastructure devices to deploy the services requested based on the utility score of said each candidate physical infrastructure device, wherein:
the location-related attributes of said each candidate physical infrastructure device E include at least one of:
physical coordinates $X_E$; or
a distance $P_{Ek}$ from said each candidate physical infrastructure device E to a farthest point within the edge computing system at which said each of the services requested k is to be accessed for deployment;
the location-related attributes of said one of each of the respective service-requesting clients i include current physical coordinates ($X_{R1i}$);
the location-related attributes of said one of each subgroup j of the plurality of subgroups of the respective service-requesting clients i include current physical coordinates ($X_{R1j}$);
the movement-related attributes of said one of each of the respective service-requesting clients i include at least one of:

current physical coordinates ($X_{R1i}$) and anticipated future physical coordinates ($X_{R2i}$);
velocity vector $V_i$; or
acceleration $a_i$;
the movement-related attributes of said one of each subgroup j of the plurality of subgroups of the respective service-requesting clients i include at least one of:
current physical coordinates ($X_{R1j}$) and anticipated future physical coordinates ($X_{R2j}$);
velocity vector $V_j$; or
acceleration $a_j$; and
calculating the utility score includes:
calculating of an approach vector ($AV_{Ei}$) for each service-requesting client i, wherein $AV_{Ei}$ is given by:

$AV_{Ei}$=distance($X_E$,$X_{R1i}$)−distance($X_E$,$X_{R2i}$); and in response to a determination that $p_{cE}$, $p_{sE}$, $p_{nE}$>a threshold value, determining the utility score $U_{Eik}$, wherein:

$$U_{Eik} = AV_{Ei} * P_{Ek} * (e_{cE} - R_{ck} + e_{sE} - R_{sk} + e_{nE} - R_{nk}) * \frac{1}{v_i}.$$

18. The apparatus of claim 17, wherein:
the resource-related attributes of said each of the services requested k include at least one of:
a compute resource capacity $R_{ck}$;
a storage resource capacity $R_{sk}$; or
a network resource capacity $R_{nk}$; and
the resource-related attributes of said each candidate physical infrastructure device E include at least one of:
a compute resource capacity $e_{cE}$;
a compute processing capacity $p_{cE}$;
a storage resource capacity $e_{sE}$;
a storage processing capacity $p_{sE}$;
a network resource capacity $e_{nE}$; or
a network processing capacity $p_{nE}$.

* * * * *